(12) United States Patent
Afrouzi et al.

(10) Patent No.: US 11,576,543 B2
(45) Date of Patent: Feb. 14, 2023

(54) ROBOTIC VACUUM WITH ROTATING CLEANING APPARATUS

(71) Applicants: Ali Ebrahimi Afrouzi, San Diego, CA (US); Soroush Mehrnia, Helsingborg (SE); Azadeh Afshar Bakooshli, Henderson, NV (US); Lukas Fath, York (CA); Chen Zhang, Richmond (CA); Brian Highfill, Castro Valley, CA (US)

(72) Inventors: Ali Ebrahimi Afrouzi, San Diego, CA (US); Soroush Mehrnia, Helsingborg (SE); Azadeh Afshar Bakooshli, Henderson, NV (US); Lukas Fath, York (CA); Chen Zhang, Richmond (CA); Brian Highfill, Castro Valley, CA (US)

( * ) Notice: Subject to any disclaimer, the term of this patent is extended or adjusted under 35 U.S.C. 154(b) by 633 days.

(21) Appl. No.: 16/533,706

(22) Filed: Aug. 6, 2019

(65) Prior Publication Data
US 2020/0069134 A1    Mar. 5, 2020

Related U.S. Application Data

(63) Continuation-in-part of application No. 15/878,228, filed on Jan. 23, 2018, now Pat. No. 10,413,145, and a continuation-in-part of application No. 15/676,888, filed on Aug. 14, 2017, now Pat. No. 10,442,082, which is a continuation of application No. 14/673,633, filed on Mar. 30, 2015, now Pat. No. 9,764,472, said application No. 15/878,228 is a continuation of application No. 14/922,143, filed on Oct. 24, 2015, now Pat. No. 9,901,234.

(60) Provisional application No. 62/748,943, filed on Oct. 22, 2018, provisional application No. 62/746,688, filed on Oct. 17, 2018, provisional application No. 62/740,580, filed on Oct. 3, 2018, provisional application No. 62/740,573, filed on Oct. 3, 2018, provisional application No. 62/740,558, filed on Oct.

(Continued)

(51) Int. Cl.
*A47L 9/28*    (2006.01)
*A47L 11/40*    (2006.01)

(52) U.S. Cl.
CPC .......... *A47L 9/2831* (2013.01); *A47L 9/2852* (2013.01); *A47L 11/4036* (2013.01); *A47L 2201/04* (2013.01); *A47L 2201/06* (2013.01)

(58) Field of Classification Search
CPC .. A47L 9/2831; A47L 9/2852; A47L 11/4036; A47L 2201/04; A47L 2201/06; A47L 9/0472; A47L 9/0477; A47L 11/4038; A47L 11/4041; G05D 2201/0203; G05D 1/0248
See application file for complete search history.

(56) References Cited

U.S. PATENT DOCUMENTS 5,720,077 A    2/1998    Nakamura
6,883,201 B2    4/2005    Jones
(Continued)

*Primary Examiner* — David Redding

(57) ABSTRACT

A robotic surface cleaning device is provided, including a casing, a chassis, a set of wheels coupled to the chassis to drive the robotic surface cleaning device, a control system to instruct movement of the set of wheels, a battery to provide power to the robotic surface cleaning device, one or more sensors, a processor, rotating assembly, including a plate supported by a base of the casing, rotating mechanism to rotate the plate; and one or more cleaning apparatuses mounted to a first side of the plate.

17 Claims, 35 Drawing Sheets

Related U.S. Application Data

3, 2018, provisional application No. 62/735,137, filed on Sep. 23, 2018, provisional application No. 62/720,521, filed on Aug. 21, 2018, provisional application No. 62/720,478, filed on Aug. 21, 2018, provisional application No. 62/715,931, filed on Aug. 8, 2018, provisional application No. 62/068,579, filed on Oct. 24, 2014, provisional application No. 62/026,363, filed on Jul. 18, 2014.

(56) References Cited

U.S. PATENT DOCUMENTS

| | | |
|---|---|---|
| 7,474,941 B2 | 1/2009 | Kim |
| 7,568,259 B2 | 8/2009 | Yan |
| 7,571,511 B2 | 8/2009 | Jones |
| 8,087,117 B2 | 1/2012 | Kapoor |
| 8,516,651 B2 | 8/2013 | Jones |
| 8,839,477 B2 | 9/2014 | Schnittman |
| 9,119,512 B2 | 9/2015 | Martins |
| 9,901,234 B1 | 2/2018 | Ebrahimi Afrouzi |
| 2005/0166355 A1 | 8/2005 | Tani |
| 2010/0313910 A1 | 12/2010 | Lee |
| 2010/0324734 A1 | 12/2010 | Lee |
| 2013/0192019 A1 | 8/2013 | Weis |
| 2014/0189977 A1 | 7/2014 | Wang |
| 2015/0223653 A1 | 8/2015 | Kim |

1300     1301     1302

FIG. 16A
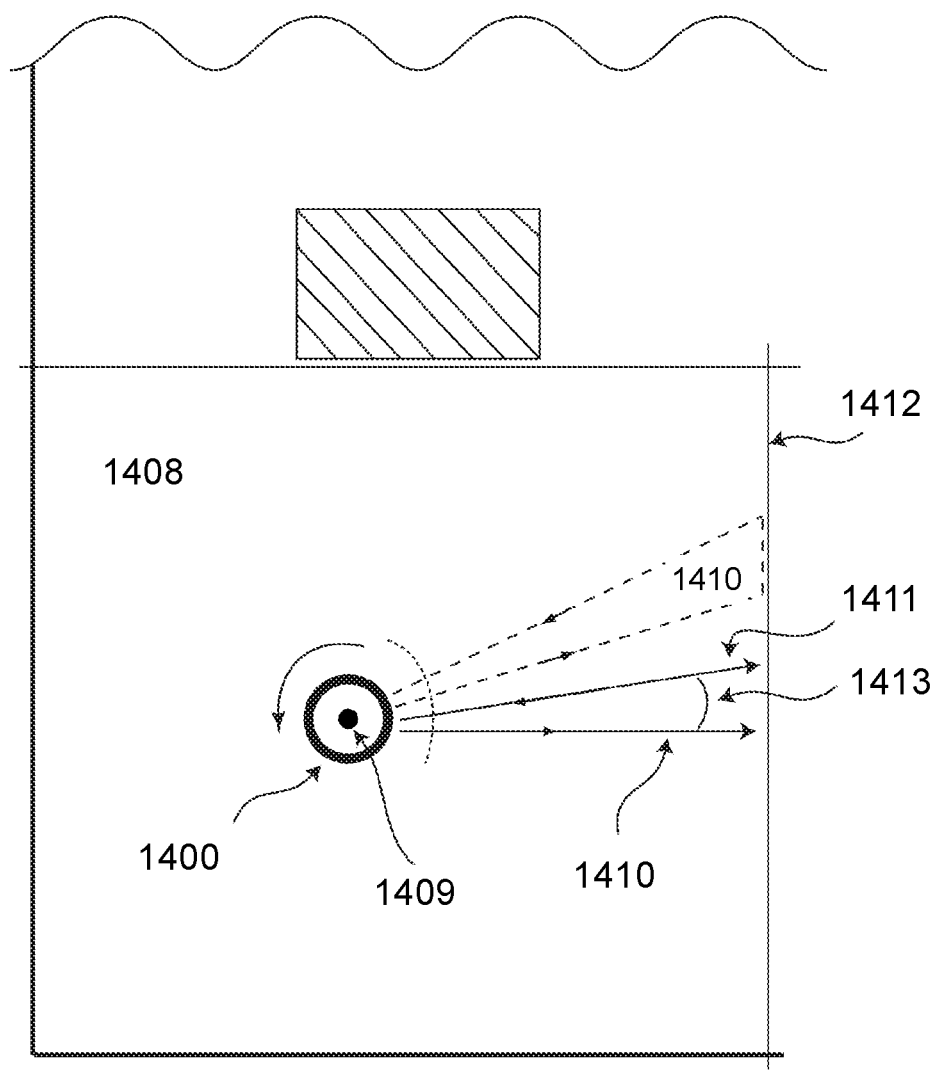
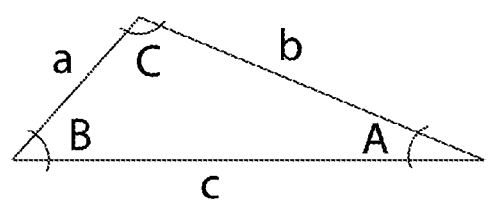
FIG. 16B

FIG. 32

For Brushes 9.5" – 10"

| If the first measured side of the triangle is at least _____ (meters) | But less than _____ (meters), | Then the turning angle shall be _____ (degrees). |
|---|---|---|
| 0 | .5 | 45 |
| .5 | 1 | 30 |
| 1 | 1.5 | 20 |
| 1.5 | 2 | 15 |
| 2 | 2.5 | 10 |
| 2.5 | - | 5 |

ROBOTIC VACUUM WITH ROTATING CLEANING APPARATUS

CROSS-REFERENCE TO RELATED APPLICATIONS

This application is a Continuation-in-Part of U.S. patent application Ser. No. 15/878,228, filed Jan. 23, 2018, which is a Continuation of U.S. patent application Ser. No. 14/922,143, filed Oct. 24, 2015, which claims the benefit of U.S. Provisional Patent Application No. 62/068,579, filed Oct. 24, 2014, each of which is hereby incorporated by reference. This application is also a Continuation-in-Part of U.S. patent application Ser. No. 15/676,888, filed Aug. 14, 2017, which is a Continuation of U.S. patent application Ser. No. 14/673,633, filed Mar. 30, 2015, which claims the benefit of U.S. Provisional Patent Application No. 62/026,363, filed Jul. 18, 2014, each of which is hereby incorporated by reference.

This application claims the benefit of Provisional Patent Application 62/715,931, filed Aug. 8, 2018, which is hereby incorporated by reference. This application claims the benefit of Provisional Patent Application No. 62/746,688, filed Oct. 17, 2018, 62/740,573, filed Oct. 3, 2018, 62/740,580, filed Oct. 3, 2018, 62/720,478, filed Aug. 21, 2018, 62/720,521, filed Aug. 21, 2018, 62/735,137, filed Sep. 23, 2018, 62/740,558, filed Oct. 3, 2018, 62/748,943, filed Oct. 22, 2018, and 62/715,931, filed Aug. 8, 2018, each of which is hereby incorporated by reference.

In this patent, certain U.S. patents, U.S. patent applications, or other materials (e.g., articles) have been incorporated by reference. Specifically, U.S. Patent Application Nos. 62/746,688, 62/740,573, 62/740,580, 62/720,478, 62/720,521, 62/735,137, 62/740,558, 62/748,943, 62/715,931, Ser. Nos. 15/272,752, 15/949,708, 16/048,179, 16/048,185, 16/163,541, 16/163,562, 16/163,508, 16/185,000, 16/041,286, 16/422,234, 15/406,890, 14/673,633, 15/676,888, 16/163,530, 16/297,508, 15/614,284, 15/955,480, 15/425,130, 15/955,344, 15/243,783, 15/954,335, 15/954,410, 15/257,798, 15/674,310, 15/224,442, 15/683,255, 14/817,952, 15/619,449, 16/198,393, 15/447,450, 15/447,623, 15/951,096, 16/270,489, 15/924,176, 16/024,263, 16/203,385, 15/647,472, 15/462,839, 16/239,410, 16/353,019, 15/447,122, 16/393,921, 16/440,904, 15/673,176, 16/058,026, 14/970,791, 16/375,968, 15/432,722, 16/238,314, 14/941,385, 16/279,699, 16/041,470, 16/389,797, 15/706,523, 16/241,436, 15/377,674, and 16/427,317, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robotic surface cleaning devices.

BACKGROUND

Autonomous and semi-autonomous robotic surface cleaning devices have become increasingly popular within consumer homes. However, robotic surface cleaning devices often require repeat coverage of the working surface in order to collect or clean all debris. Several solutions for increasing the efficiency of these robotic surface cleaning devices have been attempted. For example, robotic vacuums have been equipped with denser brushes and more powerful vacuuming motors in an attempt to reduce the amount of debris left behind after coverage of the working surface. An alternative solution implements movement patterns with repeat coverage such that robotic surface cleaning devices cover areas more than once, however this solution increases the length of time required to adequately service an area.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a robotic surface cleaning device, including a casing, a chassis, a set of wheels coupled to the chassis to drive the robotic surface cleaning device, a control system to instruct movement of the set of wheels, a battery to provide power to the robotic surface cleaning device, one or more sensors, a processor, rotating assembly, including a plate supported by a base of the casing, rotating mechanism to rotate the plate; and one or more cleaning apparatuses mounted to a first side of the plate.

Some embodiments include a robotic surface cleaning device, including a casing, a chassis, a set of wheels coupled to the chassis to drive the robotic surface cleaning device, a control system to instruct movement of the set of wheels, a battery to provide power to the robotic surface cleaning device, one or more sensors, a processor, a rotating assembly, including a plate supported by a base of the casing, an axle coupled to the plate, an electrical motor coupled to the axle to rotate the plate, and one or more cleaning apparatuses mounted to a first side of the plate.

Some embodiments include a robotic surface cleaning device, including, a casing, a chassis, a set of wheels coupled to the chassis to drive the robotic surface cleaning device, a control system to instruct movement of the set of wheels, a battery to provide power to the robotic surface cleaning device, one or more sensors, a processor, a rotating assembly, including, a plate supported by a base of the casing, a gear set coupled to the plate and the set of wheels, and one or more cleaning apparatuses mounted to a first side of the plate, wherein rotation of the set of wheels causes rotation of the plate.

The features and advantages described in the specification are not exclusive and, in particular, many additional features and advantages will be apparent to one of ordinary skill in the art in view of the drawings, specification, and claims. Moreover, it should be noted that the language used in the specification has been principally selected for readability and instructional purposes and should not be read as limiting.

BRIEF DESCRIPTION OF DRAWINGS

FIGS. 16A and 16B illustrates an example of a triangle path mode development method, according to some embodiments.

FIG. 32 illustrates an example of a table utilized to determine turning angles in a triangle cleaning pattern, according to some embodiments.

DETAILED DESCRIPTION OF SOME EMBODIMENTS

Figure 1:
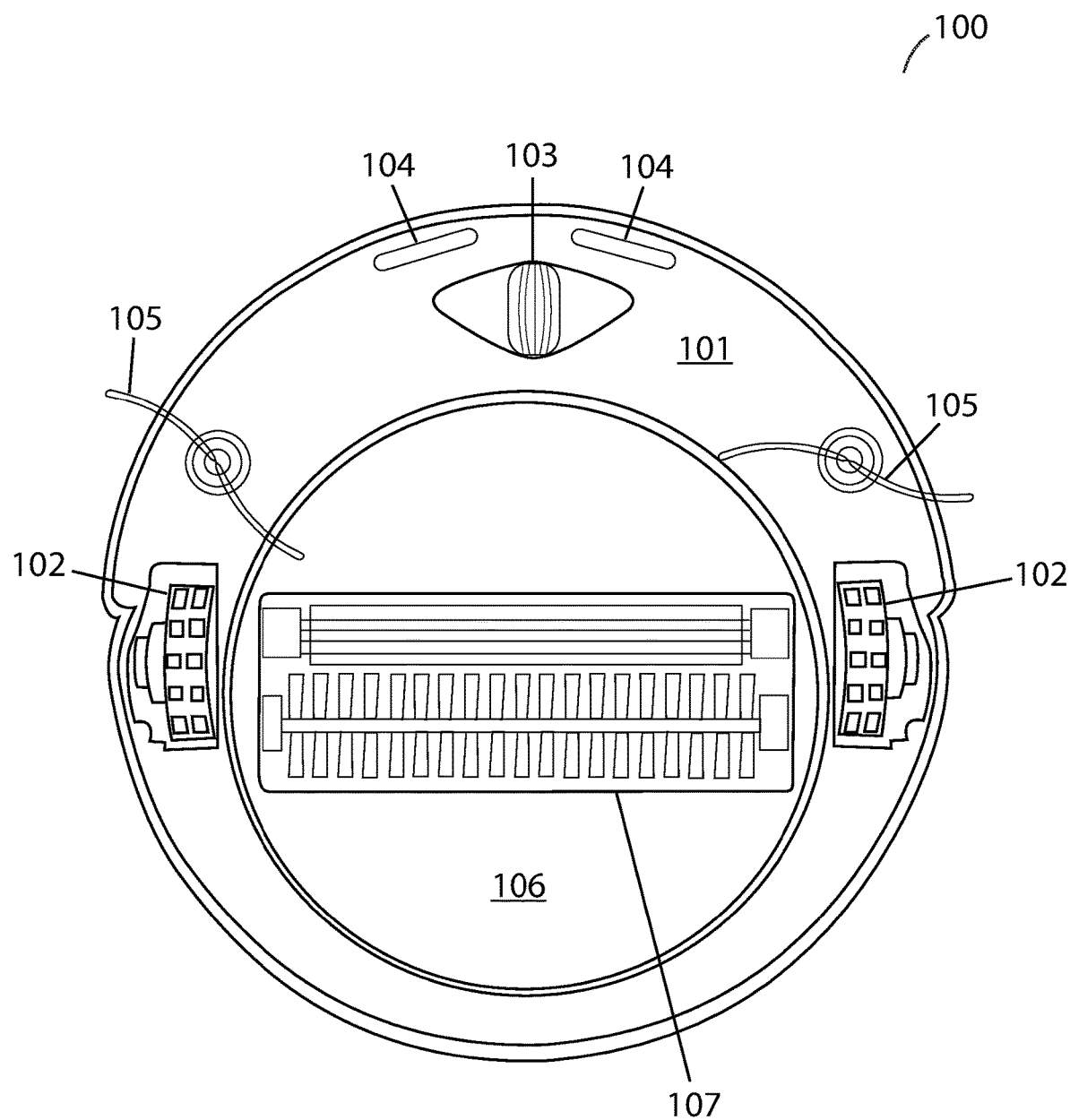
FIG. 1 illustrates a bottom view of a robotic surface cleaning device with a rotating cleaning assembly, according to some embodiments.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

In some embodiments, a robotic surface cleaning device may include one or more autonomous or semi-autonomous robotic devices having communication, mobility, actuation and/or processing elements. For example, a robotic surface cleaning device may include, but is not limited to include, a casing, a chassis including a set of wheels, a motor to drive the wheels, a receiver that acquires signals transmitted from, for example, a transmitting beacon, a transmitter for transmitting signals, a processor, a memory, a controller, tactile sensors, obstacle sensors, a mapping system, network or wireless communications, radio frequency communications, power management such as a rechargeable battery, one or more clock or synchronizing devices, a vacuum motor to provide suction, a debris dustbin to store debris, a brush to facilitate collection of debris, and a means to spin the brush. The processor may, for example, receive and process data from internal or external sensors, execute commands based on data received, control motors such as wheel motors and vacuum impeller, map the environment, and localize the robot. In some embodiments, at least a portion of the sensors of the robotic surface cleaning device are provided in a sensor array, wherein the at least a portion of sensors are coupled to a flexible, semi-flexible, or rigid frame. In some embodiments, the frame is fixed to a chassis or casing of the robotic surface cleaning device. In some embodiments, the sensors are positioned along the frame such that the field of view of the robot is maximized while the cross-talk or interference between sensors is minimized. In some cases, a component may be places between adjacent sensors to minimize cross-talk or interference. Further details of a sensor array are described in U.S. Patent Application No. 62/720,478, the entire contents of which is hereby incorporated by reference.

Some embodiments provide a robotic surface cleaning device with a rotating assembly. In some embodiments, the rotating assembly includes a plate with attached components such as, one or more cleaning apparatuses, a vacuum motor and a debris container, and at least a portion of a mechanism for rotating the plate. For example, the rotating assembly may comprise one of two components of a rotating mechanism, such as a gear, while the other portion of the rotating mechanism may be attached to the casing of the robotic surface cleaning device. In some embodiments, the plate of the rotating assembly may be positioned at a base of the casing of the robotic surface cleaning device, such that the plate may be supported by the floor of the casing. In some embodiments, the floor of the casing includes an opening such that a first side of the plate facing towards a driving surface is exposed. In some embodiments, one or more cleaning apparatuses are attached to the first side of the plate such that they may clean the driving surface. In some embodiments, the plate rotates in a plane parallel to the working surface. In some embodiments, the size of the opening is such that the plate remains supported by the floor of the casing when rotated 360 degrees in a plane parallel to the driving surface. In some instances, the casing of the robotic surface cleaning device may house components such as, one or more wheel motors, a processor, a controller, a memory, sensors, etc. The casing may also house at least a portion of a mechanism for rotating the plate. For example, the casing may house a fixed motor with a rotating shaft, the rotating shaft fixed to the plate for rotation. As the plate rotates the attached cleaning apparatuses pass one or more times over the portion of the work surface covered by the robotic surface cleaning device. The number of times the cleaning apparatuses pass over the area covered is dependent on the rotational speed of the plate and the speed of the robotic surface cleaning device. In some embodiments, the rate of rotation of the plate may be such that the plate, and hence cleaning apparatuses, rotate 360 degrees at least twice while covering at least a portion of the same area. In some embodiments, the processor adjusts the rotational speed of the plate based on the speed of the robotic surface cleaning device. This increase in coverage in addition to the added friction between cleaning apparatuses and the working surface from rotation of the plate results in a more thoroughly cleaned area. Cleaning apparatuses may include, but are not limited to, roller brushes, a mop, a mopping pad, a cleaning cloth, a rotating brush, a flat brush, a dusting pad, a polishing pad, etc. In some cases, there are no cleaning apparatus and suction from the motor may be solely used in cleaning the area.

Several different mechanisms for rotating the plate may be used. In some embodiments, an electrically driven mechanism may be used to rotate the plate of the rotating assembly. For example, the plate of the rotating assembly may be used as a gear, having gear teeth included around the edges of the plate. The gear teeth of the plate may interact with a gear rotationally driven by an electric motor and attached to the casing of the robotic surface cleaning device, whereby rotation of the gear by the electric motor causes rotation of the plate. In another example, a fixed electric motor with rotating shaft housed within the casing of the robotic surface cleaning device may be used to rotate the plate. The rotating shaft may be centrally fixed to the plate of the rotating assembly such that rotation of the shaft by the electric motor causes rotation of the plate. In other embodiments, a mechanically driven mechanism may be used to rotate the plate. For example, an axle of one or more wheels may be coupled to a gear set indirectly (e.g., through an additional component coupled to the plate that interfaces with the gear set) or directly (e.g., through gear teeth included around the perimeter of the plate that interface with the gear set) coupled to the plate, such that rotation of the wheels causes rotation of the plate.

In one embodiment, the plate of the rotating assembly rotates in a clockwise direction while in other embodiments the plate rotates in a counterclockwise direction. In some embodiments, the plate may rotate in either direction. In some embodiments, the plate may rotate in one or more directions for a predetermined number of rotations. In some embodiments, the direction of rotation or rotation in one or more directions for a predetermined number of rotations or any other setting may be provided by user input or determined by the processor. For example, a user may specify that the direction of rotation of the plate be reversed after every 50 rotations in one direction. In some embodiments, the user uses a graphical user interface (GUI) of an application of a communication device paired with the processor of the robotic surface cleaning device to provide user inputs. Examples of a GUI of an application used for communication with a processor of a robotic device are provided in U.S. patent application Ser. Nos. 15/272,752 and 15/949,708, the entire contents of which are hereby incorporated by reference. In another example, the processor may determine the direction of rotation of the plate based on a previous direction of rotation of the plate during a previous working session. In some embodiments, the plate rotates in one or more directions for a predetermined amount of time. For example, the processor may rotate the plate in a first direction for 30 minutes during a slower deeper cleaning of an area, then in a second direction for 20 minutes during a faster clean of the same area. In some embodiments, rotation of the plate may be activated or deactivated during operation. In some embodiments, rotation of the plate may be activated during a portion of a working session and deactivated during another portion of the working session. In some embodiments, rotation of the plate may be activated in certain areas of an environment and deactivated in other areas of the environment. In some embodiments, the speed of rotation of the plate may be adjusted by the user or autonomously by the processor based on the driving speed of the robot, the amount of debris accumulation in different areas of the environment, the desired type of cleaning (e.g., deep cleaning), etc. In some embodiments, the plate may oscillate by rotating a predetermined number of degrees in a first direction before rotating a predetermined number of degrees in a second direction, resulting in an oscillating motion. In some embodiments, the number of degrees of rotation may be adjusted. For example, the plate may rotate 270 or 180 degrees before rotating the same number of degrees in the opposite direction. In some embodiments, the number of degrees of rotation in the first direction and the second direction are different. In some embodiments, the speed of rotation in the first direction and second direction are different.

In some embodiments, electrical contacts may be placed on the floor of the casing and on the first side of the plate such that the electrical contacts on the casing are in constant contact with the electrical contacts on the first side of the plate during rotation of the plate. In some embodiments, the battery provides electrical power to the electrical contacts positioned on the floor of the casing which may be transferred to the electrical contacts of the plate. In this manner, electrical power may continuously flow to electrical components mounted to the plate of the rotating assembly.

FIG. 1 illustrates a bottom view of robotic surface cleaning device 100 with plate 106 of a rotating assembly. Casing 101 of robotic surface cleaning device 100 houses stationary components, including but not limited to, driving wheels 102, steering wheel 103, a processor (not shown), batteries (not shown), and a means to rotate the rotating assembly 106 (not shown). Casing 101 may further house other components without limitation. Components shown are included for illustrative purposes and are not intended to limit the invention to the particular design shown. In the example shown, casing 101 further houses sensors 104 and side brushes 105. Plate 106 is supported by a floor of casing 101 and rotates at a predetermined speed with respect to static casing 101. Plate 106 includes attached cleaning apparatuses, in this case brushes 107, vacuum motor (not shown), and debris container (not shown). In other embodiments, plate 106 may include additional attached components or any other combination of attached components than what is shown. For example, plate 106 may include an attached liquid container that dispenses cleaning liquid to an attached mopping pad.

Figure 2A:
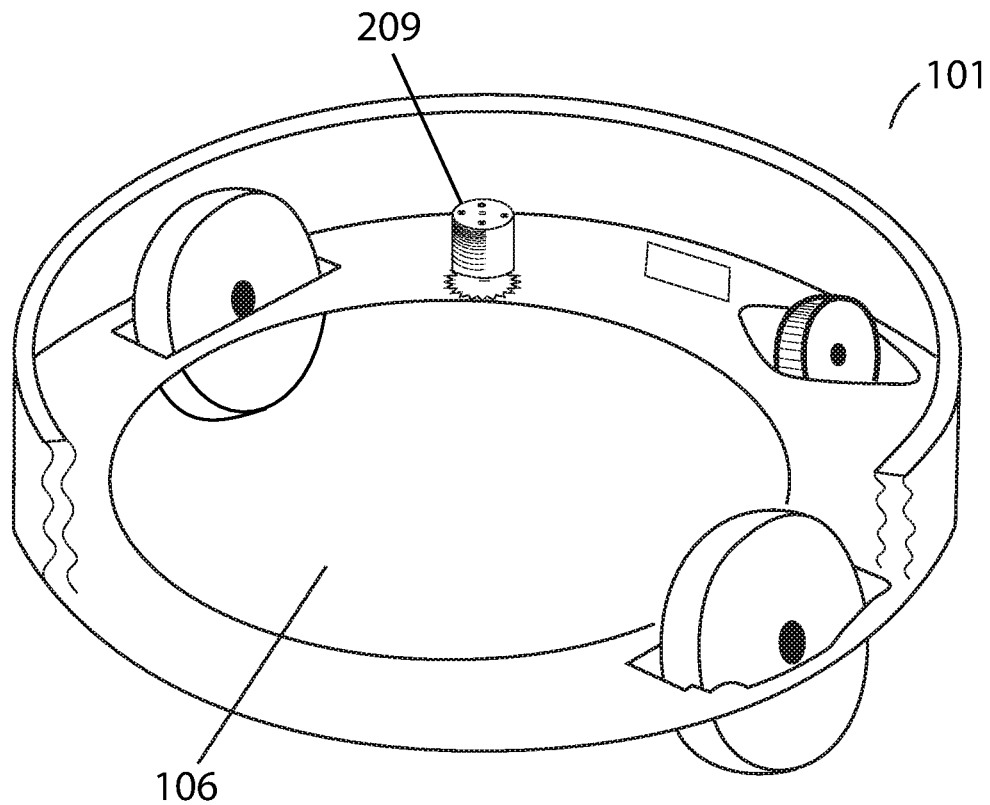
FIG. 2A illustrates a perspective view of a casing of a robotic surface cleaning device, according to some embodiments.
Figure 2B:
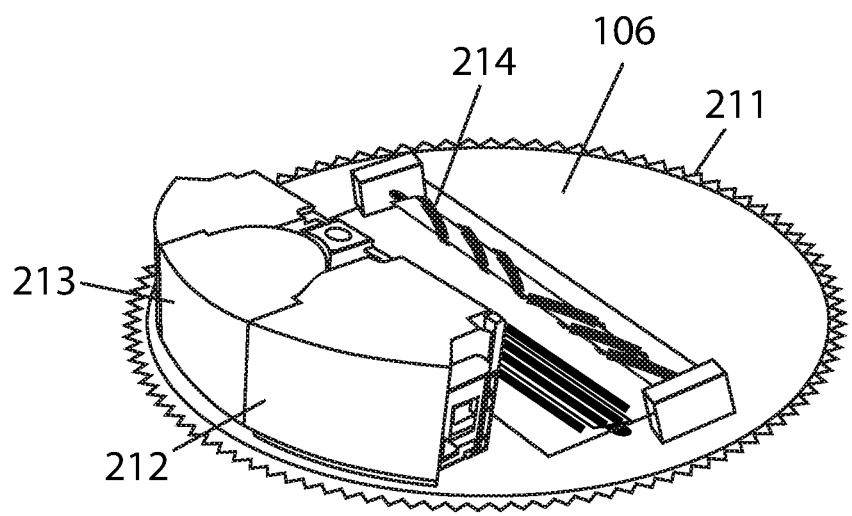
FIG. 2B illustrates a perspective view of a rotating cleaning assembly of a robotic surface cleaning device, according to some embodiments.

FIG. 2A illustrates a perspective view of casing 101 of robotic surface cleaning device 100. Plate 106 fits within opening 208 in casing 101. The diameter of opening 208 is smaller than the diameter of plate 106 such that plate 106 may be supported by casing 101 when rotated 360 degrees. Electric motor driven gear 209 rotates plate 106. FIG. 2B illustrates a perspective view of the rotating assembly of robotic surface cleaning 100 including plate 106 with attached debris container 212, vacuum motor 213, and cleaning apparatus 214. In this example, plate 106 includes gear teeth surrounding the perimeter used in rotating plate 106. An electrically driven gear 209 rotates and interacts with gear teeth of plate 106 causing plate 106 to rotate. As robotic surface cleaning device 100 drives through an area, motor and gear set 209 rotate causing plate 106 to rotate in a plane parallel to the working surface. In some embodiments, the rate of rotation of the plate, and hence the cleaning apparatuses, rotate 360 degrees at least twice while covering at least a portion of the same area. The rotational speed of the rotating assembly used to achieve at least two full rotations while covering the same area may be dependent on the speed of the robotic device, where a high rotational speed of the plate is required for a robotic device with increased driving speed.

Figure 3:
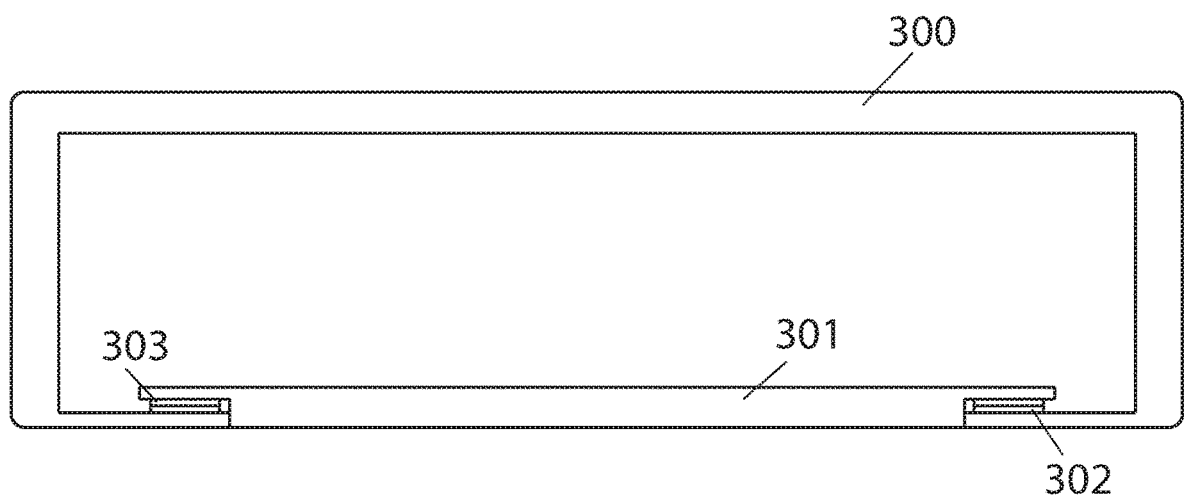
FIG. 3 illustrates a cross-sectional view of a casing and rotating assembly of a robotic surface cleaning device, according to some embodiments.

FIG. 3 illustrates casing 300 of a robotic surface cleaning device with plate 301. In this illustration, there are no components housed within casing 300 or attached to plate 301 for simplicity. The purpose of FIG. 3 is to demonstrate an embodiment, wherein plate 301, supported by the floor of robotic surface cleaning device casing 300, is electrically connected to casing 300 by electrical contacts. Casing 300 includes electrical contacts 302 and plate 301 includes electrical contacts 303. In this configuration, electrical contacts 302 of casing 300 and electrical contacts 303 of plate 301 are in constant connection with one another as plate 301 rotates 360 degrees. This provides any electrical components mounted to plate 301 with electrical power as required during rotation of plate 301.

Figure 4A:
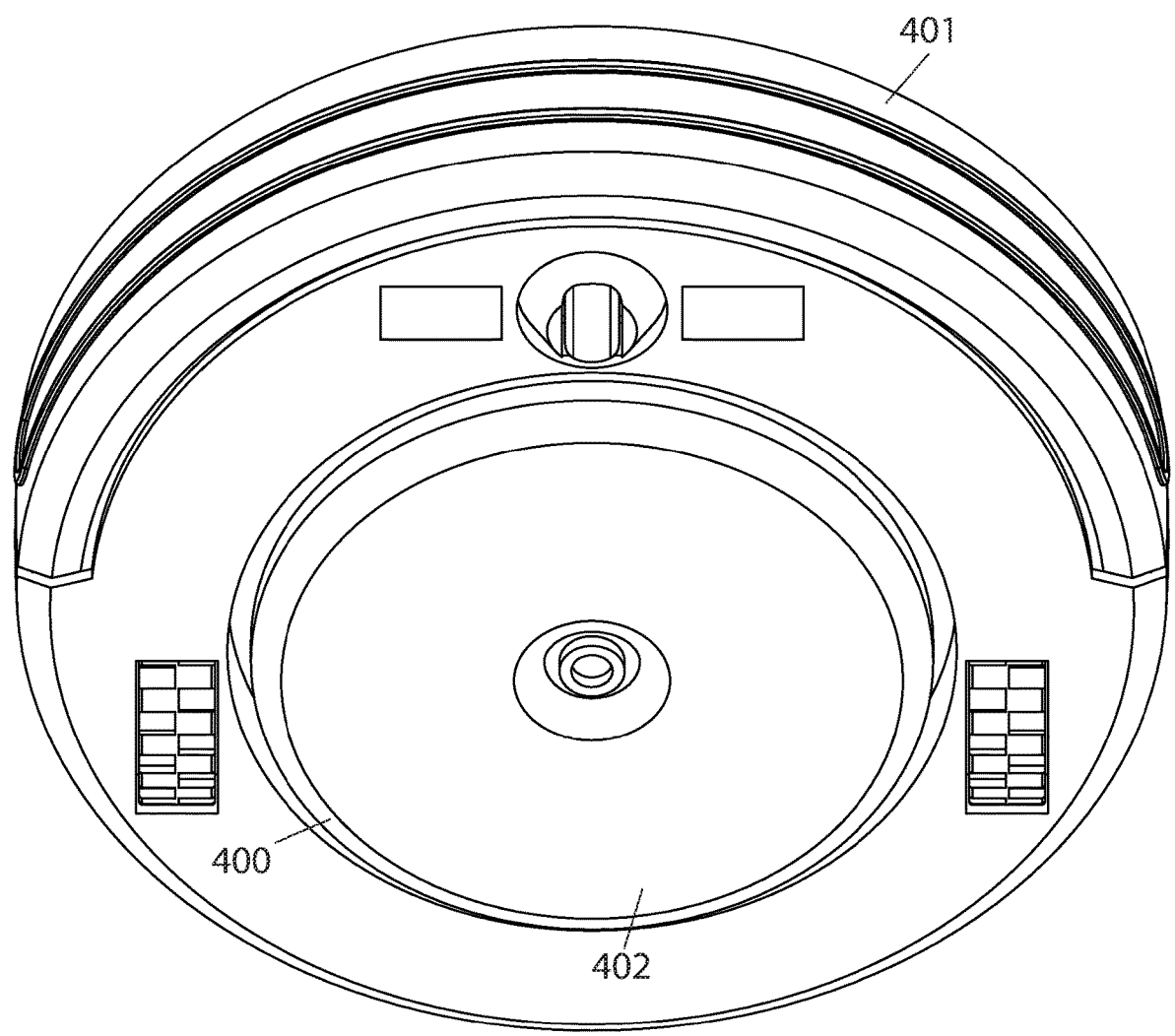
FIGS. 4A and 4B illustrate a rotating cleaning assembly with different cleaning apparatus, according to some embodiments.
Figure 4B:
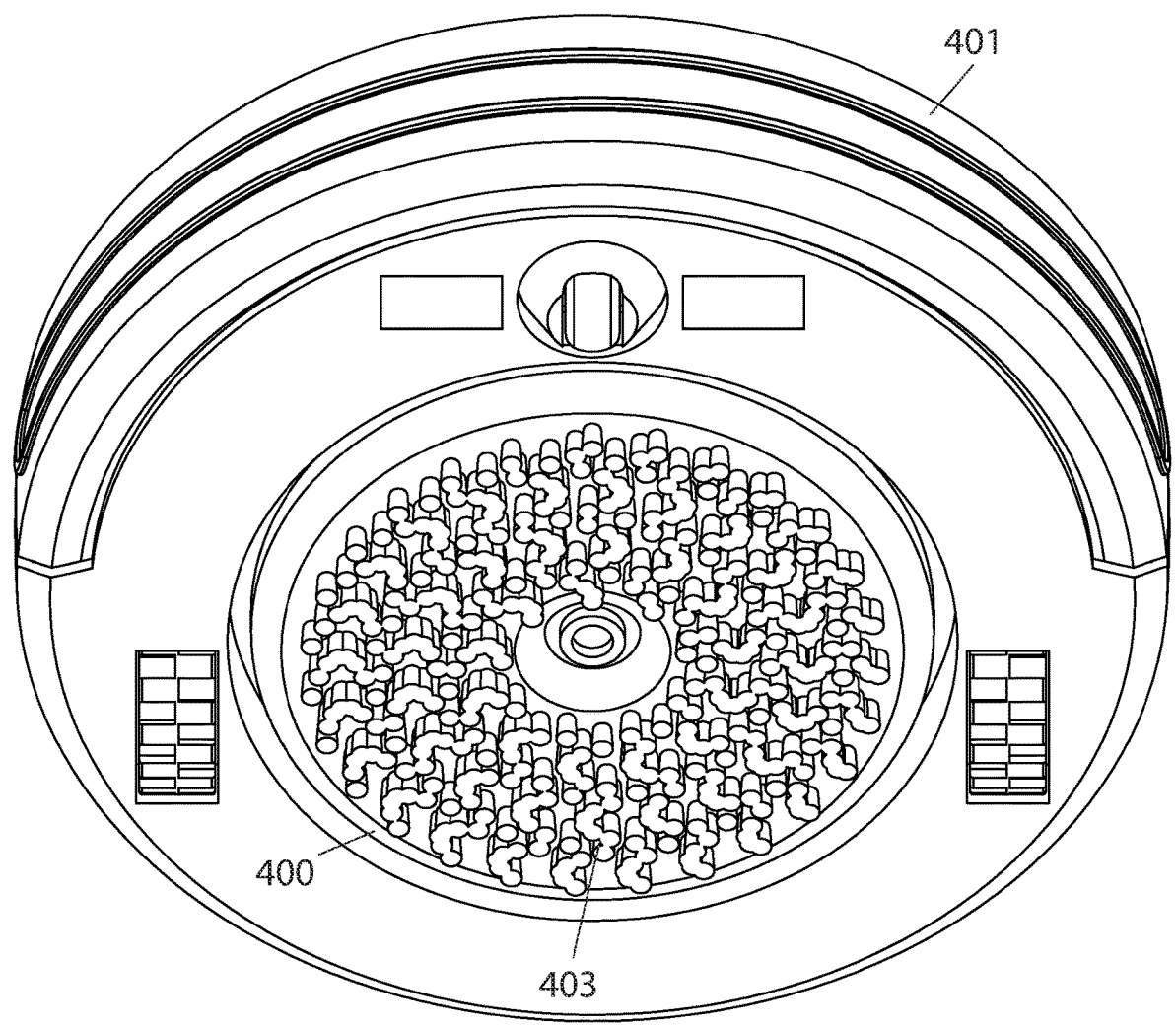

In some embodiments, other types of cleaning apparatuses may be mounted on the plate. For example, FIG. 4A illustrates a bottom perspective view of a rotating plate 400 of a robotic surface cleaning device 401, to which scrubbing pad 402 is attached. FIG. 4B illustrates another example with a mop 403 attached to rotating plate 400.

Figure 5:
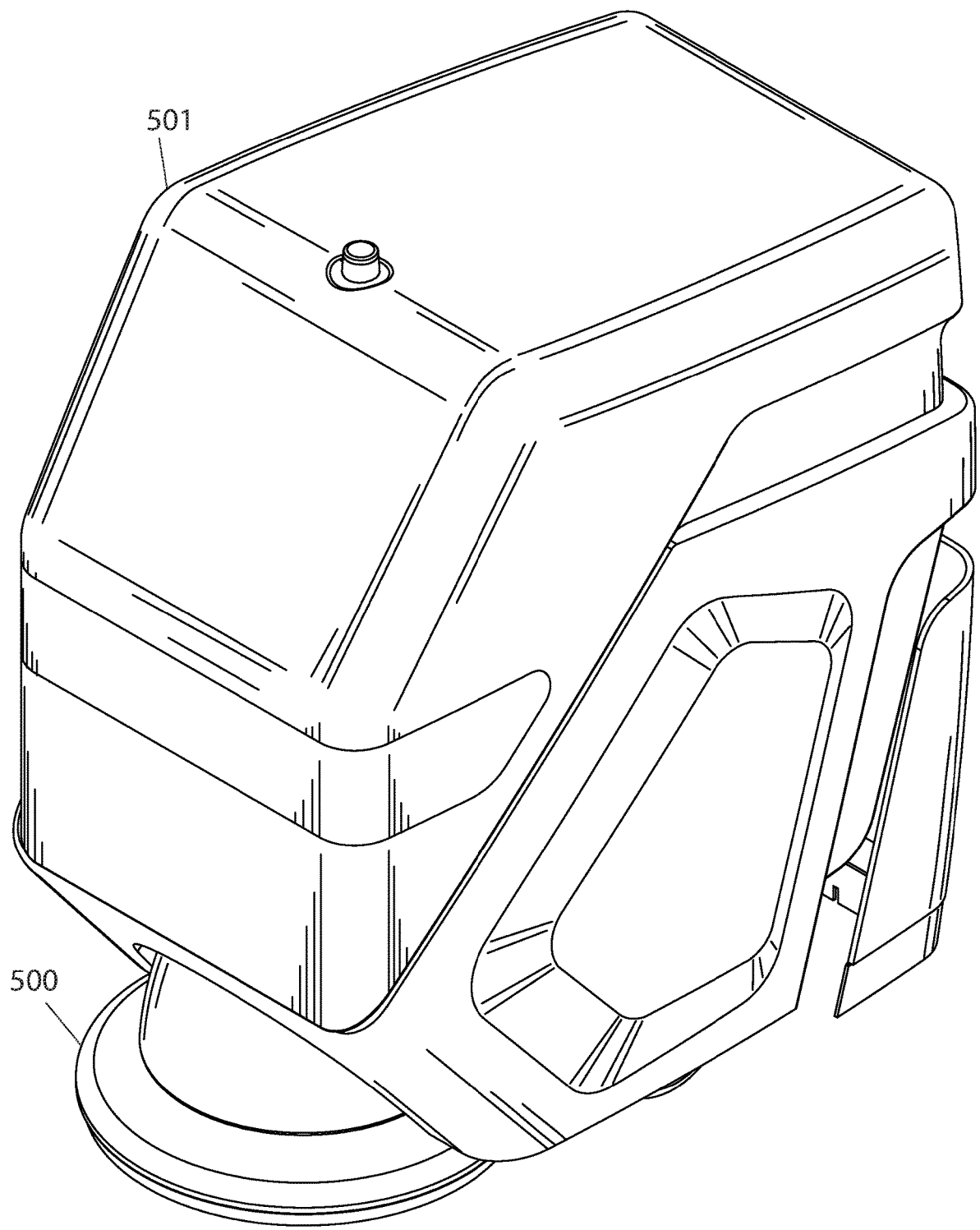
FIG. 5 illustrates a rotating cleaning assembly mounted on a commercial cleaner, according to some embodiments.

In other embodiments, the rotating assembly is implemented in other types of robotic devices or robotic devices of different sizes. For example, FIG. 5 illustrates the rotating assembly 500 mounted on a commercial cleaner 501. The rotating assembly may function the same as described above for the robotic surface cleaning device.

In some embodiments, robotic surface cleaning devices may include helical brushes including segmented blades. The selection of number of segmented blades may be made based on the size of debris anticipated to be cleaned and the size of the robotic device. For example, fewer segmented blades may be selected to capture larger debris more effectively while more segmented blades may be selected to capture smaller debris more effectively. Each of segmented blades may be positioned in a spiral path along hollow blade root. Furthermore, in some embodiments, segmented blades may be positioned equidistant from one another. This positioning allows for two counter-rotating brushes to be interleaved. The rotation of interleaved counter-rotating blades may provide a measure of airflow induction that may improve the ability of the brush assembly to capture debris or liquids. As the two brushes rotate in opposite directions, air may be trapped in a groove between the meshing helix blades of the brushes, causing an increase in the density of air particles and pressure within the groove compared to outside the groove, thereby creating suction. Cut-outs may be sized and positioned in between segmented blades to accommodate clearance of brush guard bars. This allows a portion of the segmented blade to extend beyond the brush guard. In some embodiments, brush guard bars may be useful to prevent intake of cables and the like. An example of counter-rotating brushes is provided in U.S. patent application Ser. No. 15/462,839, the entire contents of which is hereby incorporated by reference. In embodiments, various configurations are possible. For example, the two counter-rotating brushes may be of different length, diameter, shape (e.g., the path along which the blades follow, the number of blades, the shape of blades, size of blades, pattern of blades, etc.), and material while the two brushes are rotatably mounted parallel to the floor surface plane and are positioned a small distance from one another such that the blades at least partially overlap. In some embodiments, the two brushes are positioned different distances from the floor surface while remaining a small distance from one another such that the blades at least partially overlap.

In some embodiments, robotic surface cleaning devices may include one or more side brushes. Examples of side brushes are described in U.S. patent application Ser. Nos. 15/924,176, 16/024,263, and 16/203,385, the entire contents of which are hereby incorporated by reference. In some embodiments, the one or more side brushes may include a side brush cover that reduces the likelihood of entanglement of the side brush with an obstruction. An example of a side brush cover is disclosed in U.S. patent application Ser. No. 15/647,472, the entire contents of which is hereby incorporated by reference.

In some embodiments, the robotic surface cleaning device may include a mop attachment with a pressure actuated valve that provides passive liquid (or fluid) flow pace control. In some embodiments, the removable mop attachment module includes a frame, a reservoir positioned within the frame, one or more drainage apertures positioned on the bottom of the removable mop attachment module that allows liquid to flow out of the reservoir, a breathing aperture, which may allow air into the reservoir, positioned on an upper portion (or on another location in some cases) of the reservoir, and a pressure actuated valve positioned on an inner surface of the reservoir and under the breathing aperture(s), sealing the reservoir while in a closed position and opening when a certain amount of negative air pressure has built up inside the reservoir due to the draining of liquid, letting some air inside the reservoir through the breathing aperture(s). In some embodiments, the pressure actuated valve includes a valve body, adapted for mounting on at least an air passage, a valve member connected to the valve body having at least a flexible element moveable relative to the valve body that forms a seal on the air passage when in a closed position, wherein a certain pressure difference between the two sides of the valve member moves the flexible element from the closed position to an open position letting air enter the air passage. It will be obvious to one skilled in the art that the pressure actuated valve may function with various fluids capable of creating a negative pressure behind the valve and opening the valve. The pressure actuated valve is mounted inside the reservoir it seals the reservoir. When the reservoir is sealed and the liquid inside the reservoir drains through the drainage apertures, a negative pressure builds up inside the reservoir. When the negative pressure gets high enough, the pressure difference between a first and a second side of the valve moves it from a closed position to an open position. This allows some air into the reservoir through the intake apertures, which increases the air pressure inside the reservoir, allowing liquid to drain from the drainage apertures once again until the negative pressure has equalized enough to cause the valve to return to the closed position. Further details of a pressure actuated valve for controlling the release of liquid for mopping are described in U.S. patent application Ser. No. 16/440,904, the entire contents of which is hereby incorporated by reference.

In some embodiments, the robotic surface cleaning device includes a liquid release control mechanism for mopping. In some embodiments, the release of liquid by the control mechanism may be determined by the motion of the robotic surface cleaning device. In some embodiments, the release of liquid by the control mechanism may be determined by the rotary motion of one or more non-propelling wheels of the robotic surface cleaning device. For example, a rotatable cylinder at least partially housed within a liquid reservoir tank with at least one aperture for storing a limited quantity of liquid may be connected to an outside member such as a non-propelling (non-driving) wheel of the robotic surface cleaning device. The cylinder may be connected to the non-propelling wheel directly or via an axle or a gear mechanism such that cylinder rotation may be controlled by the rotation of the wheel. In some embodiments, the axle turns the rotatable cylinder when the rotary motion of one or more non-propelling wheels of the robotic surface cleaning device occurs. In embodiments, the cylinder may be positioned within or adjacent to the liquid reservoir tank. In some embodiments, there is a passage below the cylinder and between the cylinder and a drainage mechanism. Each time the at least one aperture is exposed to the liquid within the reservoir tank, it fills with liquid. As the wheel turns, the connected cylinder is rotated until the aperture is adjacent to the passage. Upon exposure to the passage, the liquid will flow out of the at least one aperture by means of gravity, pass through the passage, and enter the drainage mechanism, whereby the liquid is delivered onto the working surface. In some embodiments, the drainage mechanism disperses liquid throughout a plane. For example, a drainage mechanism may include a hollow body with a perforated underside through which liquid may pass to surfaces below. In some embodiments, the faster the non-propelling wheels rotates, the faster the cylinder turns, the faster the aperture releases liquid into the passage. For example, if the non-propelling wheels rotates twice as fast, the cylinder rotates twice as fast, and the aperture releases liquid into the passage twice as fast. When the rotary motion of the non-propelling wheel halts, the cylinder stops turning and the release of liquid into the passage stops as well. In some embodiments, the speed of the robotic surface cleaning device may be proportional to the rate of the rotary motion of the non-propelling wheels. The above reasoning explains that rapidity of the release of liquid into the passage and the drainage mechanism may be proportional to the speed of the robotic surface cleaning device and/or the rate of the rotary motion of one or more non-propelling wheels.

It should be understood that in some embodiments, a frame to hold the mop module components may be omitted, and the components thereof may be built directly into the robotic surface cleaning device. The size, number, and depth of apertures on the rotatable cylinder as well as the rotation speed of the rotatable cylinder may be modified to adjust the liquid flow rate from the reservoir. In some embodiments, a removable mop module comprising the elements described above may be provided as an attachment to a robotic surface cleaning device. That is, the frame and all components may be removed and replaced. In some embodiments, the liquid flow rate from the reservoir may be adjusted by adding additional cylinders having at least one aperture and corresponding passages.

In some embodiments, the rotatable cylinder with the at least one aperture may be connected to a motor that drives the rotatable cylinder. In some embodiments, a processor of the robotic surface cleaning device may control operation of the motor based on information received from, for example, an odometer or a gyroscope providing information on movement of the robotic surface cleaning device, an optical encoder providing information on rotation of the wheels of the robotic surface cleaning device or its distance travelled, a user interface, floor sensors, a timer, sensors for detecting fluid levels, or other types of components or devices that may provide information that may be useful in controlling the operation of the motor and hence the release of fluid. For example, in some embodiments, the motor may operate based on movement of the robotic surface cleaning device. For instance, if the robotic surface cleaning device is static the motor does not operate, in which case liquid does not vacate the liquid reservoir. In other embodiments, the motor may become operational at predetermined intervals wherein intervals may be time based or based on the distance travelled by the robotic surface cleaning device or based on any other metric. In some embodiments, the motor may become operational upon the detection of a particular floor type, such as hardwood or tiled flooring. In some embodiments, the motor may become operational upon the detection of a mess on the floor. In some embodiments, the motor may become operational based on whether or not the wheels of the robotic surface cleaning device are rotating. In some embodiments, a user of the robotic surface cleaning device may control the operation of the motor and hence the release of cleaning fluid by, for example, pushing a button on the robotic surface cleaning device or on a remote control or on a graphical user interface of an application of a communication device (e.g., mobile phone, tablet, laptop, etc.). In some embodiments, the motor controlling the cylinder and hence the release of fluid may automatically cease operation upon detecting the depletion of the fluid within the reservoir.

In some embodiments, the motor may operate at varying speeds thereby controlling the speed of the cylinder and release of fluid. For example, if the motor is operating at a high speed, liquid is released more frequently. Therefore, if the speed of the robotic surface cleaning device is maintained yet the speed of the motor is increased, more liquid will be dispersed onto the work area. If the motor is operating at a lower speed, liquid is released less frequently. Therefore, if the speed of the robotic surface cleaning device is maintained yet the power of the motor is decreased, less liquid will be dispersed onto the work area. In some embodiments, the processor of the robotic surface cleaning device may control the speed of the motor. In some embodiments, the speed of the motor may be automatically adjusted by the processor based on the speed of the robotic surface cleaning device, the type of floor, the level of cleanliness of the work area, and the like. For example, floor sensors of the robotic surface cleaning device may continually send signals to the processor indicating the floor type of the work surface. If, for instance, the processor detects a carpeted work surface based on the sensor data, then the processor may cease operation of the motor, in which case liquid will not be released onto the carpeted surface. However, if the processor detects a hard floor surface, such as a tiled surface, the processor may actuate the motor thereby rotating the cylinder and releasing cleaning liquid onto the floor. In some embodiments, the processor may be able to differentiate between different hard floor surface types and direct actions accordingly. For example, mopping on a hardwood floor surface may damage the hardwood floor. If during a mopping sequence the processor detects that the floor has transitioned from a tiled surface to a hardwood surface based on sensor data, the processor may cease operation of the mopping mechanism. In some embodiments, the speed of the motor may be increased and decreased during operation by the processor. In some embodiments, the user of the robotic surface cleaning device may increase or decrease the speed of the motor and hence the amount of fluid released by, for example, a button on the robotic surface cleaning device or a remote control or other communication device. Further details of a mopping module with controlled liquid release are provided in U.S. patent application Ser. Nos. 15/673,176 and 16/058,026, the entire contents of which are hereby incorporated by reference.

In some instances, the mopping module includes a reservoir and a water pump driven by a motor that delivers water from the reservoir indirectly or directly to the driving surface. In some embodiments, the water pump autonomously activates when the robotic surface cleaning device is moving and deactivates when the robotic surface cleaning device is stationary. In some embodiments, the water pump includes a tube through which fluid flows from the reservoir. In some embodiments, the tube may be connected to a drainage mechanism into which the pumped fluid from the reservoir flows. In some embodiments, the bottom of the drainage mechanism includes drainage apertures. In some embodiments, a mopping pad may be attached to a bottom surface of the drainage mechanism. In some embodiments, fluid is pumped from the reservoir, into the drainage mechanism and fluid flows through one or more drainage apertures of the drainage mechanism onto the mopping pad. In some embodiments, flow reduction valves are positioned on the drainage apertures. In some embodiments, the tube may be connected to a branched component that delivers the fluid from the tube in various directions such that the fluid may be distributed in various areas of a mopping pad. In some embodiments, the release of fluid may be controlled by flow reduction valves positioned along one or more paths of the fluid prior to reaching the mopping pad.

In some embodiments, the robotic surface cleaning device includes a mopping extension. In some embodiments, a mopping extension may be installed in a dedicated compartment in the chassis of a robotic surface cleaning device. In some embodiments, a cloth positioned on the mopping extension is dragged along the work surface as the robotic surface cleaning device drives through the area. In some embodiments, nozzles direct fluid from a cleaning fluid reservoir to the mopping cloth. The dampened mopping cloth may further improve cleaning efficiency. In some embodiments, the mopping extension includes a means for moving back and forth in a horizontal plane parallel to the work surface during operation. In some embodiments, the mopping extension includes a means for moving up and down in a vertical plane perpendicular to the work surface to engage or disengage the mopping extension. In some embodiments, a detachable mopping extension may be installed inside a dedicated compartment within the chassis of a robotic surface cleaning device. In some embodiments, the nozzles continuously deliver a constant amount of cleaning fluid to the mopping cloth. In some embodiments, the nozzles periodically deliver predetermined quantities of cleaning fluid to the cloth. In some embodiments, ultrasonic oscillators vaporize fluid continuously at a low rate to continuously deliver vapor to the mopping cloth. In some embodiments, the ultrasonic oscillators turn on at predetermined intervals to deliver vapor periodically to the mopping cloth. In some embodiments, a heating system may alternatively be used to vaporize fluid. For example, an electric heating coil in direct contact with the fluid may be used to vaporize the fluid. The electric heating coil may indirectly heat the fluid through another medium. In other examples, radiant heat may be used to vaporize the fluid. In some embodiments, water may be heated to a predetermined temperature then mixed with a cleaning agent, wherein the heated water is used as the heating source for vaporization of the mixture. In some embodiments, fluid is dispersed directly to the driving surface of the robotic surface cleaning device. In some embodiments, the mopping extension includes a means to vibrate the mopping extension during operation. Further details of a mopping extension for robotic surface cleaning devices are provided in U.S. patent application Ser. Nos. 14/970,791 and 16/375,968, the entire contents of which are hereby incorporated by reference.

In some embodiments, the robotic surface cleaning device includes a steam cleaning apparatus. A reservoir is positioned within the robotic surface cleaning device. Ultrasonic oscillators are connected to the reservoir and vaporize the water to produce steam. Other means for vaporizing water, such as heating systems, are well known and may be used in place of ultrasonic oscillators without departing from the scope of the invention. Nozzles deliver the steam to an area to receive steam. In some embodiments, an area to receive steam might be the surface or floor that the robotic surface cleaning device is driving and working on. In some embodiments, a mopping cloth is disposed under the nozzles to facilitate mopping or wiping of a work surface. In some embodiments, the nozzles continuously deliver a substantially constant flow of steam to the mopping cloth. In some embodiments, the nozzles periodically deliver predetermined quantities of steam to the cloth. Further details of a steam cleaning apparatus for robotic surface cleaning devices are provided in U.S. patent application Ser. Nos. 15/432,722 and 16/238,314, the entire contents of which are hereby incorporated by reference.

In some embodiments, a mopping cloth is detachable from the main body or a cleaning apparatus of the robotic surface cleaning device. In some embodiments, the mopping cloth may be reusable. Various securing methods may be used, such as clamps, magnets, Velcro, etc. For example, a mopping cloth may be detachable from a portion of a bottom surface of a robot chassis or a cleaning apparatus of the robot (e.g., dustbin or fluid reservoir). In one example a mopping cloth is slidingly coupled to a bottom of a robotic surface cleaning device on a first side. The bottom of robotic surface cleaning device includes a groove into which a lip positioned along the first side of mopping cloth may slide. After sliding the first side of the mopping cloth into position on the bottom of the chassis the opposite side of the mopping cloth may be secured to the bottom of the chassis as well using Velcro or magnets, for example. In some embodiments, the mopping cloth includes the groove and the bottom of the chassis of the robot includes the lip. In some embodiments, both sides of the mopping cloth are secured to the bottom of the robot using a groove and lip mechanism as described. In some embodiments, the side of the mopping cloth on which the groove and lip mechanism is positioned may vary depending on the movement of the robotic surface cleaning device and the likelihood of the Velcro or magnets detaching. In some embodiments, the groove and lip sliding mechanism may be used on any side of the mopping cloth and more than one groove and lip sliding mechanism may be used.

In some embodiments, water is placed within a liquid reservoir of the robotic surface cleaning device and the water is reacted to produce hydrogen peroxide for cleaning and disinfecting the floor as the robot moves around. In some embodiments, the liquid reservoir may be a part of an extension module, a replacement module, or built into the robot. In some embodiments, the process of water electrolysis may be used to generate the hydrogen peroxide. In some embodiments, the process includes water oxidation over an electrocatalyst in an electrolyte, that results in hydrogen peroxide dissolved in the electrolyte which may be directly applied to the working surface or may be further processed before applying it to the working surface.

In some embodiments, the wheels of the robotic surface cleaning device include a wheel suspension system. An example of a dual wheel suspension system is described in U.S. patent application Ser. Nos. 15/951,096 and 16/270,489, the entire contents of which are hereby incorporated by reference. Other examples of wheel suspension systems that may be used are described in U.S. patent application Ser. Nos. 15/447,450, 15/447,623, 62/720,521, and Ser. No. 16/389,797, the entire contents of which are hereby incorporated by reference. In some embodiments, the different wheel suspension systems may be used independently or in combination. In some embodiments, the wheels of the robotic surface cleaning device are expandable mecanum wheels, as described in U.S. patent application Ser. Nos. 15/447,450 and 15/447,623, the entire contents of which are hereby incorporated by reference. In some embodiments, one or more wheels of the robotic surface cleaning device are driven by one or more electric motors. For example, a wheel may include a wheel gear and may be driven by one or more output gears of one or more corresponding electric motors that interface with the wheel gear. The processor of the robotic surface cleaning device may autonomously activate each of the one or more output gears independently of one another depending on the amount of torque required. For example, the processor may detect an obstacle on the driving surface and may activate all electric motors of the output gears as a large amount of torque may be required to overcome the obstacle. Output gears may rotate when deactivated. In other embodiments, any number of output gears interfacing with the wheel gear may be used. In some embodiments, a brushless DC wheel motor may be positioned within a wheel of the robotic surface cleaning device. For example, the wheel with motor may include a rotor with magnets, a bearing, a stator with coil sets, an axle and tire each attached to rotor. Each coil set may include three separate coils, the three separate coils within each coil set being every third coil. The rotor acts as a permanent magnet. DC current is applied to a first set of coils causing the coils to energize and become an electromagnet. Due to the force interaction between the permanent magnet (i.e., the rotor) and the electromagnet (i.e., the first set of coils of the stator), the opposite poles of the rotor and stator are attracted to each other, causing the rotor to rotate towards the first set of coils. As the opposite poles of the rotor approach the first set of coils, the second set of coils are energized and so on, and so forth, causing the rotor to continuously rotate due to the magnetic attraction. Once the rotor is about to reach the first coil set a second time, the first coil set is energized again but with opposite polarity as the rotor has rotated 180 degrees. In some embodiments, two set of coils are energized simultaneously to increase the torque. In some embodiments, the processor uses data of a wheel sensor (e.g., halls effect sensor) to determine the position of the rotor, and based on the position determines which pairs of coils to energize.

In some embodiments, the robotic surface cleaning device recharges one or more rechargeable batteries at a docking station. Examples of a docking station are described in U.S. patent application Ser. Nos. 15/706,523, 16/241,436, and 15/377,674, the entire contents of which are hereby incorporated by reference. In some embodiments, the docking station is further used to remove the waste collected by the robotic surface cleaning device during one or more cleaning cycles. In some embodiments, the waste collected by the robotic surface cleaning device is unloaded into a compartment of the docking station when the robotic surface cleaning device is docked using one or more hollow extendable members. In some embodiments, the one or more extendable members extend from within the docking station when the robotic surface cleaning device is approaching for docking or has docked at the docking station. In some embodiments, the one or more extendable members connect with one or more openings of the robotic surface cleaning device. In some embodiments, the one or more openings are positioned on a dustbin or other components of the robotic surface cleaning device. In some embodiments, the one or more openings open for connections with the one or more extendable members with the robotic surface cleaning device is approaching for docking or has docked. In some embodiments, the one or more extendable members lock into place when connected with the one or more openings until unloading of the waste is complete. In alternative embodiments, the robotic surface cleaning device includes the one or more extendable members and the docking station includes the one or more openings to which the one or more extendable members connect for unloading of waste from the robotic surface cleaning device to the docking station. While this alternative embodiment may not be described throughout, it may be used in carrying out the methods and techniques described herein.

In some embodiments, the docking station further includes one or more impellers driven by an electric motor to generate a vacuum for suctioning waste from the robotic surface cleaning device through the one or more extendable members. In some embodiments, the electric motor of the one or more impellers activates upon a secure connection between the one or more extendable members of the docking station and the one or more openings of the robot. In other embodiments, the electric motor of the one or more impellers may activate upon docking. In some embodiments, the one or more openings are positioned on a dustbin and the docking station injects air into the dustbin through at least one extendable member and unloads waste from the dustbin through at least one other extendable member. In some embodiments, a motorized fan of the docking station is used inject air into the dustbin. In some embodiments, a motorized fan of the robotic surface cleaning device is used to suction air into the dustbin. In some embodiments, a motorized fan of the robotic surface cleaning device is used to push the waste out of the dustbin, through at least one extendable member, and into the docking station. In some embodiments, the dustbin is sanitized after unloading the waste using, for example, UV radiation, a sanitizing spray, and the like. In some embodiments, a single extendable member including two or more separate chambers is used for removal of waste and injection of air into the dustbin.

In some embodiments, the one or more extendable members connect to one or more openings positioned on one or more liquid containers of the robotic surface cleaning device. In some embodiments, the docking station removes liquid waste (e.g., used cleaning fluid or liquid cleaned off of a floor) from a liquid container of the robot through at least one extendable member. In some embodiments, the docking station will load liquid into a liquid container of the robot through at least one extendable member. In some embodiments, liquid waste is removed from the liquid container of the robotic surface cleaning device using a motorized fan of the dustbin, a liquid pump, or gravitational forces (e.g., the opening is on a bottom surface of the liquid container such that the liquid waste free flows from the liquid container). In some embodiments, liquid is loaded into the liquid container of the robot using similar methods or another method. In some embodiments, after liquid waste is removed from a liquid container of the robotic surface cleaning device, the same liquid container is loaded with another liquid. In some embodiments, the liquid container is sanitized after removing the liquid waste and prior to loading the liquid container with another liquid using, for example, UV radiation, a sanitizing spray, and the like.

In some embodiments, the shape of the dustbin is a cylinder. In some embodiments, the dustbin spins immediately before removing the waste from the dustbin into the docking station. The spinning action forces the waste to the edge of the cylindrical dustbin which is then removed from the dustbin into the docking station using suction forces.

In some embodiments, the one or more extendable members and the one or more openings are magnetic, the two components connecting with one another using magnetic forces. In some embodiments, the magnetic forces may be activated and deactivated. In alternative embodiments, other means for connecting the one or more extendable members with the one or more openings may be used. For example, a clamping mechanism, a locking mechanism, or the like may be used.

In some embodiments, the one or more extendable members extend from and retract into the docking station. In some embodiments, the one or more extendable members are static. In embodiments, the one or more extendable members may be of various shapes and sizes. In embodiments, the one or more extendable members may be positioned oriented on the docking station in various ways.

In some embodiments, the robotic surface cleaning device includes a dustbin and one or more balls positioned within the dustbin. In some embodiments, waste collects along the surface and within the one or more balls. In some embodiments, the one or more balls move randomly within the dustbin as the robotic surface cleaning device traverses the environment. As the one or more balls roll around, they collect the waste that has collected within the dustbin. In some embodiments, the one or more balls collect waste immediately as it enters the dustbin from an inlet of the dustbin. In some embodiments, collect waste is directed towards the one or more balls.

In some embodiments, the one or more balls are of the same size or of different sizes. In some embodiments, the one or more balls are of a mesh pattern. In alternative embodiments, the one or more balls are of a lateral slotted pattern with elongated gaps. Other patterns are possible. In some embodiments, the one or more balls are of the same pattern or of different patterns. In some embodiments, the one or more balls are fabricated from a plastic material. In alternative embodiments, the one or more balls are fabricated of a silicon material. In some embodiments, the one or more balls are fabricated of the same material or of different materials. Other variations are possible.

In some embodiments, the one or more balls are loaded into the dustbin from the docking station and unloaded from the dustbin into the docking station using at least one extendable member as described above. In some embodiments, one or more balls of the dustbin are loaded into the dustbin through at least one extendable member of the docking station connected with at least one opening of the dustbin. In some embodiments, one or more used balls of the dustbin are unloaded from the dustbin through at least one extendable member of the docking station connected with at least one opening of the dustbin. In some embodiments, the docking station includes a loading mechanism for loading the one or more balls into the dustbin. For example, one or more clean balls may be housed within a compartment of the docking station. To load one or more balls an opening at the bottom of the compartment opens, allowing one ball to exit the compartment at a time, the exited ball being position in front of a mechanized spring used to launch the ball through the at least one extendable member into the dustbin. A sensor may be used to sense when the ball is positioned in front of the spring. Upon sensing the ball, the spring compresses and launches the ball into the dustbin. In another example, a vacuum is generated using an impeller and used for suctioning the one or more clean balls into the dustbin from the docking station. Similar mechanisms or other mechanisms may be used for unloading the used one or more balls from the dustbin to the docking station. In some embodiments, only the balls that are full of waste are unloaded from the dustbin. In some embodiments, the one or more balls are disposable or are reusable. U.S. Patent Application No.

62/715,931 further describes a docking station for removing waste from a robotic cleaner, the entire contents of which is hereby incorporated by reference.

Figure 6:
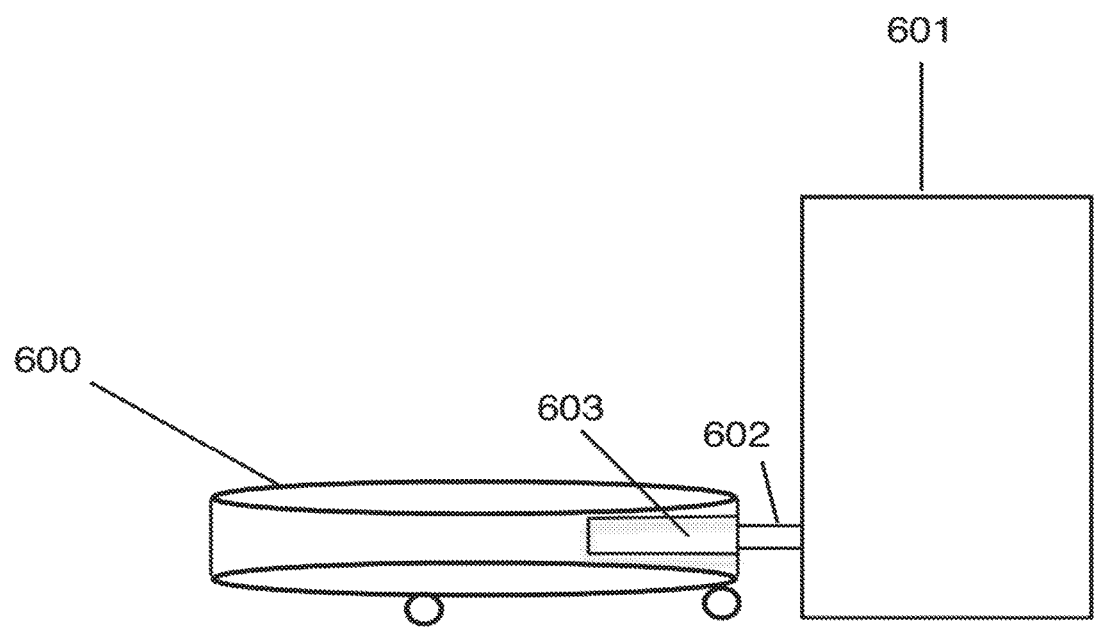
FIG. 6 illustrates a robotic surface cleaning device docked with a docking station, according to some embodiments.
Figure 7:
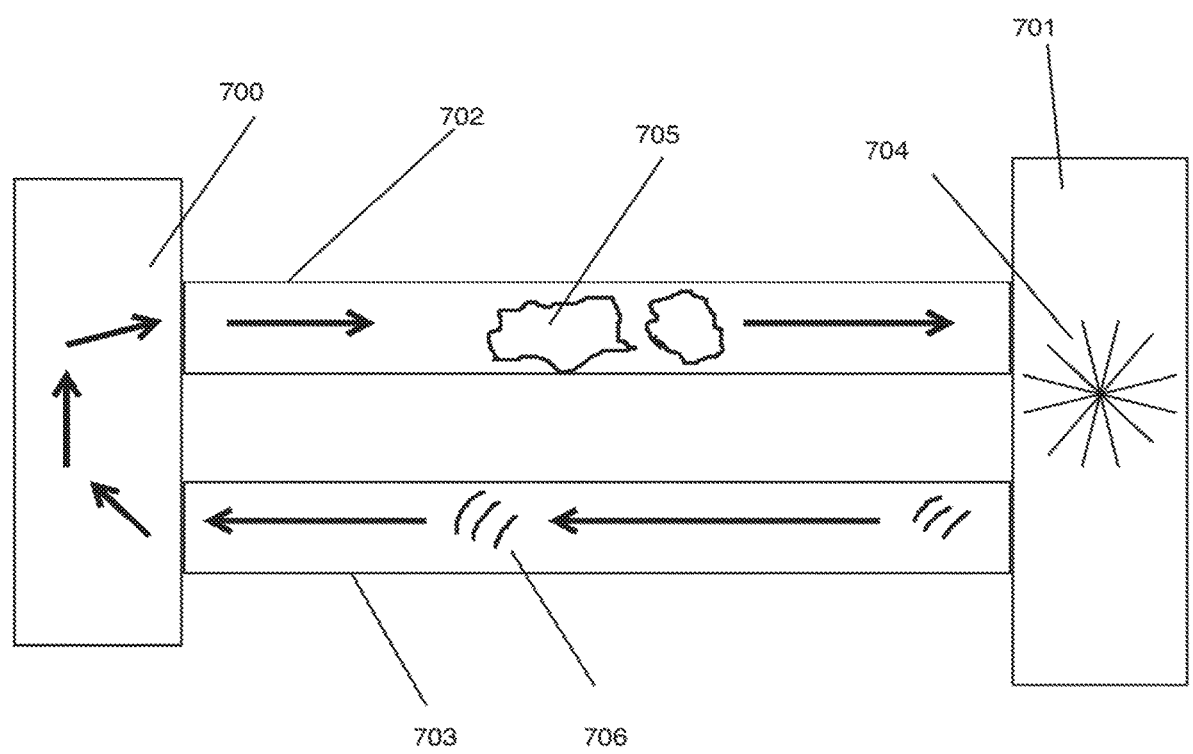
FIG. 7 illustrates a dustbin of a robotic surface cleaning device connected to a docking station by two extendable members, according to some embodiments.

FIG. 6 illustrates a robotic surface cleaning device 600 docked with a docking station 601 and extendable members 602 of docking station 601 connected with an opening of dustbin 603 of robotic surface cleaning device 600, according to some embodiments. FIG. 7 illustrates a dustbin 700 of a robotic surface cleaning device connected to a docking station 701 by a first extendable member 702 and a second extendable member 703. A fan 704 generates a vacuum causing debris 705 to flow from dustbin 700 into the docking station 701. Fan 704 forces air 706 into dustbin 700 to help facilitate cleaning of the dustbin 700.

In some embodiments, the processor of the robotic surface cleaning device uses data from various sensors, such as cameras, LIDAR, and other depth sensing devices (or depth perceiving devices), to generate a map of the surroundings. In some embodiments, a camera captures spatial data while the robotic surface cleaning device moves within the surroundings. In some embodiments, the robotic surface cleaning device moves back and forth across the environment in straight lines, such as in a boustrophedon pattern. In some embodiments, the camera captures spatial data while the robotic surface cleaning device rotates 360 degrees. In some embodiments, spatial data of the surroundings are captured continuously as the robotic surface cleaning device moves around the surroundings or rotates in one or more different positions in the surroundings. In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In some embodiments, depth to objects within the surroundings is measured using a depth measurement device, such as those described in Ser. Nos. 15/447,122, 16/393,921, 15/243,783, 15/954,335, 15/954,410, 15/257, 798, 15/674,310, 15/224,442, and 15/683,255, the entire contents of which are hereby incorporated by reference. In one embodiment, the camera measures vectors from the camera to objects in the surroundings and the processor calculates the L2 norm of the vectors using $\|x\|_P = (\Sigma_i |x_i|^P)^{1/P}$ with P=2 to estimate depths to objects. In some embodiments, the camera rotates to observe a second field of view partly overlapping the first field of view and captures a depth image of objects within the second field of view (e.g., differing from the first field of view due to a difference in camera pose). In some embodiments, the processor compares the depth readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, the processor infers the angular disposition of the Robotic surface cleaning device from the size of the area of overlap and uses the angular disposition to adjust odometer information to overcome the inherent noise of an odometer.

Prior to measuring vectors from the camera to objects within each new field of view and estimating depths, the processor may adjust previous readings to account for the measured movement of the robotic surface cleaning device as it moves from observing one field of view to the next (e.g., differing from one another due to a difference in camera pose). This adjustment accounts for the movement of the coordinate system observed by the camera with respect to a stationary coordinate system that may or may not coincide with the first field of view of the camera. In instances wherein the camera and robotic surface cleaning device move as a single unit, the observed coordinate system of the camera moves with respect to the stationary coordinate system as the robotic surface cleaning device moves. In some embodiments, a movement measuring device such as an odometer, gyroscope, optical flow sensor, etc. measures the movement of the robotic surface cleaning device and hence the camera (assuming the two move as a single unit) as the camera moves to observe new fields of view with corresponding new observed coordinate systems. In some embodiments, the processor stores the movement data in a movement vector and transforms all perimeter and object coordinates to correspond to, for example, the initial coordinate system observed by the camera coinciding with the stationary coordinate system. For example, in an embodiment wherein C is a stationary Cartesian coordinate system, C0 may be the observed coordinate system of the camera fixed to the robotic surface cleaning device at time t0 with state S and coinciding with stationary coordinate system C. The robotic surface cleaning device with attached camera displaces and the camera observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results may be achieved for most home environments. With a holistic, stationary, or global coordinate system in which the camera of the robotic surface cleaning device observes a local coordinate system, a function that relates the local observations of the camera to the stationary or global observation may be created. A challenge may be estimating a reliable function that can provide high accuracy. For example, accounting for scenarios wherein the surface on which the robotic surface cleaning device operates is unlevelled whereby the odometer may measure a depth greater or smaller than the true 2D displacement. Methods for eradicating such issues have been suggested in U.S. patent application Ser. No. 15/683,255, the entire contents of which are hereby incorporated by reference, whereby the processor monitors declining depth measurements as a depth measurement device of the robotic surface cleaning device moves towards a stationary object. If the steady decline of measurements is interrupted by a predetermined number of measurements that are a predetermined percentage greater than the measurements immediately before and after the interruption, the processor discards the interrupting measurements.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix may be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, may be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an inertial measurement unit (IMU). In some embodiments, the translation and rotation of the camera between frames is measured by two separate movement measurement devices (e.g., optical encoder and gyroscope of the robotic surface cleaning device) and the movement of the robotic surface cleaning device is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 8A:
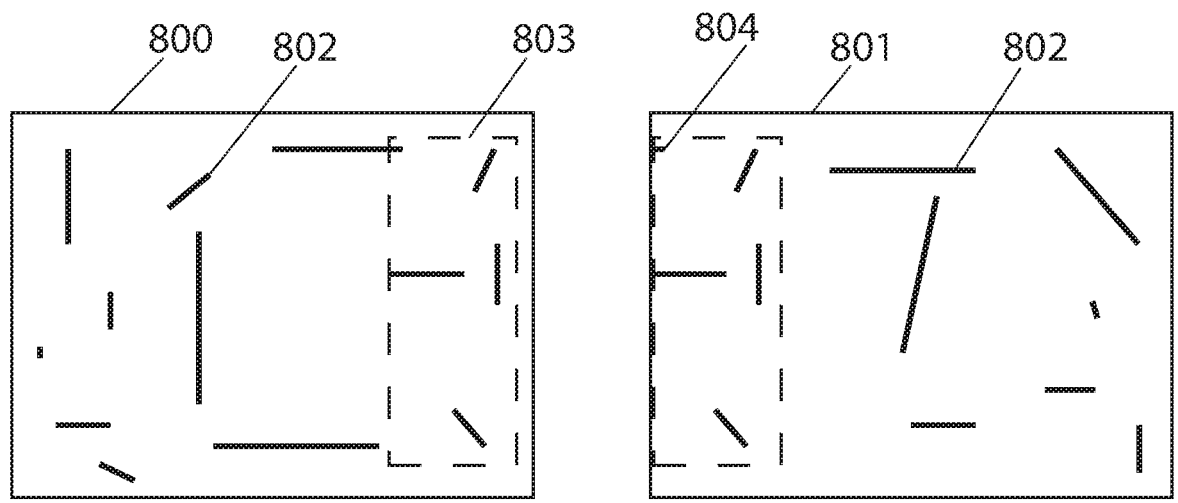
FIGS. 8A and 8B illustrate how an overlapping area is detected in some embodiments using raw pixel intensity data and the combination of data at overlapping points.
Figure 8B:
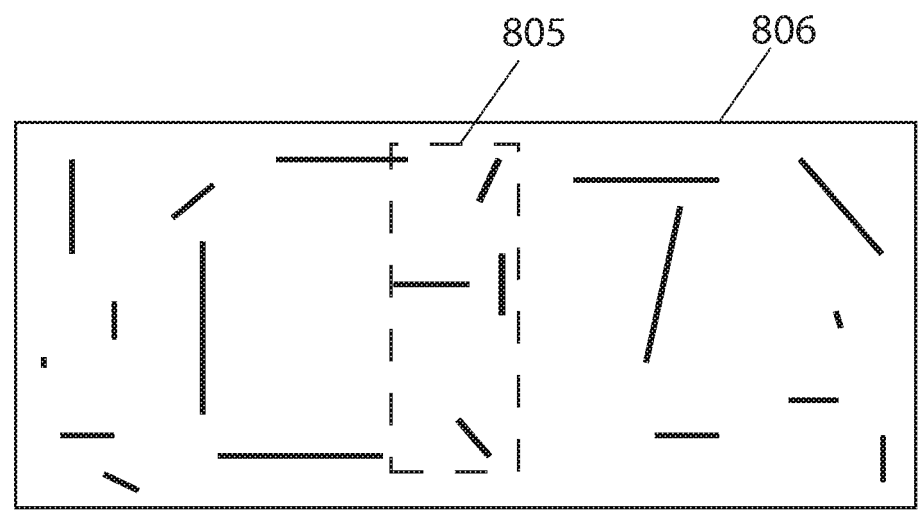

FIGS. 8A and 8B illustrate an example of identifying an area of overlap using raw pixel intensity data and the combination of data at overlapping points. In FIG. 8A, the overlapping area between overlapping image 800 captured in a first field of view and image 801 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 802 represent pixels with high pixel intensity value (such as those above a certain threshold) in each image. Area 803 of image 800 and area 804 of image 801 capture the same area of the environment and, as such, the same pattern for pixel intensity values is sensed in area 803 of image 800 and area 804 of image 801. After identifying matching patterns in pixel intensity values in image 800 and 801, an overlapping area between both images may be determined. In FIG. 8B, the images are combined at overlapping area 805 to form a larger image 806 of the environment. In some cases, data corresponding to the images may be combined. For instance, depth values may be aligned based on alignment determined with the image.

Figure 9A:
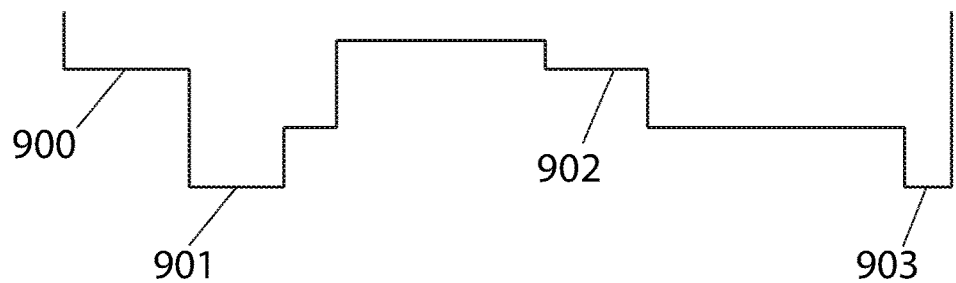
FIGS. 9A-9C illustrate how an overlapping area is detected in some embodiments using raw pixel intensity data and the combination of data at overlapping points.
Figure 9B:
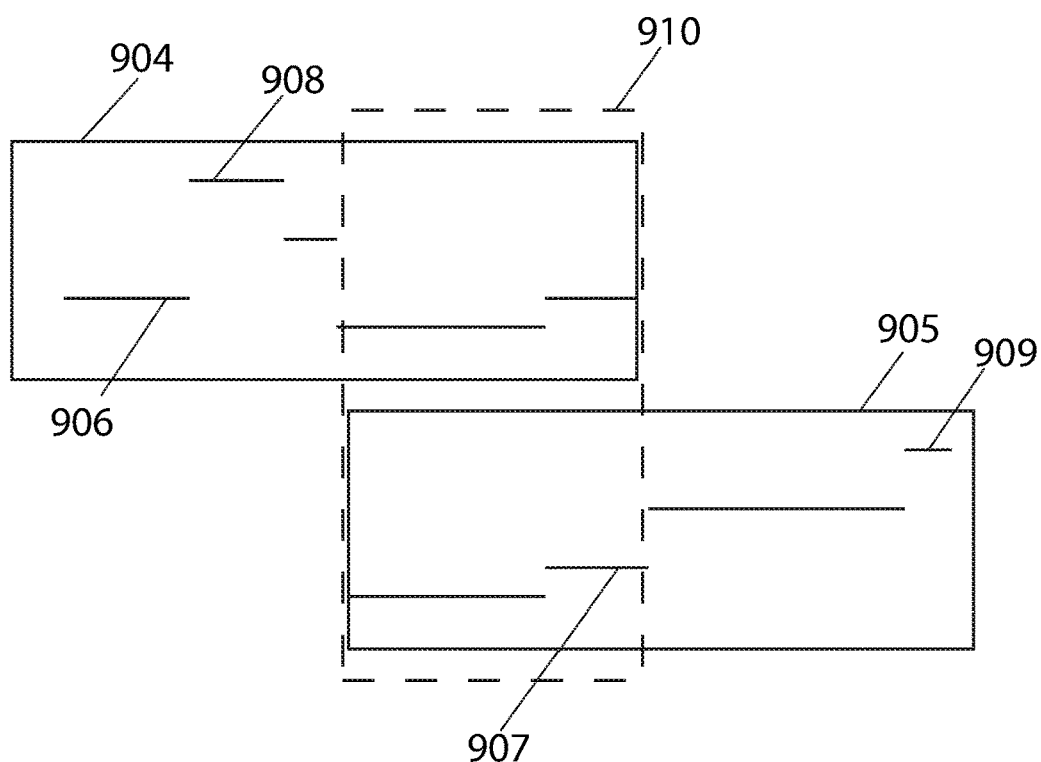
Figure 9C:
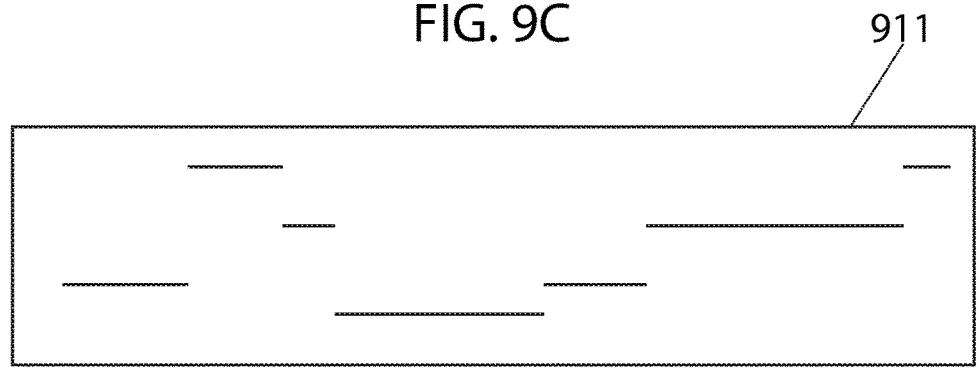

FIGS. 9A-9C illustrate another example of identifying an area of overlap using raw pixel intensity data and the combination of data at overlapping points. FIG. 9A illustrates a top (plan) view of an object, such as a wall, with uneven surfaces wherein, for example, surface 900 is further away from an observer than surface 901 or surface 902 is further away from an observer than surface 903. In some embodiments, at least one infrared line laser positioned at a downward angle relative to a horizontal plane coupled with at least one camera may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from a camera in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 9B, captured images 904 and 905 of the laser line projected onto the object surface for two different fields of view are shown. Projected laser lines with lower position, such as laser lines 906 and 907 in images 904 and 905 respectively, correspond to object surfaces 900 and 902, respectively, further away from the infrared illuminator and camera. Projected laser lines with higher position, such as laser lines 908 and 909 in images 904 and 905 respectively, correspond to object surfaces 901 and 903, respectively, closer to the infrared illuminator and camera. Captured images 904 and 905 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 904 and 905 bound within dashed lines 910 have similar arrangement of pixel intensities as both images captured a same portion of the object within their field of view. Therefore, images 904 and 905 may be combined at overlapping points to construct larger image 911 of the environment shown in FIG. 9C. The position of the laser lines in image 911, indicated by pixels with intensity value above a threshold intensity, may also be used to infer depth of surfaces of objects from the infrared illuminator and camera (see, U.S. patent application Ser. No. 15/674,310, the entire contents of which is hereby incorporated by reference).

In some embodiments, the area of overlap between readings taken within the two field of views is estimated based on the measured movement of the robotic surface cleaning device and is used as a method of verifying the identified area of overlap. In some embodiments, measured movement may be used as the primary method of identifying the area of overlap. In some embodiments, devices such as an odometer, gyroscope, and optical flow sensor may be used to measure movement. For example, the angular displacement provided by an odometer and gyroscope and/or the mathematical convolution of the two may be used to estimate the area of overlap. In some embodiments, the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, the robotic surface cleaning device may have more than one movement measuring device in order to measure movement between each time step or fields of view observed. For example, the robotic surface cleaning device may have gyroscopes and odometers that simultaneously provide redundant information. In many implementations, only one set of information is used by the processor of the robotic surface cleaning device while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the robotic surface cleaning device by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the robotic surface cleaning device to compensate for the lack of precision between the measurements from the first and second device. By way of further example, the processor may use minimum mean squared error to provide a more precise estimate of the movement of the robotic surface cleaning device. The processor may also use other mathematical methods to further process measured movement of the robotic surface cleaning device by the first and second device, such as split and merge algorithm, incremental algorithm, Hough Transform, line regression, Random Sample Consensus, Expectation-Maximization algorithm, or curve fitting, for example, to estimate more realistic movement of the robotic surface cleaning device. In another embodiment, the processor may use the k-nearest neighbors algorithm where each movement measurement is calculated as the average of its k-nearest neighbors.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the robotic surface cleaning device occupying the area within which the coordinate is found. If the second set of sensors detects that coordinate is within an area the robotic surface cleaning device cannot access, the prediction is found true. In some embodiments, this is implemented with a low range sensor array. The second set of sensors may be, but is not limited to, a low range IR sensor, a distance sensor, a tactile sensor, a bumper sensor, or other types of sensors.

In some embodiments, the processor identifies one or more gaps in the map of the surroundings (or otherwise map of the environment). In some embodiments, the camera is navigated to the area in which the gap exists for further exploration, capturing new images while exploring. New data is captured by the camera and combined with the existing map at overlapping points until the gap in the map no longer exists. In some embodiments, the processor identifies the gap in the map and navigates the camera to the area in which the gap exists. In some embodiments, the perimeters and objects in the map may be stored in memory of and used by the processor in performing tasks within discovered areas of the map. As the robotic surface cleaning device performs a task, the processor marks the areas covered within the map (e.g., in memory) to avoid repeat coverage. While the robotic surface cleaning device performs work in discovered areas, the camera continues to capture images and the processor merges the data with the existing map to close any gaps in the perimeters that may exist and, in the process, may discover previously undiscovered areas. In some embodiments, the processor may divide the discovered area into sections that are covered by the robotic surface cleaning device in succession starting from the section closest to the robotic surface cleaning device and ending at the sections furthest away. Any other order may be acceptable depending on the situation. After covering discovered areas within the surroundings, the processor of the robotic surface cleaning device identifies any remaining gaps in the perimeters that may have not been closed while performing work in the discovered area. These gaps may be due to, for example, an opening in the wall, such as in the case of a door or an opening between separated areas, blind spots unseen by the sensor, or a lack of data resulting from a sensor with inadequate detection range.

In some embodiments, after exploring undiscovered areas within which identified gaps are located and covering all discovered areas within the map, the robotic surface cleaning device moves along the perimeters of the environment while using sensory devices, such as tactile sensors (like bump sensors) or short-range IR sensors, facing towards the perimeters of the map to verify that no additional gaps exist. For example, the robotic surface cleaning device may use the tactile sensor to observe physical contact between the robotic surface cleaning device and the perimeters as it follows along the perimeter of the map to ensure no additional gaps exist. In some embodiments, an additional gap may be observed while following along the perimeters, in which case the robotic surface cleaning device may proceed to explore (e.g., position its sensors such that it can image) the undiscovered areas while mapping newly discovered areas as described above. In some embodiments, the robotic surface cleaning device returns back to its home base after moving along the perimeters to check that no additional gaps exist. In some embodiments, the actions of covering internal areas within the map and moving along the perimeters can alternate. For example, the internal areas of one room can be covered and movement around the perimeters completed before moving on to the internal area and perimeters of a second room. In other embodiments, the location of the perimeters sensed may be compared to the location of the perimeters in the map to check for accuracy. For example, using a tactile sensor, the location at which physical contact between the robotic surface cleaning device and perimeters are observed can be compared to the corresponding location within the map to check if there are coinciding perimeters. This method may also be used to determine ground truth of the location of the perimeters in comparison to the perceived location of the perimeters. In some embodiments, ground truth may be used to adjust measurements or the perimeters. The robotic surface cleaning device may move along the perimeters and compare its sensed position to that of the perimeters at any time during or after the process of plotting the perimeters of the map.

In some embodiments, wherein the gap in the perimeters is due to an opening in the wall (e.g., a doorway or an opening between two separate areas), exploration of the undiscovered areas within which the gap is identified may lead to the discovery of a room, a hallway or any other separate area. In some embodiments, identified gaps that are found to be, for example, an opening in the wall are used in separating areas into smaller subareas. For example, the opening in the wall between two rooms may be used to segment the area into two subareas, where each room is a single subarea. This could be expanded to any number of rooms, such as five rooms, wherein each room is separated from adjacent rooms using the openings in the walls as dividers, creating five subareas. In some embodiments, the processor of the robotic surface cleaning device provides a unique tag to each subarea and uses the unique tag to order the subareas for coverage by the robotic surface cleaning device, choose different work functions for different subareas, add restrictions to subareas, set cleaning schedules for different subareas, and the like. In some embodiments, the processor of the robotic surface cleaning device detects a second room beyond an opening in the wall detected within a first room being covered and identifies the opening in the wall between the two rooms as a doorway. Methods for identifying a doorway are described in U.S. patent application Ser. Nos. 16/163,541 and 15/614,284, the entire contents of which are hereby incorporated by reference. For example, in some embodiments, the processor fits depth data points to a line model and any deviation from the line model are identified as an opening in the wall by the processor. In some embodiments, the processor uses the range and light intensity recorded by the depth sensor for each reading to calculate an error associated with deviation of the range data from a line model. In some embodiments, the processor of the robotic surface cleaning device relates the light intensity and range of a point captured by the depth sensor using $$I(n) = \frac{a}{r(n)^4},$$

wherein I(n) is the intensity of point n, r(n) is the distance of the particular point on an object and a=E(I(n)r(n)$^4$) is a constant that is determined by the processor using a Gaussian assumption.

Given $d_{min}$, the minimum distance of all readings taken, the processor calculates the distance $$r(n) = \frac{d_{min}}{\sin(-\theta(n))}$$

corresponding to a point n on an object at any angular resolution θ(n). In some embodiments, the processor determines the horizon $$\alpha = a\sin\frac{d_{min}}{d_{max}}$$

of the depth sensor given $d_{min}$ and $d_{max}$, the minimum and maximum readings of all readings taken, respectively. The processor used a combined error $$e = \sum (I(n)r(n)^4 - a)^2 + \left(r(n) - \left(\frac{d_{min}}{\sin(-\theta(n))}\right)\right)^2$$

of the range and light intensity output by the depth sensor to identify deviation from the line model and hence detect an opening in the wall. The error e is minimal for walls and significantly higher for an opening in the wall, as the data will significantly deviate from the line model. In some embodiments, the processor uses a threshold to determine whether the data points considered indicate an opening in the wall when, for example, the error exceeds some threshold value. In some embodiments, the processor uses an adaptive threshold wherein the values below the threshold may be considered to be a wall.

In some embodiments, the processor does not consider openings with width below a specified threshold as an opening in the wall, such as openings with a width too small to be considered a door or too small for the robotic surface cleaning device to fit through. In some embodiments, the processor of the robotic surface cleaning device estimates the width of the opening in the will by identifying angles φ with a valid range value and with intensity greater than or equal to $$\frac{a}{d_{max}},$$

The difference between the smallest and largest angle among all $$\varphi = \left\{ \theta(n) \vee (\{r(n) \neq \infty\}) \wedge \left( I(n) \geq \left(\frac{a}{d_{max}}\right)^4 \right) \right\}$$

angles provides an estimate of the width of the opening. In max some embodiments, the processor may also determine the width of an opening in the wall by identifying the angle at which the measured range noticeably increases and the angle at which the measured range noticeably decreases and taking the difference between the two angles.

In some embodiments, the processor detects a wall or opening in the wall using recursive line fitting of the data. The processor of the robotic surface cleaning device compares the error (y−(ax+b))$^2$ of data points $n_1$ to $n_2$ to a threshold $T_1$ and summates the number of errors below the threshold. The processor then computes the difference between the number of points considered ($n_2-n_1$) and the number of data points with errors below threshold $T_1$. If the difference is below a threshold $T_2$, i.e., (($n_2-n_1$)−$\Sigma_{n_1}^{n_2}$(y−(ax+b))$^2$<$T_1$)<$T_2$, then the processor assigns the data points to be a wall and otherwise assigns the data points to be an opening in the wall.

In another embodiment, the processor uses entropy to predict an opening in the wall, as an opening in the wall results in disordered measurement data and hence larger entropy value. In some embodiments, the processor marks data with entropy above a certain threshold as an opening in the wall. In some embodiments, the processor determines entropy of data using H(X)=−$\Sigma_{i=1}^{n}$P($x_i$) log P($x_i$) wherein X=($x_1$, $x_2$, . . . , $x_n$) is a collection of possible data, such as depth measurements. P($x_i$) is the probability of a data reading having value $x_i$. P($x_i$) may be determined by, for example, counting the number of measurements within a specified area of interest with value $x_i$ and dividing that number by the total number of measurements within the area considered. In some embodiments, the processor compares entropy of collected data to entropy of data corresponding to a wall. For example, the entropy may be computed for the probability density function (PDF) of the data to predict if there is an opening in the wall in the region of interest. In the case of a wall, the PDF may show localization of readings around wall coordinates, thereby increasing certainty and reducing entropy.

In some embodiments, the processor applies a probabilistic method by pre-training a classifier to provide a priori prediction. In some embodiments, the processor uses a supervised machine learning algorithm to identify features of openings and walls. A training set of, for example, depth data is used by the processor to teach the classifier common features or patterns in the data corresponding with openings and walls such that the processor may identify walls and openings in walls with some probability distribution. In this way, a priori prediction from a classifier combined with real-time data measurement is used together to provide a more accurate prediction of a wall or opening in the wall. In some embodiments, the processor uses Bayes Theorem to provide probability of an opening in the wall given that the robotic surface cleaning device is located near an opening in the wall, $$P(A|B) = \frac{P(B|A)P(A)}{P(B)} \cdot P(A|B)$$

is the probability of an opening in the wall given that the robotic surface cleaning device is located close to an opening in the wall, P(A) is the probability of an opening in the wall, P(B) is the probability of the robotic surface cleaning device being located close to an opening in the wall, and P(B|A) is the probability of the robotic surface cleaning device being located close to an opening in the wall given that an opening in the wall is detected.

The different methods described for detecting an opening in the wall above may be combined in some embodiments and used independently in others. Examples of methods for detecting a doorway are described in, for example, U.S. patent application Ser. Nos. 15/615,284 and 16/163,541, the entire contents of which are hereby incorporated by reference. In some embodiments, the processor of the robotic surface cleaning device may mark the location of doorways within a map of the environment. In some embodiments, the robotic surface cleaning device may be configured to avoid crossing an identified doorway for a predetermined amount of time or until the robotic surface cleaning device has encountered the doorway a predetermined number of times. In some embodiments, the robotic surface cleaning device may be configured to drive through the identified doorway into a second subarea for cleaning before driving back through the doorway in the opposite direction. In some embodiments, the robotic surface cleaning device may finish cleaning in the current area before crossing through the doorway and cleaning the adjacent area. In some embodiments, the robotic surface cleaning device may be configured to execute any number of actions upon identification of a doorway and different actions may be executed for different doorways. In some embodiments, the processor uses doorways to segment the environment into subareas. For example, the robotic surface cleaning device may be programmed to execute a wall-follow coverage algorithm in a first subarea and rectangular-spiral coverage algorithm in a second subarea, or to only clean the first subarea, or to clean the first subarea and second subarea on particular days and times. In some embodiments, unique tags, such as a number or any label, can be assigned to each subarea. In some embodiments, the user assigns unique tags to each subarea, and embodiments receive this input and associate the unique tag (such as a human-readable name of a room, like "kitchen") with the area in memory. Some embodiments may receive instructions that map tasks to areas by these unique tags, e.g., a user may input an instruction to the robotic surface cleaning device in the form of "vacuum kitchen," and the robotic surface cleaning device may respond by accessing the appropriate map in memory that is associated with this label to effectuate the command. In some embodiments, the robotic surface cleaning device assigns unique tags to each subarea. The unique tags can be used to set and control the operation and execution of tasks within each subarea and to set the order of coverage of each subarea. For example, the robotic surface cleaning device can be programmed to cover a particular subarea first and another particular subarea last. In some embodiments, the order of coverage of the subareas is such that repeat coverage within the total area is minimized. In another embodiment, the order of coverage of the subareas is such that coverage time of the total area is minimized. The order of subareas can be changed depending on the task or desired outcome. The example provided only illustrates two subareas for simplicity but can be expanded to include multiple subareas, spaces, or environments, etc. In some embodiments, the processor represents subareas using a stack structure, for example, for backtracking purposes wherein the path of the robotic surface cleaning device back to its starting position may be found using the stack structure.

The processor of the robotic surface cleaning device may use the map of the environment to autonomously navigate the environment during operation, e.g., a cleaning or other work session. In some embodiments, the map (e.g., mapped, e.g., in vector or bitmap form) is stored in memory for future use. Storage of the map may be in temporary memory such that a map is only available during an operational session or in more permanent forms of memory such that the map is available at the next session or startup. In some embodiments, the map is further processed to identify rooms and other segments. In some embodiments, a new map is constructed at each use. In some embodiments, the map may be externally stored on another device such as the docking station or other base station of the robotic surface cleaning device or in the cloud (e.g., in memory of a server at a remote data center) or other remote storage device.

Figure 10A:
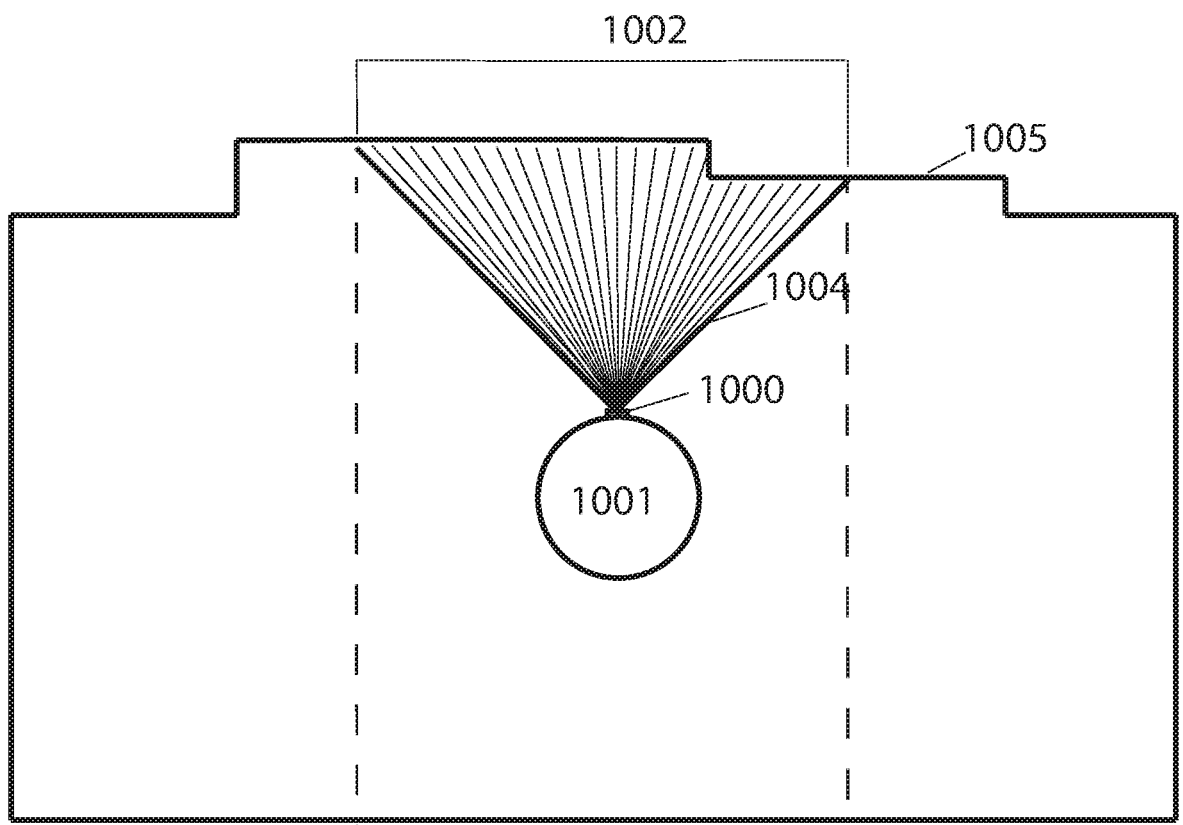
FIGS. 10A and 10B illustrate a camera taking distance measurements of an enclosure within a first range of sight and resulting segment of a 2D boundary of the enclosure in some embodiments.
Figure 10B:
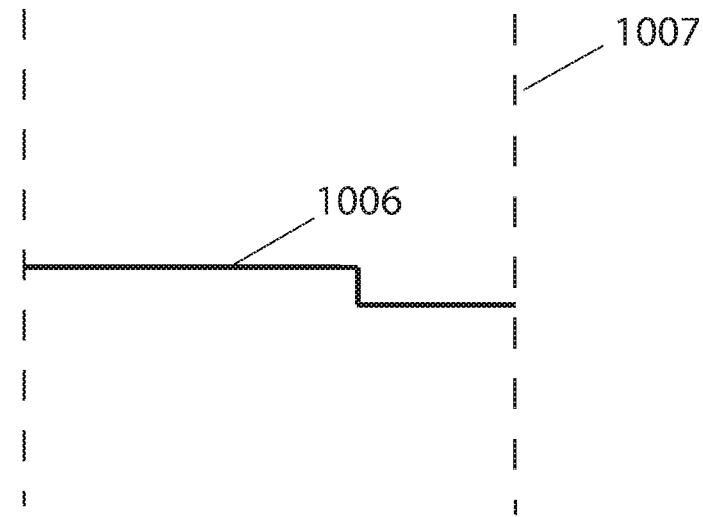

The door detection techniques described above apply to some embodiments of the depicted approach. For example, FIG. 10A illustrates an embodiment consistent with the above techniques wherein camera 1000 mounted on robotic surface cleaning device 1001 is measuring distances 1002 within first field of view (i.e. field of view) 1004. Distance measurements 1002 taken by camera 1000 measure the distance from camera 1000 to object 1005, which in this case is a wall. FIG. 10B illustrates 2D perimeters segment 1006 resulting from plotted distance measurements 1002 taken within first field of view 1004. Dashed lines 1007 demonstrates that resulting 2D perimeter segment 1004 corresponds to distance measurements 1002 taken within field of view 1004. In some embodiments, 3D distance measurements are taken and plotted to construct 2D or 3D perimeter segments of the map.

Figure 11A:
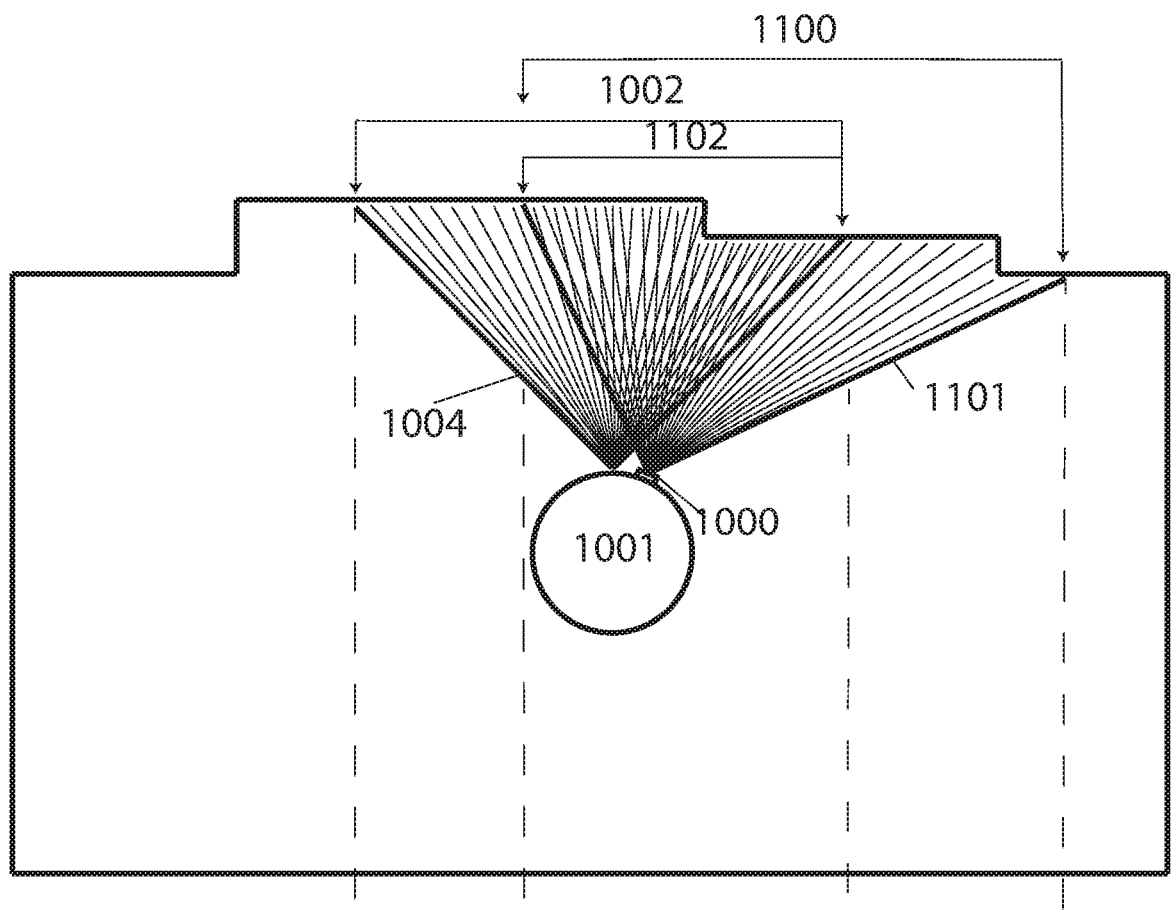
FIGS. 11A and 11B illustrate how a segment of a 2D boundary of an enclosure is constructed from distance measurements taken within successively overlapping range of sight in some embodiments.

FIG. 11A illustrates camera 1000 mounted on robotic surface cleaning device 1001 measuring distances 1100 within second field of view 1101 partly overlapping distance measurements 1002 within first field of view 1004. After distance measurements 1002 within first field of view 1004 are taken, robotic surface cleaning device 1001 with mounted camera 1000 moves to observe overlapping second field of view 1101 and take distance measurements 1100. As robotic surface cleaning device 1001 moves to observe second field of view 1101, the values of distance measurements 1002 taken within first field of view 1004 are adjusted to account for the movement of robotic surface cleaning device 1001. Distance measurements 1102 represent the area of overlap between distance measurements 1002 taken within field of view 1004 and distance measurements 1100 taken within field of view 1101.

Figure 11B:
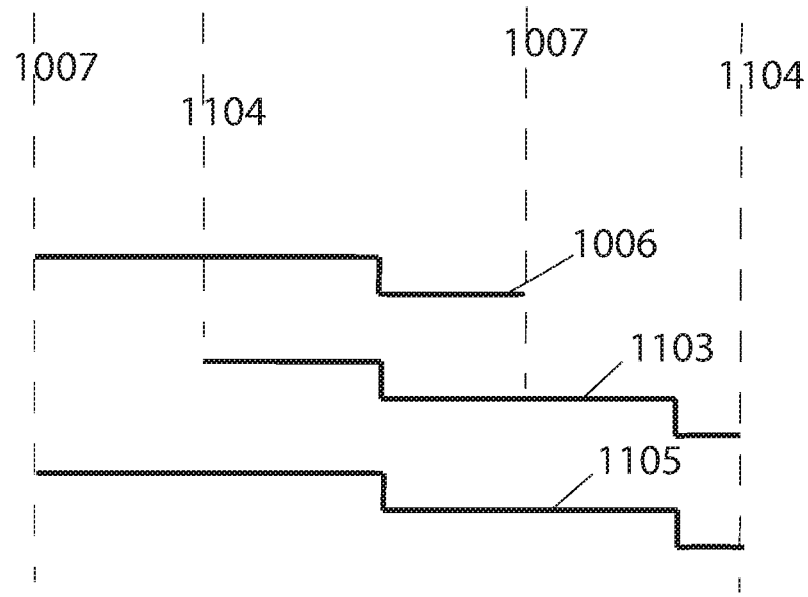

FIG. 11B illustrates 2D perimeters segments 1006 and 1103 resulting from distance measurements 1002 and 1100, respectively. While shown aligned, the processor may receive the data in a format in which each segment is in a distinct coordinate system, e.g., each in pixel coordinates of a different image. Segments 1006 and 1103 are bounded by dashed lines 1007 and 1104, respectively. 2D perimeters segment 1105 constructed from the combination of 2D perimeters segments 1006 and 1103 and bounded by the outermost dashed lines of 1007 and 1104 is also illustrated. Distance measurements 1100 captured within second field of view 1101 are compared to distance measurements 1002 captured within first field of view 1004 to identify the area of overlap bounded by the innermost dashed lines of 1104 and 1007. The processor of the robotic surface cleaning device may compare measurements and determine the area of overlap using the methods described above. 2D perimeters segment 1006 from distance measurements taken within first field of view 1004 and 2D perimeters segment 1103 from distance measurements taken within second field of view 1101 may be combined at the area of overlap to construct larger 2D perimeters segment 1105. When the values of overlapping distance measurements from field of view 1004 and 1101 within the area of overlap are slightly different, an analytical method, such as a data or sensor fusion algorithm, averaging, minimum sum of errors, or any other suitable method as described above is used to calculate a single distance value for each pair of overlapping distance measurements that can result in a more accurate ground truth as compared to the distance measurements initially taken. In some embodiments, this method is repeated such that distance measurements captured within successively overlapping field of views may be combined to construct the perimeters of the entire map.

Figure 12:
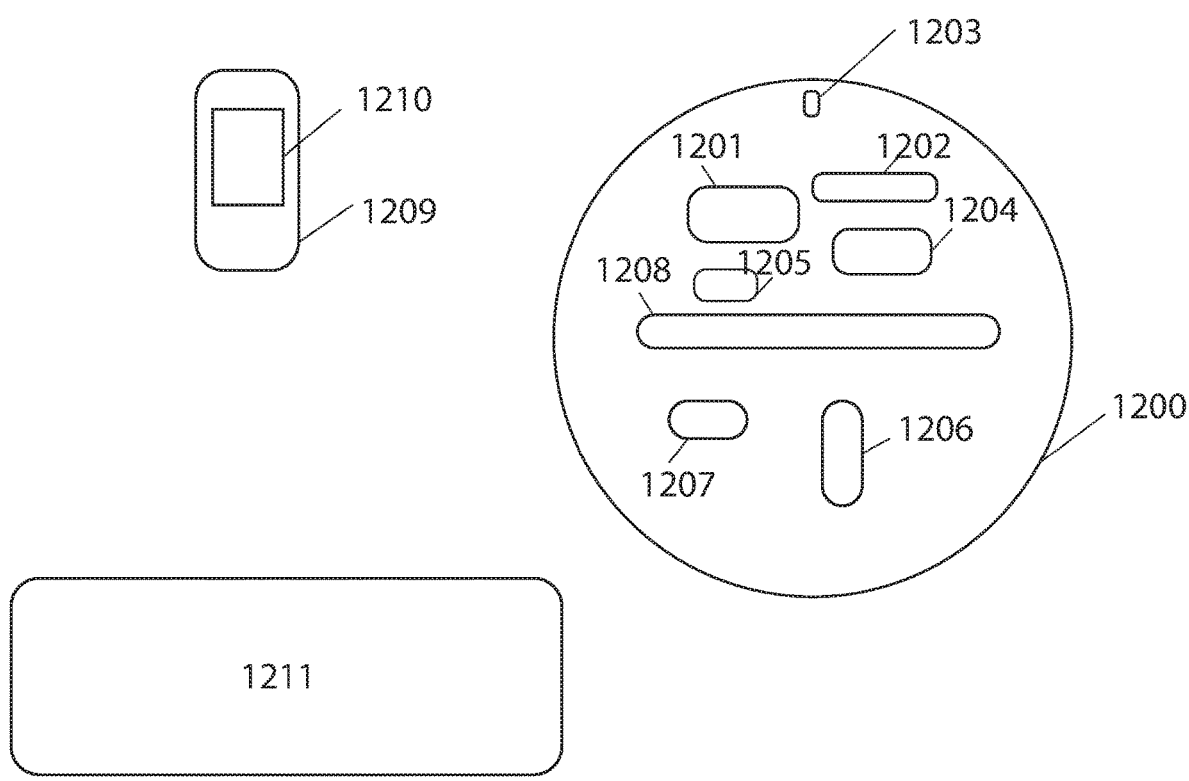
FIG. 12 is a schematic diagram of an example of a robot with which the present techniques may be implemented in some embodiments.

FIG. 12 depicts an example of a robotic surface cleaning device 1200 with processor 1201, memory 1202, a first set of sensors 1203, second set of sensors 1204, network communication 1205, movement driver 1206, timer 1207, and more or more cleaning tools 1208. The first and second set of sensors 1203 and 1204 may include depth measuring devices, movement measuring devices, and the like. In some embodiments, the robotic surface cleaning device may include the features of a robotic surface cleaning device described herein. The shape of the illustrated features is not meant to imply that the robotic surface cleaning device has a round shape or that any feature has any particular shape. In some embodiments, program code stored in the memory 1202 and executed by the processor 1201 may effectuate the operations described herein. Some embodiments additionally include user communication device 1209 having a touchscreen 1210 with a software application coupled to the robotic surface cleaning device 1200, such as that described in U.S. patent application Ser. Nos. 15/272,752 and 15/949,708, the entire contents of which is hereby incorporated by reference. For example, the application may be used to provide instructions to the robotic surface cleaning device, such as days and times to execute particular cleaning functions and which areas to execute particular cleaning functions within. In other cases, the application may be used by a user to modify the map of the environment by, for example, adjusting perimeters and obstacles and creating subareas within the map. In another example, the application may transmit self-test information (e.g., from diagnostic testing the processor of the robotic surface cleaning device executes autonomously to identify errors or malfunctions) directly to human customer support or to the cloud for an artificial intelligence (AI) system to analyze. In some cases, the A system may determine a solution and transmit the solution to the application or the processor of the robotic surface cleaning device. In other cases, the AI system may determine that human customer support is required and transmit the self-test information to human customer support for further analysis. In some cases, the customer service representative may communicate with a user using the application or other form of communication. Further, minimal explanation may be required by the user as the customer service representative may be in possession of self-test information and logs recorded by the processor which may be used in finding the root source of the error or malfunction. In some cases, the AI system or customer service representative sends a shipping label to the user that may be used in sending the robotic surface cleaning device for repair. In some cases, the AI system or customer service representative sends. In some cases, the AI system analyzes self-test information autonomously in the background and sends a spare to the user in anticipation of the robotic surface cleaning device requiring the spare part. For example, the AI system detects that a filter requires replacement earlier than expected and sends a new filter to a home of the user. In some cases, the processor of the robotic surface cleaning device transmits the self-test information directly to human customer service or the cloud for the AI system to retrieve. In some cases, the application may be used to choose when and which self-tests to execute.

While the examples and illustrations provided apply the some of the present techniques to the construction of a 2D perimeters using 2D distance measurements, the 2D perimeters may be constructed using 3D distance measurements as well. Furthermore, embodiments may construct 3D perimeters of the map using 3D distance measurements. The 3D perimeters of the map may be plotted using at least one camera, such as a distance measuring camera, capable of taking 3D distance measurements. 3D distance measurements taken within overlapping field of views may be combined at identified areas of overlap where overlapping distance measurements are used as the attachment points. In some embodiments, a 2D perimeters can be extracted from the plotted 3D perimeters.

The resulting plot of the perimeters may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

In some embodiments, the field of view of the sensor may be limited. In such cases, there may not be overlap between measurements captured in consecutive field of views as the robot rotates 360 degrees to scan the environment or executes other movements within the environment. In some embodiments, the robotic surface cleaning device includes a camera oriented towards the ceiling. The camera captures images of features and the processor monitors how the image of the ceiling changes in each degree of angular displacement. The processor compares consecutively captured images and determines a transpose that transforms a previously captured image into a currently captured image. The processor applies the transpose to all measurements and normalizes them. The transpose may be determined and applied to the measurements at the end of a 360 degrees turn, at every incremental degree, or at a predetermined interval (e.g., an interval corresponding with camera FPS or TOF sensor Hz). In other instances, the camera captures images of other objects such as walls, floors, walls and floors, ceilings and walls, etc. For example, the camera may be oriented to capture images of walls and floors and the processor may determine the transpose of a corner connecting a floor and two walls from one image to another. In some embodiments, the processor determines the change in distance of the feature from an edge of the image.

In some embodiments, more than one camera may be used to improve accuracy of the map. For example, a plurality of distance measuring cameras (e.g., carried by the robotic surface cleaning device) may be used simultaneously (or concurrently) to more accurately determine the perimeters of the map. The use of a plurality of distance measuring cameras is expected to allow for the collection of distance measurements from different perspectives and angles, for example. Where more than one distance measuring camera is used, triangulation or others suitable methods may be used for further data refinement and accuracy. In some embodiments, a 360-degree LIDAR is used to create perimeters of the map. It should be emphasized, though, that embodiments are not limited to techniques that construct maps in this way, as the present techniques may also be used for plane finding in augmented reality, barrier detection in virtual reality applications, outdoor mapping with autonomous drones, and other similar applications, which is not to suggest that any other description is limiting. Further details of mapping methods are described in U.S. patent application Ser. Nos. 16/048,179, 16/048,185, 16/163,541, 16/163,562, 16/163,508, and 16/185,000, the entire contents of which are hereby incorporated by reference.

In some embodiments, the processor of the robotic surface cleaning device may generate multiple maps of the environment over multiple working sessions. The maps may be stored in a memory of the robotic surface cleaning device and may be combined with previously generated maps to keep the map of the environment up to date. In some embodiments, a predetermined map of the environment may be generated and stored in an internal memory of the robotic surface cleaning device. In some embodiments, the robotic surface cleaning device may generate a map of the environment during operation in the environment. In some embodiments, the processor may update the internal map of the environment with observations collected during each successive work session. Continuous updates to the map of the environment may help establish the most efficient path of the robotic surface cleaning device. In some embodiments, the processor of the robotic surface cleaning device generates a local map and a global map. In some embodiments, the processor integrates the local map into the global map. In some embodiments, the processor only observes a portion of the global map that is local relative to the location of the robotic surface cleaning device. In some embodiments, one or more local maps are superimposed on a global map. In some instances, local maps are combined to create a global map. In some instances. The processor generates a local map and determines its location based on locating the local map within the global map by detecting similar features between the two maps.

The robotic surface cleaning device may, for example, use the map to autonomously navigate the environment during operation, e.g., accessing the map to determine that a candidate route is blocked by an obstacle denoted in the map, to select a route with a route-finding algorithm from a current point to a target point, or the like. To avoid false detection of an obstacle, in some embodiments, the processor assigns each location within the map an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

In some embodiments, the memory of the robotic surface cleaning device may include an internal database of obstacles likely to be encountered within the environment. In some embodiments, an obstacle encountered in the environment may be identified using various sensors to capture features of the obstacle and the processor may determine the type of obstacle based on the internal database. The processor may note the increased likelihood of that type of obstacle being located in the region of the environment in which it was encountered. In some embodiments, the processor may mark the location in the map. For example, images sensors of the robotic surface cleaning device continuously capture images, and if the robotic surface cleaning device encounters a wire on the floor, the processor analyzes images of the wire to extract features of the obstacle and compares them with features of obstacles within the internal database to determine that it is a wire. The processor may mark the region in which the wire was encountered within an internal map as a region with increased likelihood of containing a wire. In some embodiments, the processor may further determine if an obstacle may be overcome by the robotic surface cleaning device. For example, the processor may determine if the wire is an obstacle that may be overcome by the robotic surface cleaning device by, for example, driving over the wire. If so, the robotic surface cleaning device may attempt to drive over the obstacle. If, however, the robotic surface cleaning device encounters a large obstacle, such as a chair or table, the processor may determine that it cannot overcome the obstacle and may attempt to maneuver around the obstacle and continue along its path. In some embodiments, regions wherein obstacles are consistently encountered may be classified by the processor as a high obstacle density area and may be marked in the map of the environment. In some embodiments, the processor may attempt to alter its path to avoid high obstacle density areas. In some embodiments, the processor may alert a user when an unanticipated obstacle blocking the path of the robotic surface cleaning device is encountered, particularly when the robotic surface cleaning device may not overcome the obstacle by maneuvering around or driving over the obstacle. The robotic surface cleaning device may alert the user by generating a noise, sending a message to an application of a communication device paired with the robotic surface cleaning device or any other device paired with the robotic surface cleaning device, displaying a message on a screen of the robotic surface cleaning device, illuminating lights, and the like.

In some embodiments, the robotic surface cleaning device is configured with a first exteroceptive sensor (e.g., depth sensor) and a second proprioceptive sensor (e.g., gyroscope, such as in a three or six axis inertial measurement unit (IMU), the data of which the processor uses simultaneously and interchangeably for mapping and localization of the robotic surface cleaning device. In some embodiments, data from one sensor is used in a primary method for mapping and localization while data from the other sensor is used in a secondary method for mapping and localization. The processor uses the secondary method for mapping and localization when, for example, the sensor used in the primary method for mapping and localization malfunctions, becomes unusable or is functionally affected by the environment. For example, in direct sunlight a first exteroceptive sensor, such as a depth camera, may not provide the reliable readings required for a primary method for mapping and localization. In such instances, the processor uses a secondary method for mapping and localization using data from a second proprioceptive sensor, such as a gyroscope, to localize the robotic surface cleaning device and mark the area covered by the robotic surface cleaning device such that repeat coverage is avoided. The transition between the primary and secondary method may be seamless (e.g., occurring within less than 10 seconds, less than 1 second, or less than 500 milliseconds, and resulting in less than 1 cm, 10 cm, or 50 cm of error in position over 10 seconds of travel) and may be controlled with a finite state machine. In some embodiments, the processor uses the secondary method to verify output of the primary method. In some embodiments, one sensor is active (e.g., depth sensor emitting light to the environment and measuring reflected light) and the other sensor is passive (e.g., gyroscope measuring movement). For example, data from a digital camera (i.e., passive sensor) is used in a primary method for mapping and localization and data from a wheel encoder (i.e., active sensor) is used in a secondary method for mapping and localization.

In some embodiments, IMU measurements in a multi-channel stream indicative of acceleration along three or six axes may be integrated over time to infer a change in pose of the robotic surface cleaning device, e.g., with a Kalman filter. In some cases, the change in pose may be expressed as a movement vector in the frame of reference of the room through which the robotic surface cleaning device moves. Some embodiments may localize the robotic surface cleaning device or map the room based on this movement vector (and contact sensors in some cases) even if the camera is inoperative or degraded. In some cases, IMU measurements may be combined with image-based (or other exteroceptive) mapping data in a map or localization determination. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, cliffs are marked as obstacles in the map. In some embodiments, cliffs are detected using edge sensors, such as those described in U.S. patent application Ser. Nos. 14/941,385, 16/279,699, and 16/041,470. In some embodiments, the cliffs marked as obstacles in the map prevent the robotic surface cleaning device from visiting the cliff area more than one time. Without the cliffs marked as obstacles in the map, the robotic surface cleaning device may attempt to visit the cliff area multiple times. Although the cliffs are detected by the edge detection sensors and prevent the robotic surface cleaning device from moving past the cliff, the processor may not learn that the cliff area is off limits and may try to visit the cliff area multiple times. By adding cliffs to the map as obstacles, the robotic surface cleaning device may avoid returning to cliff area again during the same work session and in future work sessions if the map is saved. In some embodiments, the processor treats the cliff area as a perimeter of the environment and directs the robotic surface cleaning device to move along a smooth line parallel to the cliff line as it if was a wall.

In some instances where linear algebra is used, Basic Linear Algebra Subprograms (BLAS) may be implemented to carry out operations such as vector addition, vector norms, scalar multiplication, matrix multiplication, matric transpose, matrix-vector multiplication, linear combinations, dot products, cross products, and the like.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

In some embodiments, the processor localizes itself during mapping or during operation. In some embodiments, methods of localization are inherently independent from mapping and path planning but may be used in tandem with any mapping or path planning method or may be used independently to localize the robotic surface cleaning device irrespective of the path or map of the environment. In some embodiments, the processor uses quantum SLAM.

In some embodiments, the processor localizes the robotic surface cleaning device within an environment represented by a phase space or Hilbert space. In some embodiments, the space includes all possible states of the robotic surface cleaning device within the space. In some embodiments, a probability distribution may be used by the processor of the robotic surface cleaning device to approximate the likelihood of the state of the robotic surface cleaning device being within a specific region of the space. In some embodiments, the processor of the robotic surface cleaning device determines a phase space probability distribution over all possible states of the robotic surface cleaning device within the phase space using a statistical ensemble including a large collection of virtual, independent copies of the robotic surface cleaning device in various states of the phase space. In some embodiments, the phase space consists of all possible values of position and momentum variables. In some embodiments, the processor represents the statistical ensemble by a phase space probability density function ρ(p,q,t), q and p denoting position and velocity vectors. In some embodiments, the processor uses the phase space probability density function ρ(p,q,t) to determine the probability ρ(p,q,t)dq dp that the robotic surface cleaning device at time t will be found in the infinitesimal phase space volume dq dp.

In some embodiments, the processor evolves each state within the ensemble over time t according to an equation of motion. Since each state evolves over time, the statistical ensemble evolves over time as well. In some embodiments, the processor models the motion of the robotic surface cleaning device using a Hamiltonian dynamical system with generalized coordinates q, p wherein dynamical properties are modeled by a Hamiltonian function H. In some embodiments, the processor evolves the entire statistical ensemble of phase space density function ρ(p,q,t) under a Hamiltonian H using the Liouville equation $$\frac{\partial \rho}{\partial t} = -\{\rho, H\},$$

wherein ({•,•} denotes the Poisson bracket and H is the Hamiltonian of the system. In some embodiments, the processor evolves the phase space probability density function ρ(p,q,t) over time using the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, $\nabla \cdot$ denotes divergence, and $D=\frac{1}{2}\sigma_N\sigma_N^T$ is the diffusion tensor. The Fokker-Plank equation describes the time evolution of a probability density function of a particle under drag and random forces. In comparison to the behavior of the robotic surface cleaning device modeled by both the Hamiltonian and Liouville equations, which are purely deterministic, the Fokker-Planck equation includes stochastic behaviour. In other embodiments, the processor incorporates stochastic behaviour by modeling the dynamics of the robotic surface cleaning device using Langevin dynamics, which models friction forces and perturbation to the system, instead of Hamiltonian dynamics. The Langevian equations are given by $M\ddot{q}=-\nabla_q U(q)-\gamma p+\sqrt{2\gamma k_B T}MR(t)$, wherein (−γp) are friction forces, R (t) are random forces with zero-mean and delta-correlated stationary Gaussian process, T is the temperature, $k_B$ is Boltzmann's constant, γ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho).$$

In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor of the robotic surface cleaning device using, for example, finite difference and/or finite element methods.

In some embodiments, the processor of the robotic surface cleaning device may update the phase space probability distribution when the processor receives readings (or measurements or observations). Any type of reading that may be represented as a probability distribution that describes the likelihood of the state of the robotic surface cleaning device being in a particular region of the phase space may be used. Readings may include measurements or observations acquired by sensors of the robotic surface cleaning device or external devices such as a Wi-Fi™ camera. Each reading may provide partial information on the likely region of the state of the robotic surface cleaning device within the phase space and/or may exclude the state of the robotic surface cleaning device from being within some region of the phase space. For example, a depth sensor of the robotic surface cleaning device may detect an obstacle in close proximity to the robotic surface cleaning device. Based on this measurement and using a map of the phase space, the processor of the robotic surface cleaning device may reduce the likelihood of the state of the robotic surface cleaning device being any state of the phase space at a great distance from an obstacle. In another example, a reading of a floor sensor of the robotic surface cleaning device and a floor map may be used by the processor of the robotic surface cleaning device to adjust the likelihood of the state of the robotic surface cleaning device being within the particular region of the phase space coinciding with the type of floor sensed. In an additional example, a measured Wi-Fi™ signal strength and a map of the expected Wi-Fi™ signal strength within the phase space may be used by the processor of the robotic surface cleaning device to adjust the phase space probability distribution. As a further example, a Wi-Fi™ camera may observe the absence of the robotic surface cleaning device within a particular room. Based on this observation the processor of the robotic surface cleaning device may reduce the likelihood of the state of the robotic surface cleaning device being any state of the phase space that places the robotic surface cleaning device within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robotic surface cleaning device may update the current phase space probability distribution $\rho(p,q,t_i)$ by re-weighting the phase space probability distribution with an observation probability distribution $m(p,q,t_i)$ according to $$\overline{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor of the robotic surface cleaning device for a reading at time $t_i$ using an inverse sensor model. In some embodiments, wherein the observation probability distribution does not incorporate the confidence or uncertainty of the reading taken, the processor of the robotic surface cleaning device may incorporate the uncertainty into the observation probability distribution by determining an updated observation probability distribution $$\hat{m} = \frac{1-\alpha}{c} + \alpha m$$

that may be used in re-weighting the current phase space probability distribution, wherein $\alpha$ is the confidence in the reading with a value of $0 \leq \alpha \leq 1$ and $c=\iint dpdq$. At any given time, the processor of the robotic surface cleaning device may estimate a region of the phase space within which the state of the robotic surface cleaning device is likely to be given the phase space probability distribution at the particular time.

In some embodiments, the processor uses finite differences methods (FDM) to numerically approximate partial differential equations of the form $$\frac{\partial \rho}{\partial t} = -\{\rho, H\} + \nabla_p \cdot (D \nabla_p \rho).$$

Numerical approximation has two components, discretization in space and in time. The finite difference method relies on discretizing a function on a uniform grid. Derivatives are then approximated by difference equations. In some embodiments, the processor uses finite element methods (FEM) to numerically approximate partial differential equations of the form $$\frac{\partial \rho}{\partial t} = -\{\rho, H\} + \nabla_p \cdot (D \nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Perimeters conditions are essential in solving the partial differential equations. Perimeters conditions are a set of constraints that determine what happens at the perimeters of the domain while the partial differential equation describe the behaviour within the domain. In some embodiments, the processor uses one or more the following perimeters conditions: reflecting, zero-flux (i.e., homogenous Neumann perimeters conditions)

$$\frac{\partial \rho}{\partial \vec{n}} = 0 \text{ for } p, q \in \partial D, \vec{n}$$

unit normal vector on perimeters; absorbing perimeters conditions (i.e., homogenous Dirichlet perimeters conditions) $\rho=0$ for $p,q \in \partial D$; and constant concentration perimeters conditions (i.e., Dirichlet) $\rho=\rho_0$ for $p,q \in \partial D$. To integrate the perimeters conditions into FDM, the processor modifies the difference equations on the perimeters, and when using FEM, they become part of the weak form (i.e., integration by parts) or are integrated in the solution space. In some embodiments, the processor uses Fenics for an efficient solution to partial differential equations.

In some embodiments, the processor uses quantum mechanics to localize the robotic surface cleaning device. In some embodiments, the processor of the robotic surface cleaning device may determine a probability density over all possible states of the robotic surface cleaning device using a complex-valued wave function for a single-particle system $\Psi(\vec{r},t)$, wherein $\vec{r}$ may be a vector of space coordinates. In some embodiments, the wave function $\Psi(\vec{r},t)$ is proportional to the probability density that the particle will be found at a position $\vec{r}$, i.e. $\rho(\vec{r},t)=|\Psi(\vec{r},t)|^2$. In some embodiments, the processor of the robotic surface cleaning device normalizes the wave function which is equal to the total probability of finding the particle, or in this case the robotic surface cleaning device, somewhere. The total probability of finding the robotic surface cleaning device somewhere adds up to unity $\int |\Psi(\vec{r},t)|^2 \, dr=1$. In some embodiments, the processor of the robotic surface cleaning device may apply Fourier transform to the wave function $\Psi(\vec{r},t)$ to yield the wave function $\Phi(\vec{p},t)$ in the momentum space, with associated momentum probability distribution $\sigma(\vec{p},t)=|\Phi(\vec{p},t)|^2$. In some embodiments, the processor may evolve the wave function $\Psi(\vec{r},t)$ using Schrödinger equation $$i\hbar \frac{\partial}{\partial t}\Psi(\vec{r},t) = \left[-\frac{\hbar^2}{2m}\nabla^2 + V(\vec{r})\right]\Psi(\vec{r},t),$$

wherein the bracketed object is the Hamilton operator $$\hat{H} = -\frac{\hbar^2}{2m}\nabla^2 + V(\vec{r}),$$

i is the imaginary unit, $\hbar$ is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$ and that is why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function $$\left(\text{e.g., } \Psi(\vec{r}, t) = \Phi(\vec{r})e^{-\frac{iEt}{\hbar}},\right.$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r},t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $\varphi_k$, $$|c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\psi(\vec{r},t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int\phi^*\psi d\tau=\langle\phi|\cdot|\psi\rangle\equiv\langle\phi|\psi\rangle$. In some embodiments, $\langle\phi|$ and $|\psi\rangle$ are state vectors of a system and the processor determines the probability of finding $\langle\phi|$ in state $|\psi\rangle$ using $p(\langle\phi|,|\psi\rangle)=|\langle\phi|\psi\rangle|^2$. For a Hermitian operator $\hat{A}$ eigenkets and eigenvalues are denoted $A|n\rangle=a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A=\langle n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor determines the probability of obtaining $a_n$ as an outcome of a measurement of A using $p(a_n)=|\langle n|\phi\rangle|^2$. In some embodiments, the processor evolves the time-dependent Schrodinger equation using $$i\hbar\frac{\partial|\psi\rangle}{\partial t} = \hat{H}|\psi\rangle$$

Given a state $|\phi\rangle$ and a measurement of the observable A, the processor determines the expectation value of A using $\langle A\rangle=\langle\phi|A|\phi\rangle$, corresponding to $$\langle A\rangle = \frac{\int\phi^*\hat{A}\phi d\tau}{\int\phi^*\phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robotic surface cleaning device, the processor evolves the wave function $\Psi(\vec{r},t)$ using the Schrodinger equation $$i\hbar\frac{\partial}{\partial t}\Psi(\vec{r}, t) = \left[-\frac{\hbar^2}{2m}\nabla^2 + V(\vec{r})\right]\Psi(\vec{r}, t).$$

In some embodiments, a solution is written in terms of eigenfunctions $\psi_n$ with eigenvalues $E_n$ of the time-independent Schrodinger equation $H\psi_n=E_n\psi_n$, wherein $\Psi(\vec{r},t)=\Sigma_{c_n}c_n e^{-iE_n t/\hbar}\psi_n$ and $c_n=\int\Psi(\vec{r},0)\psi_n^* d\tau$. In some embodiments, the time evolution is expressed as a time evolution via a unitary operator U(t), $\Psi(\vec{r},t)=U(t)\Psi(\vec{r},0)$ wherein $U(t)=e^{-iHt/\hbar}$. In some embodiments, the probability density of the Hilbert space may be updated by the processor of the robotic surface cleaning device each time an observation or measurement is received by the processor of the robotic surface cleaning device. For each observation with observation operator A the processor of the robotic surface cleaning device may perform an eigen-decomposition $A\omega_n = a_n \omega_n$, wherein the eigenvalue corresponds to the observed quantity. In some embodiments, the processor observes a value a with probability $0 \leq p \leq 1$. In some embodiments, wherein the operator has a finite spectrum or a single eigenvalue is observed, the processor of the robotic surface cleaning device may collapse to the eigenfunction(s) with corresponding probability $\Psi(\vec{r},t) \rightarrow \gamma \Sigma_{n=1}^{N} p(a_n) d_n \omega_n$, wherein $d_n = \int \omega_n^* \Psi dr$, p(a) is the probability of observing value a, and $\gamma$ is a normalization constant. In some embodiments, wherein the operator has continuous spectrum, the summation may be replaced by an integration $\Psi(\vec{r},t) \rightarrow \gamma \int p(a) d_n \omega_n da$, wherein $d_n = \int \omega_n^* \Psi dr$.

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators.

Further details of the localization methods described above and examples implementing the localization methods described above are included in U.S. patent application Ser. No. 16/427,317, 62/748,943, and 62/740,573, the entire contents of which are hereby incorporated by reference.

In some embodiments, the processor of the robotic surface cleaning device considers multiple possible scenarios wherein the robotic surface cleaning device is located in other likely locations in addition to the location estimated by the processor. As the robotic surface cleaning device moves within the environment, the processor gains information of its surroundings from sensory devices which it uses to eliminate less likely scenarios. For example, consider a processor of a robotic device estimating itself to be 100 cm away from a wall. To account for measurement noise the processor considers additional likely scenarios wherein the robotic device is, for example, 102, 101, 99 and 98 cm away from the wall. The processor considers these scenarios as possibly being the actual true distance from the wall and therefore reduces its speed after traveling 98 cm towards the wall. If the robotic device does not bump into the wall after traveling 98 cm towards the wall it eliminates the possibility of it having been 98 cm away from the wall and the likelihood of the robotic device being 99, 100, 101 and 102 cm away from the wall increases. This way as the robotic device travels within the environment, the processor adjusts its confidence of its location with respect to other robotic devices and the environment based on observations and information gained of the surroundings. In some cases, such a method reduces collisions. In an alternative visualization of this approach the processor inflates the surface area occupied by the robotic device such that it is hypothesized that the robotic device occupies all state spaces falling within the borders of the inflated surface area. Since the error of perceived position of the robot increases with movement, the processor inflates the surface area occupied by the robotic device with every movement. The processor deflates the surface area occupied by the robotic device when occupancy of a hypothesized state space falling within the borders of the surface area is proven to be false, thereby reducing the number of state spaces and hence area occupied by the robotic device. In this example, wherein the surface area occupied by the robotic device is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc.

In some embodiments, the processor initially assumes the robotic surface cleaning device is located somewhere within an area greater than the size of the robot, the location being the seed location of the robotic surface cleaning device. This is due to initial uncertainty in the position and heading of the robotic surface cleaning device and the surroundings. As more data is collected and the processor is more certain of the position of the robotic surface cleaning device relative to its surroundings, the processor reduces the size of area within which the robotic surface cleaning device is assumed to be located. On the other hand, as the robotic surface cleaning device moves and noise, such as movement noise, is introduced, the processor increases the area within which the robotic surface cleaning device is assumed to be located as uncertainty in the position of the robot increases. In some embodiments, the processor adjusts the shape of the area within which the robotic surface cleaning device is assumed to be located within based on deviation between the measured and true heading and translation of the robotic surface cleaning device as it moves. In some embodiments, the processor uses information on linear and angular undershoot and overshoot to help determine the shape of the area within which the robotic surface cleaning device is assumed to be located within. Force is needed to cause linear and angular acceleration and a given amount of force can either be spent on linear overshooting or angular overshooting. If the robotic surface cleaning device overshoots linearly it undershoots angularly and vice versa.

In embodiments, wherein the state of the robotic surface cleaning device within a space is initially unknown, the processor of the robotic surface cleaning device may generate a uniform probability distribution over the space. In other instances, any other probability distribution may be generated depending on the information known about the state of the robotic surface cleaning device and the certainty of the information. Over time and as more measurements and observations are received by the processor of the robotic surface cleaning device, the probability distribution over all possible states of the robotic surface cleaning device in the space evolves.

In some embodiments, the processor uses quantum filtering. In some embodiments, the processor simulates multiple robotic surface cleaning devices located in different possible locations within the environment. In some embodiments, the processor may view the environment from the perspective of each different simulated robotic surface cleaning device. In some embodiments, the collection of simulated robotic surface cleaning devices form an ensemble. In some embodiments, the processor evolves the location of each simulated robotic surface cleaning device or the ensemble over time. In some embodiments, the range of movement of each simulated robotic surface cleaning device may be different. In some embodiments, the processor may view the environment from the field of view (FOV) of each simulated robotic surface cleaning device, each simulated robotic surface cleaning device having a slightly different map of the environment based on their simulated location and FOV. In some embodiments, the collection of simulated robotic surface cleaning devices form an approximate region within which the robotic surface cleaning device is truly located. In some embodiments, the true location of the robotic surface cleaning device is one of the simulated robotic surface cleaning devices. In some embodiments, when a measurement of the environment is taken, the processor checks the measurement of the environment against the map of the environment of each of the simulated robotic surface cleaning devices. In some embodiments, the processor predicts the robotic surface cleaning device is truly located in the location of the simulated robotic surface cleaning device having a map that best matches the measurement of the environment. In some embodiments, the simulated robotic surface cleaning device which the processor believes to be the true robotic surface cleaning device may change or may remain the same as new measurements are taken and the ensemble evolves over time. In some embodiments, the ensemble of simulated robotic surface cleaning devices remain together as the ensemble evolves over time. In some embodiments, the overall energy of the collection of simulated robotic surface cleaning devices remains constant in each timestamp, however the distribution of energy to move each simulated robotic surface cleaning device forward during evolution may not be distributed evenly among the simulated robotic surface cleaning devices. For example, in one instance a simulated robotic surface cleaning device may end up much further away than the remaining simulated robotic surface cleaning devices or too far to the right or left, however in future instances and as the ensemble evolves may become close to the group of simulated robotic surface cleaning devices again. In some embodiments, the ensemble evolves to most closely match the sensor readings, such as a gyroscope or optical sensor. In some embodiments, the evolution of the location of simulated robotic surface cleaning devices is limited based on characteristics of the physical robotic surface cleaning device. For example, a robot may have limited speed and limited rotation of the wheels, therefor it would be impossible for the robot to move two meters, for example, in between time steps. In another example, the robot may only be located in certain areas of an environment, where it may be impossible for the robot to be located in areas where an obstacle is located for example. In some embodiments, this method of quantum filtering may be used to hold back certain elements or modify the overall understanding of the environment. For example, when the processor examines a total of ten simulated robotic surface cleaning devices one by one against a measurement, and selects one simulated robotic surface cleaning device as the true robotic surface cleaning device, the processor filters out nine simulated robotic surface cleaning devices, thus filtering ten quanta to one quantum.

In some embodiments, the FOV of each simulated robotic surface cleaning device may not include the exact same features as one another. In some embodiments, the processor saves the FOV of each of the simulated robotic surface cleaning devices in memory. In some embodiments, the processor combines the FOVs of each simulated robotic surface cleaning device to create a FOV of the ensemble using methods such as least squares methods. This method is described above for creating a map by aligning sensor data to create one representation of the environment, which may be more accurate than each individual FOV. In some embodiments, the processor tracks the FOV of each of the simulated robotic surface cleaning devices individually and the FOV of the entire ensemble. In some embodiments, other methods may be used to create the FOV of the ensemble (or a portion of the ensemble). For example, a classifier AI algorithm may be used, such as Naive Bayes classifier, Least squares support vector machines, k-nearest neighbor, Decision trees, and Neural networks. In some embodiments, more than one FOV of the ensemble (or a portion of the ensemble) may be generated and tracked by the processor, each FOV created using a different method. For example, the processor may track the FOV of ten simulated robotic surface cleaning devices and ten differently generated FOVs of the ensemble. At each measurement timestamp, the processor may examine the measurement against the FOV of the ten simulated robotic surface cleaning devices and/or the ten differently generated FOVs of the ensemble and may choose any of these 20 possible FOVs as the ground truth. In some embodiments, the processor may examine the 20 FOVs instead of the FOVs of the simulated robotic surface cleaning devices and choose a derivative as the ground truth. The number of simulated robotic surface cleaning devices and/or the number of generated FOVs may vary. During mapping for example, the processor may take a first field of view of the camera and calculate a FOV for the ensemble or each individual observer (simulated robotic surface cleaning device) inside the ensemble and combine it with the second field of view captured by the camera for the ensemble or each individual observer inside the ensemble. The processor switches between the FOV of each observer (e.g., like multiple CCTV cameras in an environment that an operator may switch between) and/or one or more FOVs of the ensemble (or a portion of the ensemble) and chooses the FOVs that are more probable to be close to ground truth. At each time iteration, the FOV of each observer and/or ensemble evolves into being closer to ground truth.

Figure 13:
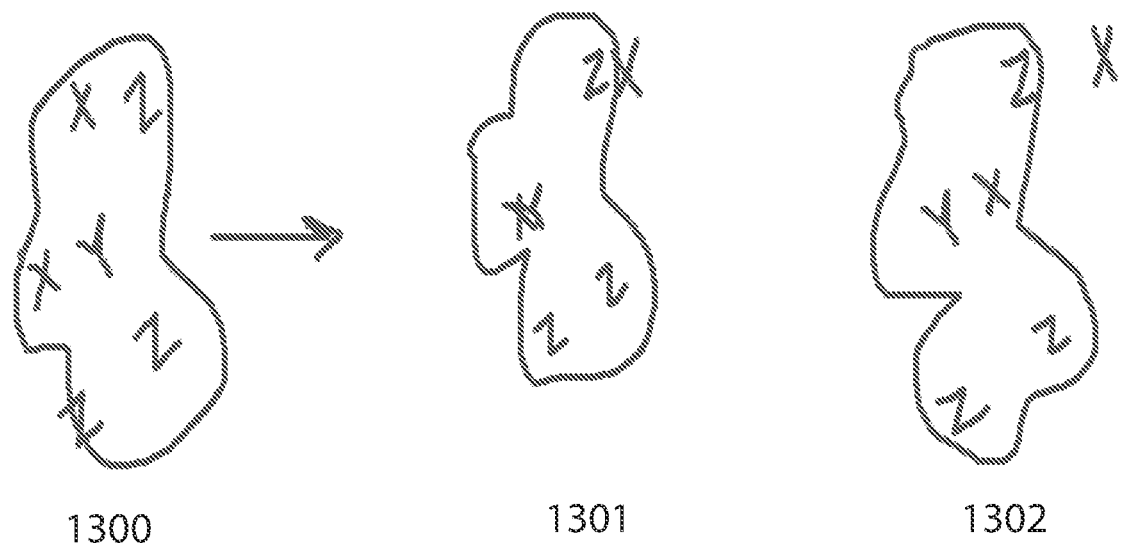
FIG. 13 illustrates an example of an evolution of an ensemble, according to some embodiments.

In some embodiments, simulated robotic surface cleaning devices may be divided in two or more classes. For example, simulated robotic surface cleaning devices may be classified based on their reliability, such as good reliability, bad reliability, or average reliability or based on their speed, such as fast and slow. Classes that move to a side a lot may be used. Any classification system may be created, such as Linear classifiers like Fisher's linear discriminant, Logistic regression, Naive Bayes classifier and Perceptron, Support vector machines like Least squares support vector machines, Quadratic classifiers, Kernel estimation like k-nearest neighbor, Boosting (meta-algorithm), Decision trees like Random forests, Neural networks, and Learning vector quantization. In some embodiments, each of the classes evolve differently. For example, for fast speed and slow speed classes, each of the classes moves differently wherein the simulated robotic surface cleaning devices in the fast class will move very fast and will be ahead of the other simulated robotic surface cleaning devices in the slow class that move slower and fall behind. For example, given a gyroscope that shows two meters of movement and classes X, Y, and Z, the ensemble may evolve as illustrated in FIG. 13. At each time stamp 1300, 1301, and 1302, class X moves the fastest as it belongs to the fastest speed class. In other words, when a force is applied at each time stamp to evolve the classes over time, the force moves class X more than the rest of the classes. This may be due to class X being lighter than the rest of the simulated robotic surface cleaning devices. The kind and time of evolution may have different impact on different simulated robotic surface cleaning devices within the ensemble. The evolution of the ensemble as a whole may or may not remain the same. The ensemble may be homogenous or non-homogenous.

In some embodiments, samples are taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the robotic surface cleaning device increases, more samples are taken. Or more samples are taken when the robotic surface cleaning device is traveling on rough terrain. In a machine learned system, the frequency of sampling may depend on predicted drift. For example, if in previous timestamps the measurements taken indicate that the robotic surface cleaning device has reached the intended position fairly well, the frequency of sampling is reduced. In some embodiments, the above explained dynamic system may be equally used to determine the size of the ensemble. If, for example, in previous timestamps the measurements taken indicate that the robotic surface cleaning device has reached the intended position fairly well, a smaller ensemble may be used to correct the knowledge of where the robotic surface cleaning device is. In some embodiments, the ensemble is regenerated at each interval. In some embodiments, a portion of the ensemble is regenerated. In some embodiments, a portion of the ensemble that is more likely to depict ground truth may be preserved and the other portion regenerated. In some embodiments, the ensemble may not be regenerated but one of the observers (simulated robotic surface cleaning devices) in the ensemble that is more likely to be ground truth is chosen as the most feasible representation of the true robotic surface cleaning device. In some embodiments, observers (simulated robotic surface cleaning devices) in the ensemble take part in becoming the most feasible representation of the true robotic surface cleaning device based on how their individual description of the surrounding fits with the measurement taken.

In some embodiments, the processor generates an ensemble of hypothetical positions of various simulated robotic surface cleaning devices within the environment. In some embodiments, the processor generates a simulated representation of the environment for each hypothetical position of the robotic surface cleaning device from the perspective corresponding with each hypothetical position. In some embodiments, the processor compares the measurement against each simulated representation of the environment (e.g., a floor type map, a spatial map, a Wi-Fi map, etc.) corresponding with a perspective of each of the hypothetical positions of the robotic surface cleaning device. In some embodiments, the processor chooses the hypothetical position of the robotic surface cleaning device that makes the most sense as the most feasible position of the robotic surface cleaning device. In some embodiments, the processor selects additional hypothetical positions of the robotic surface cleaning device as a backup to the most feasible position of the robotic surface cleaning device. In some embodiments, the processor nominates one or more hypothetical positions as a possible leader or otherwise a feasible position of the robotic surface cleaning device. In some embodiments, the processor nominates a hypothetical position of the robotic surface cleaning as a possible leader when the measurement fits well with the simulated representation of the environment corresponding with the perspective of the hypothetical position. In some embodiments, the processor defers a nomination of a hypothetical position to other hypothetical positions of the robotic surface cleaning device. In some embodiments, the hypothetical positions with the highest numbers of deferrals are chosen as possible leaders. In some embodiments, the process of comparing measurements to simulated representations of the environment corresponding with the perspectives of different hypothetical positions of the robotic surface cleaning device, nominating hypothetical positions as possible leaders, and choosing the hypothetical position that is the most feasible position of the robotic surface cleaning device may be iterative. In some cases, the processor selects the hypothetical position with the lowest deviation between the measurement and the simulated representation of the environment corresponding with the perspective of the hypothetical position as the leader. In some embodiments, the processor stores one or more hypothetical positions that are not elected as leader for another round of iteration after another movement of the robot. In other cases, the processor eliminates one or more hypothetical positions that are not elected as leader or eliminates a portion and stores a portion for the next round of iteration. In some cases, the processor chooses the portion of the one or more hypothetical positions that are stored based on one or more criteria. In some cases, the processor chooses the portion of hypothetical positions that are stored randomly and based on one or more criteria. In some cases, the processor eliminates some of the hypothetical positions of the robotic surface cleaning device that pass the one or more criteria. In some embodiments, the processor evolves the ensemble of hypothetical positions of the robotic surface cleaning device similar to a genetic algorithm. In some embodiments, the processor uses a MDP, as mathematically described below, to reduce the error between the measurement and the representation of the environment corresponding with each hypothetical position over time, thereby improving the chances of each hypothetical position in becoming or remaining leader. In some cases, the processor applies game theory to the hypothetical positions of the robotic surface cleaning devices, such that hypothetical positions compete against one another in becoming or remaining leader. In some embodiments, hypothetical positions compete against one another and the ensemble becomes an equilibrium wherein the leader following a policy ($\pi$) remains leader while the other hypothetical positions maintain their current positions the majority of the time.

The multi-dimensionality in quantum localization described above provides robustness that may be useful in various applications. In some embodiments, the processor uses localization for controlling the operation, settings, and functionality of the robotic surface cleaning device. For example, the processor uses localization to control the behavior of the robotic surface cleaning device in different areas, where for instance, certain cleaning functions or settings are desired for different environments. These functions or settings may be triggered once the processor has localized the robotic surface cleaning device against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic surface cleaning device. If the processor localizes the robotic surface cleaning device against a perimeter, for example, it may choose to select a path along the perimeter or it may trigger a polymorphic or other type of path planning algorithm. Or, localizing the robotic surface cleaning device against a perimeter may trigger a path planning algorithm for cleaning central areas of the environment and, once completed, a wall follow algorithm for cleaning along the boundaries of the environment.

Further details of localization methods that may be used independently or in combination are described in U.S. Patent Application Nos. 62/748,943, 62/746,688, Ser. No. 16/297, 508, 62/740,573, 62/740,580, Ser. Nos. 15/955,480, 15/425,130, and 15/955,344 the entire contents of which are hereby incorporated by reference.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multipurpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used. In some embodiments, a localization and mapping chip or a processing chip such as a CPU or MCU with a localization and mapping processing unit may be used.

In some embodiments, various bumps on a path of the robotic surface cleaning device may affect the map or localization. In some embodiments, an IMU may be used to measure a bump in the z-axis. In some embodiments, the processor detects a bump when the values in the z-axis suddenly increase beyond a predetermined threshold. In some embodiments, the processor filters out the readings captured while the robot was traversing across the bump. In some embodiments, the processor uses the last known good mapping and localization prior to the robot traversing the bump, generates an ensemble of eight (or another number) hypothesized robots, each hypothesized robot being approximately half a diameter of the robot apart from one another and located within the last known good map around the last known good localization, and determines which hypothesized robot fits best with readings collected after fully traversing over the bump. In some embodiments, the number of hypothesized robots and the distance between the hypothesized robots may vary. In some embodiments, the processor may choose a particular hypothesized robot and generate an ensemble around the hypothesized robot in iterative process until gaining localization back. In some embodiments, these methods may be performed in parallel or done in an iterative process. In some embodiments, the processor of the robot adjusts all of its motors such as the main brush motor, the one or more side brushes motors, etc. to on, off, then maximum speed intermittently when the robot becomes stuck. In some embodiments, the processor stops its motors and announces an error code. In some embodiments, the GUI of the robot or an application of a communication device paired with the processor of the robot may suggest that the robot either abort the sweeping or drive back to the dock when the robot is stuck. In some embodiments, the processor adjusts all motors to maximum speed and drives at full speed to overcome being stuck and drives back to the dock when drive back to the dock is selected.

In some embodiments, the robotic surface cleaning device may attempt to make a determination as to whether or not it has visited a work area previously based on, for example, features of an environment. In some embodiments, a unique characteristic may appear slightly different when identified a second time, and the processor of a robotic surface cleaning device may need to manipulate the data of the unique characteristic captured in order to determine whether or not the characteristic accurately matches what was previously captured when determining whether or not a work area has previously been operated in. In some embodiments, if the processor of the robotic surface cleaning device recognizes an area as having been previously visited, the processor may alter the operations or path of the robotic surface cleaning device. In some embodiments, the robotic surface cleaning device may be ordered to skip operations in a work area. For example, a button on a user interface of the robotic surface cleaning device, or an application of a communications device that is paired with the robotic surface cleaning device may be used to command the processor of the robotic surface cleaning device to skip operations in a given work area. An example of a communications device includes, but is not limited to, a smart phone, smart watch, laptop, tablet, remote control, or the like. In some embodiments, if the robotic surface cleaning device enters a work area, the robotic surface cleaning device may be commanded to leave the work area. In some embodiments, the robotic surface cleaning device may attempt to return to the work area for operations at a later time. In some embodiments, the robotic surface cleaning device may be commanded to clean a room at a particular point in a cleaning session. In some embodiments, a selection may be made as to when a work area is to be operated in based on the number of times a button is pressed commanding the robot to skip a work area. In some embodiments, the robotic surface cleaning device may be commanded to leave an area, where after the robotic surface cleaning device may attempt to operate in the area during a different operational cycle. In some embodiments, the robotic surface cleaning device may store data regarding commands to leave a work area and use this data for future operational cycles. In some embodiments, the robotic surface cleaning device may alter a schedule it has set for recurring services based on commands received to vacate an area. In some embodiments, a command may be set for the robotic surface cleaning device to vacate an area but to return at an unspecified future time. In some embodiments, a command may be set for the robotic surface cleaning device to vacate an area but to return at a specified predetermined time. In some embodiments, if a first robotic surface cleaning device obtains a command to leave a work area, the processor of the first robotic surface cleaning device may communicate with additional robotic surface cleaning devices for the purposes of sharing this data in order to indicate that other robotic surface cleaning devices should not operate in a given area at a particular time or for the purposes of sharing other data. In some embodiments, the processor of the robotic surface cleaning device may use historical data with regards to prior work operations when planning an operational session. For example, in embodiments, for a mobile robotic cleaning device, an operational session set by the processor of the robotic surface cleaning device may use prior historical data with regards to the level of debris previously cleaned in each work area in determining which work areas should be cleaned first.

In some embodiments, the processor of the robotic surface cleaning device may fail in a localization capacity and not recognize where it is located in a work environment. In some embodiments, if localization fails, the robotic surface cleaning device may begin a new mapping of the working environment, operating in a new functional and mapping capacity, visiting each work area, such as, each room, and mapping these areas beginning with the work area in which localization first failed. In some embodiments, the failure of localization may include the loss of data pertaining to the location of the robotic surface cleaning device's initial navigational starting point, such as the location of a docking or base station of the robotic surface cleaning device to which the robotic surface cleaning device returns following each work session. In some embodiments, when localization fails the processor of the robotic surface cleaning device may immediately begin to search for the base station. In some embodiments, when localization fails the robotic surface cleaning device may operate and map work areas while simultaneously searching for the base station. In some embodiments, when localization fails the robotic surface cleaning device may complete a work session, mapping the environment as it does so, and return to each work area after the work session to search for the base station. In some embodiments, the processor of the robotic surface cleaning device may search for the base station by searching for an IR light emitted by a transmitter of the base station to be received by the robotic surface cleaning device which will signal the robotic surface cleaning device to return to the base station. In some embodiments, the processor of the robotic surface cleaning device may search for a base station by rotating in 360 degrees in each work area until a signal from the base station is received by the robotic surface cleaning device. In some embodiments, if the robotic surface cleaning device does not detect a signal from the base station in a work area, the robotic surface cleaning device may automatically navigate to a different work area. In some embodiments, if the robotic surface cleaning device detects a signal from the base station in a work area, the robotic surface cleaning device may automatically cease operations and navigate directly to the base station. In some embodiments, if the robotic surface cleaning device detects a signal from the base station in a work area, the robotic surface cleaning device may navigate to a new work area before navigating back to the base station. In some embodiments, if the base station is detected by the robotic surface cleaning device, and the robotic surface cleaning device thereafter navigates to a new work area, a path plan may be set by the processor for navigating back to the base station. In some embodiments, if a first robotic surface cleaning device's localization fails, a processor of the first robotic surface cleaning device may communicate with a centralized control system, a base station, other devices or processors of other robotic surface cleaning devices to assist with the processor recovering a localization capacity. For example, if a first robotic surface cleaning device's localization fails, a processor of the first robotic surface cleaning device may send out, for example, a distress signal indicating that it has lost localization, and a processor of a second robotic surface cleaning device, may share data such as maps or other beneficial data with the processor of the first robotic surface cleaning device to assist the with recovering some form of a localization capacity. In an additional example, if the localization capacity of the processor of the robotic surface cleaning device fails, the processor may communicate with a centralized control system, base station, other devices or processors of other robotic surface cleaning devices to attempt to recover data such as maps or other beneficial data to assist the with recovering some form of a localization capacity. In some embodiments, the signal transmitter used may be an omni-directional signal emitter such as, for example, an IR signal emitter. In some embodiments, the signal transmitter may be located on the robotic surface cleaning device and the signal may be received by the base station. In some embodiments, when localization fails, the robotic surface cleaning device may detect and mark obstacles encountered in the environment within a new map generated during the operational cycle as the robotic surface cleaning device navigates in the work environment. In some embodiments, features on the base station may be used for the processor of the robotic surface cleaning device to easily distinguish when searching for the base station. For example, unique angles or physical characteristics of a base station may be implemented in memory of the processor to help the processor easily identify the base station. Further, characteristics of a surface of a base station such as printing, painting, patterns, and the like may be used by the processor to easily identify the base station. Further details of methods for recognizing prior rooms and skipping prior rooms visited are disclosed in U.S. Patent Application No. 62/740,558, the entire contents of which is hereby incorporated by reference.

In some embodiments, the processor of the robotic surface cleaning device generates a movement path in real-time based on the observed environment. In some embodiments, the processor of the robotic surface cleaning devices determines a movement path in real-time based on sensor observations captured by sensors. In some embodiments, a topological graph represents the movement path and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic surface cleaning device as it follows along edges linked at vertices. While executing the movement path, in some embodiments, rewards may be assigned by the processor as the robotic surface cleaning device takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic surface cleaning device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. In some embodiments, the reward is determined individually for the robotic surface cleaning device, or the reward is a cumulative reward of each of the two or more robotic surface cleaning devices collaborating with another. For example, the movement path chosen for each of the two or more robotic surface cleaning devices collectively maximizes the cumulative reward. Further, the states, actions, and outcomes experienced by one robotic surface cleaning device may be shared with other robotic surface cleaning devices operating within the same environment such that actions that resulted in poor outcome may be avoided. For example, if one robotic device finds that the action of transitioning to a particular state results in the robotic device becoming stuck, this information may be shared with other processors of other robotic devices such that they may avoid that particular action.

In some embodiments, the properties of the vertices and edges of the topological graph describing the movement path of the robotic surface cleaning device may be provided at run-time as an argument based on sensory input of the robotic surface cleaning device or other collaborating robotic surface cleaning devices or from external sensors. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as driving surface type (e.g., gravel, paved, hard wood floor, carpet, tile, etc.), area identifier (e.g., excavation area, soil dump site, parking lot, highway, bedroom, kitchen, etc.) and/or driving conditions (e.g., maximum speed). In some embodiments, the number of roots or nodes of the topological graph is limited to one. A vertex designated as a root within the topological graph by the processor of the robotic surface cleaning device is capable of reaching the whole graph from the designated vertex, i.e. there is a path from the root to all other vertices and edges within the graph.

As the processor receives sensory input (from a local or remote sources), in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of distance measurements. In some embodiments, distance measurements may be taken using distance measurement devices such as LIDAR, camera, laser, sonar, ultrasonic, stereo vision, structured light vision devices or chip-based depth sensors using CMOS or CCD imagers, IR sensors, and such. In some embodiments, other sensory input may be used, for example, data indicating driving surface type or obstacle detection. For example, optical driving surface sensors may detect a pattern of reflected light emitted onto the driving surface, which upon multiple stages of signal processing and machine learning embodiments may determine to a degree of certainty the type of driving surface upon which the robotic surface cleaning device drives. As a further example, obstacles may be detected by embodiments based on a sensed reflection of emitted light from an obstacle sensor. Tactile sensors may also be used by embodiments to provide sensory input to the processor when physical contact is made with an object. The devised topological path may be based on estimates of suitable properties for vertices and edges based on sensory input received. The next action or movement of the robotic surface cleaning device may be along a path defined by the estimated properties of the vertices and edges. As the robotic surface cleaning device executes the action, it transitions from its current state to a new state. After completing each action and transitioning to a new state, in embodiments, a reward may be assigned by the processor and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the robotic surface cleaning device incurs a negative reward at all times. Since the robotic surface cleaning device is penalized for time, any event that may reduce the efficiency of the robotic surface cleaning device in terms of time to complete its task increases its overall penalty. These events may include collisions with obstacles, number of U-turns, repeat actions, driving distance, and driving on particular types of driving surfaces. In some embodiments, the processor uses these events to directly assign negative reward thereby acting as optimization factors themselves. In some embodiments, the processor uses other efficiency metrics, such as percentage or level of task completion. Once the robotic surface cleaning device completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task. In some embodiments, the state is a collection of current states of two or more robotic surface cleaning devices collaborating with one another and the reward is a cumulative reward of each of the two or more robotic surface cleaning devices collaborating.

As multiple work sessions are executed over time, in embodiments, optimal state-action value function and optimal policy from which actions from different states are selected may be determined. From a single state, there may be several actions that may be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase. In some embodiments, the processor devises a path for the robotic surface cleaning device iteratively over multiple work sessions, evolving to become more efficient by choosing transitions that result in most favorable outcomes and by avoiding situations that previously resulted in low net reward. In some embodiments, properties for each movement path are selected within an assigned work cycle such that the cumulative penalty value for consecutive work cycles have a lowering trend over time. In some embodiments, convergence to a particular movement path may be executed by the processor of the robotic surface cleaning device when the reward is maximized or a target reward is achieved or a period of time has passed after which the processor may converge the movement path to the path with highest reward. After convergence, assuming the system did not fall into a local minimum or is able to get out of a local minimum, the evolved movement path may be deemed by the processor of the robotic surface cleaning device to likely be more efficient than alternate paths that may possibly be devised using real-time sensory input of the working environment.

The states and actions of the robotic surface cleaning device devising and executing the movement path may be represented by a Markov Chain comprised of a sequence of random variables $s_1, s_2, s_3, \ldots$. The random variables are states the robotic surface cleaning device may experience and form a set S called the state space. The topological graph defining the movement path of the robotic surface cleaning device may therefore be thought of as a sequence of states $s \in S$, where states are connected by paths and are each defined with a discrete time stamp $t \in T$. For the robotic surface cleaning device to transition from a current state s to next state s', the robotic surface cleaning device performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state $P(s'|s)$. is dependent only on the present state. A Markov chain may, therefore, be represented by a topological graph, where the edges of graph t are labelled by the probabilities of transitioning from one state at time t to another at time t'.

A Markov chain may be extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor $\gamma$, representing the difference in importance between future and present rewards. The goal of the MDP is to find an optimal state-action value function by identifying sequence of states and actions with highest net reward. Since multiple actions may be taken from each state, the goal is to also find an optimal policy that indicates the action from each state with the highest reward value.

In a MDP actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t$, $a_t$, $r_{t+1}$, $s_{t+1}$, $a_{t+1}$, $r_{t+2}$, $s_{t+2}$, $a_{t+2}$, $r_{t+3}$, ... $a_T$, $r_T$, $s_T$. The net return $R_T = r_{t+1} + \gamma^1 r_{t+2} + \ldots + \gamma^{T-t-1} r_T$ to be expected in the future is the sum of the rewards received for the sequence of states and actions beginning from state $s_t$ and ending with terminal state $s_T$, wherein $0 \leq \gamma < 1$ is a discount factor applied as distant rewards are less important. The value of a state-action pair $Q(s,a) = E[R_T | s_t = s, a_t = a]$ is defined as equivalent to the expected return $R_T$ for the sequence of states and actions beginning with state $s_t$ and action $a_t$ and ending with terminal state $s_T$. By finding the sequence of states and actions which maximize the state-action value function Q (s,a), the optimal value function $Q^*(s,a) = \max E[R_T | s_t = s, a_t = a]$ is identified. And the optimal policy $\pi^*(s) = \text{argmax } Q^*(s,a)$ for each state may be derived by identifying the highest valued action which can be taken from each state. To iteratively calculate the state-action value function for a given state s and action a, the Bellman Optimality equation may be applied. The optimal value function obeys Bellman Optimality equation and may be expressed as $Q^*(s,a) = E[r + \gamma \max Q^*(s', a')]$. The equation expresses that the value for a given state s and action a should represent the current reward r observed at state s plus the maximum discounted $\gamma$ future reward for the next state s' the robotic device would end up in. This equation can be used by the processor to iteratively calculate the state-action value $Q_{i+1}(s,a) = E[r + \gamma \max Q_i(s', a')]$ for a given state s and action a as the sequence of states and action are executed. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s,a) = \Sigma P(s'|s)[r + \gamma \max Q_i(s', a')]$, wherein P(s'|s) is the probability that action a will lead to state s', as previously described above. In the particular application of determining optimal movement path, the sequence of states and actions corresponds to the states visited and actions taken while executing the movement path from start to finish, where actions are defined by the properties of vertices and edges chosen based on sensory input from sensors of the robotic surface cleaning device or sensors of other robotic surface cleaning devices or fixed sensing devices. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions.

Path planning methods that may be used are described in U.S. patent application Ser. Nos. 16/041,286, 16/422,234, 15/406,890, 15/676,888, and 14/673,633, the entire contents of which are hereby incorporated by reference. For example, in some embodiments, the processor of a robot may learn a path, such as a path between a first location and a second location, in a variety of ways. In some embodiments, the processor of the robot may be taught a path by directing the robot along the desired path by physically moving the robot or by using a remote control or an application of a communication device paired with the processor of the robot. Other methods of moving the robot along the desired path may also be used, such as voice commands. In some embodiments, a live video feed (or real-time images) of a camera mounted on the robot is transmitted to a remote operator that controls movement of the robot using an input device (e.g., joystick, keyboard, mouse, touchscreen of communication device, etc.). In some embodiments, the processor of the robot may be taught a path between the first location and second location by physically wheeling the robot from the first location, through the environment, to the second location. In some embodiments, the first location is the same as the second location. In some embodiments, the path is a cleaning coverage path. In some embodiments, the processor of the robotic-floor cleaning device is taught the same path or different paths multiple times in the same area. In some embodiments, the processor of the robot is taught one or more paths for one or more different areas (e.g., kitchen, bathroom, bedroom, etc.) and paths to navigate between one or more areas. Over time, as the processor learns more and more paths, the processor becomes more efficient at covering areas or navigating between two areas or locations. In some embodiments, the processor collects data using one or more sensors during learning one or more paths and uses data collected to learn most efficient coverage of an area or navigation between areas or locations. In some embodiments, the processor of the robot uses similar methods and techniques as those described above for learning and converging to the most efficient movement path during manual training, wherein the robot is controlled to move along a particular path. In another example, a user may remotely guide the robot using an input device based on a live video feed from a camera of the robot transmitted to a communication device (e.g., laptop, smartphone, tablet, etc.) of the operator. In some embodiments, the operator directs the robot, from a first location to a second location. In some embodiments, the robot is manually navigated to a specific location a predetermined amount of times before it autonomously navigates to the specific location. In some embodiments, the details learned by a processor during path learning may be shared with one or more other processors of one or more robots, such that details learned by a single processor may improve SLAM of other processors of other robots. For example, during manual training a processor may learn to avoid a particular area due to high obstacle density and may mark it in the map. This may be shared with processors of other robots operating in the same environment.

In some embodiments path learning may be initiated by, for example, a user pressing a start button on the robot or on any other device capable of communicating with the processor of the robot, voice activation or autonomously upon startup, prior to beginning the process of teaching a path to a processor of the robot. In some embodiments, path learning may be completed by, for example, pressing an end button on the robot or on any other device capable of communicating with the processor of the robot, voice activation, or autonomously upon detecting no movement of the robot for a predetermined amount of time. Path learning may be initiated when the robot is positioned at a first location and completed after the robot has navigated along the desired path and returned back to the first location or any other location. In some embodiments, path learning may be initiated when the robot is positioned at a first location and completed after the robot has navigated along the desired path to the second location. Alternatively, in some embodiments, path learning may be initiated and completed using an application of a communication device, such as a mobile device, laptop or smart phone, capable of communicating with the robot. In some embodiments, an application of a communication device may be used to mark a path of the robot within a map of the working environment that may be shared with the processor of the robot and the processor actuates the robot to move along the path. During path learning, the processor of the robot may determine its location within an internal map of the working environment while simultaneously mapping the environment. In some instance, the processor of the robot may mark observed obstacles in the working environment within an internal map of the environment. In some embodiments, the robot includes an extendable handle that a user may use to physically wheel the robot along a path. In some embodiments, a communication device may be used to manually direct the robot along a path. In some embodiments, the communications device is part of the robot and it detachable and wireless. In some embodiments, the communication device is a personal device that executes an application paired with the processor of the robot. In some embodiments, the communication device is a user interface built into the robot.

In some embodiments, the robotic surface cleaning device executes a wall follow cleaning path or another type of cleaning path that includes segments parallel to one or more walls within the environment (e.g., boustrophedon). In some embodiments, the processor estimates a major wall-angle of a room to align the cleaning path of the robot with a wall in the room. In some embodiments, the processor determines a set of all obstacle locations (e.g., walls, furniture, etc.) in a current map of the environment (e.g., partial or full map) and divides the set of all obstacles locations into subsets including contiguous obstacle locations (i.e., connected obstacle locations). For example, a portion of obstacle locations within the set of all obstacle locations may correspond with a wall. The portion of obstacle locations corresponding with the wall of the environment may be contiguous as they are positioned immediately adjacent to one another and collectively form the wall, and thus may be a subset. In another example, a portion of obstacle locations corresponding with a piece of furniture may form a subset. In some embodiments, the processor determines the largest subset of contiguous obstacle locations and orders the obstacle locations within that subset (e.g., such that the contiguous obstacle locations are ordered from right to left or vice versa). In some embodiments, the processor executes a simplification algorithm (e.g., Ramer/Douglas/Puecker algorithm) over the ordered obstacle locations that eliminates obstacle locations from the subset that are within a predetermined distance from the line connecting a previous and next obstacle location. In some embodiments, the processor connects the obstacle locations remaining in the subset, resulting in one or more line segments. In some embodiments, the processor determines the angle of the longest line segment with respect to the coordinate system of the robot to estimate the room orientation.

Figure 14:
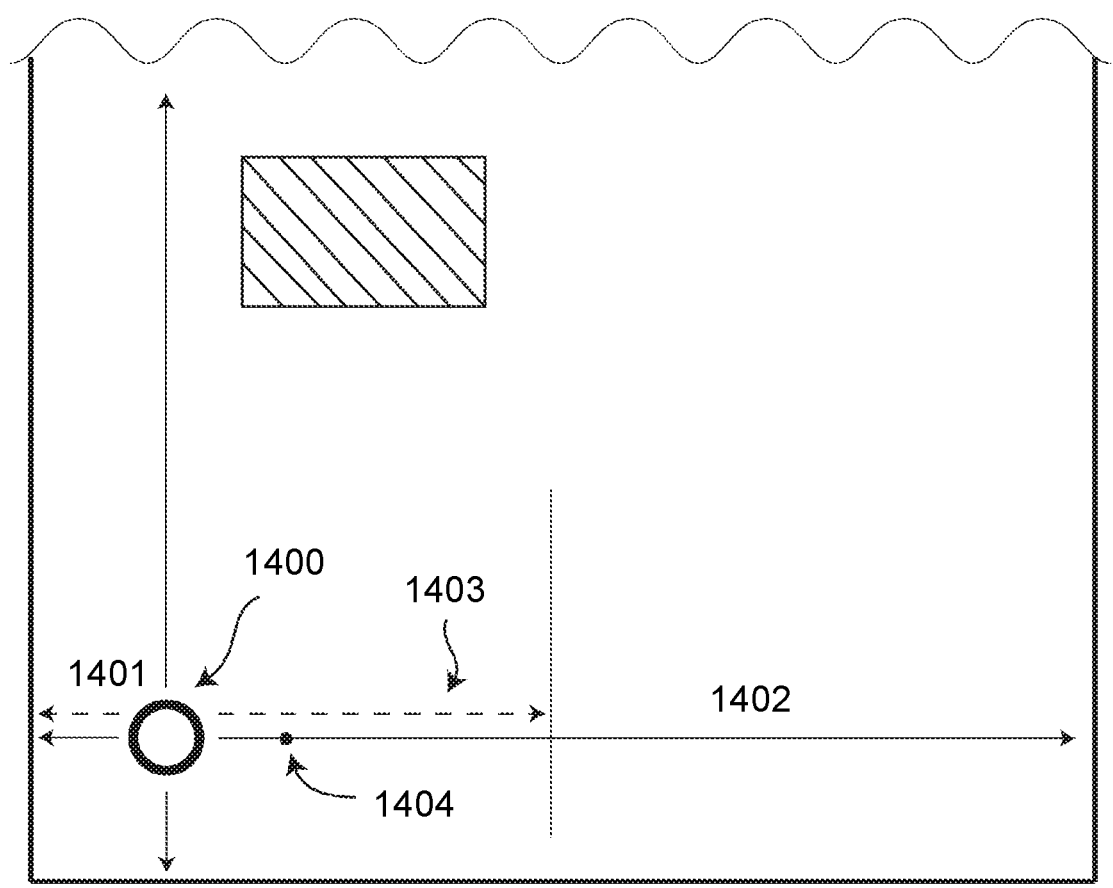
FIG. 14 illustrates an initial starting point and distance measuring of an autonomous robotic device, according to some embodiments.
Figure 15A:
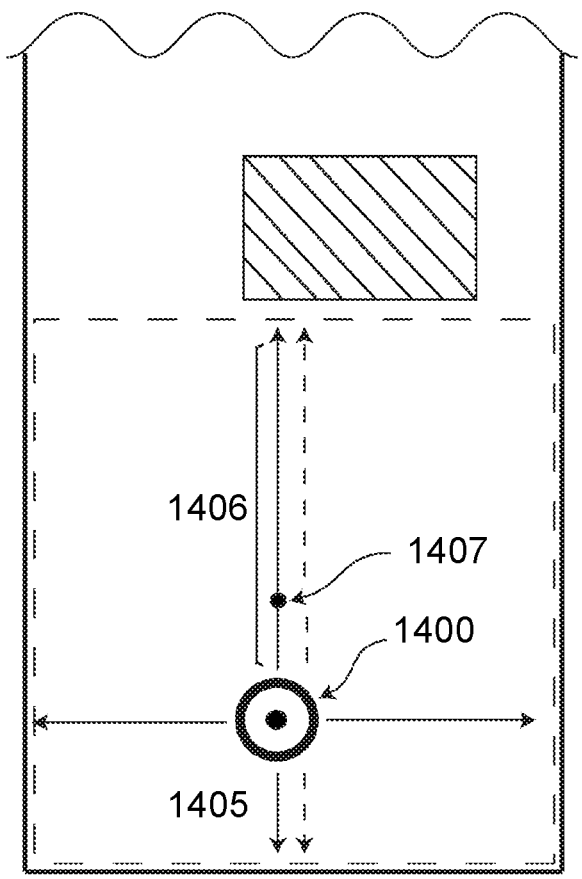
FIGS. 15A and 15B illustrate an example of a method for creating of a working zone within a workspace, according to some embodiments.
Figure 15B:
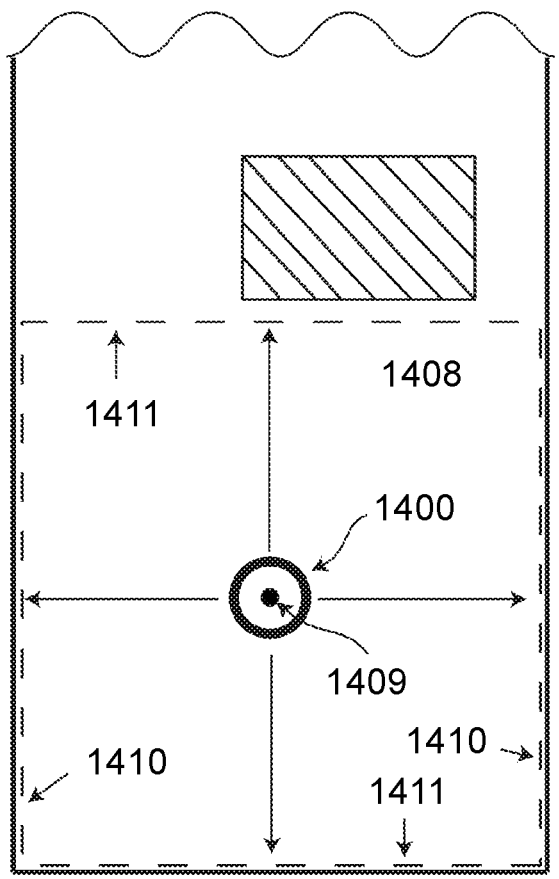

In some embodiments, the processor divides a workspace into one or more working zones, detects obstacles in the zones, and devises a movement path within the zones. FIGS. 14, 15A, and 15B illustrate an example of a method for creating a working zone. FIG. 14 illustrates robotic device 1400 using distance measuring sensors to analyze and detect obstacles in the surrounding area (e.g., area nearby the robotic device) and establish a reasonable central point for its operation. Distance sensors of the autonomous robotic device measure the distances to obstacles on axis X, -X (1401, 1402), and the processor then virtually limits the maximum combined range of the axes. The longer range 1402 is virtually limited to smaller range 1403 with regards to a programmed maximum acceptable distance set by the processor for creating a working zone. The processor averages the acquired and trimmed ranges 1401, 1403 to find the center 1404 of axis X of the working zone in question and instructs robotic device 1400 to drive to center 1404.

Continuing with the process illustrated in FIG. 14, FIG. 15A illustrates robotic device 1400 positioned at the middle point of axis X, 1404. From there, the robotic device turns and uses distance measuring sensors to assess the axis Y ranges 1405, 1406. If the combined ranges of axis (Y, -Y) exceed the maximum allowed distance of the system, a virtual cap or preset maximum allowed distance may be applied on the sum by the processor. The processor uses the average of the values of axis Y variables 1405, 1406 to find the middle of the axis, 1407, and instructs robotic device 1400 to drive to 1407. As a result, in FIG. 15B, the robotic device is positioned at a center point 1409 of a zone 1408 bound by the X axis maximum 1410 and Y axis maximum 1411.

Through this process, the processor creates a virtual working zone 1406. In some embodiments, once a working zone has been established, the robotic device 1400 determines which movement pattern to use for the particular zone by first rotating 360 degrees and measuring distances to obstacles. In some embodiments, the robotic device 1400 executes a closest obstacle path mode when three or more obstacles that are closer to the robotic device than a preset minimum distance and at least a predefined number of degrees apart are detected. Otherwise, the robotic device 1400 executes a triangle path mode coverage.

Figure 17:
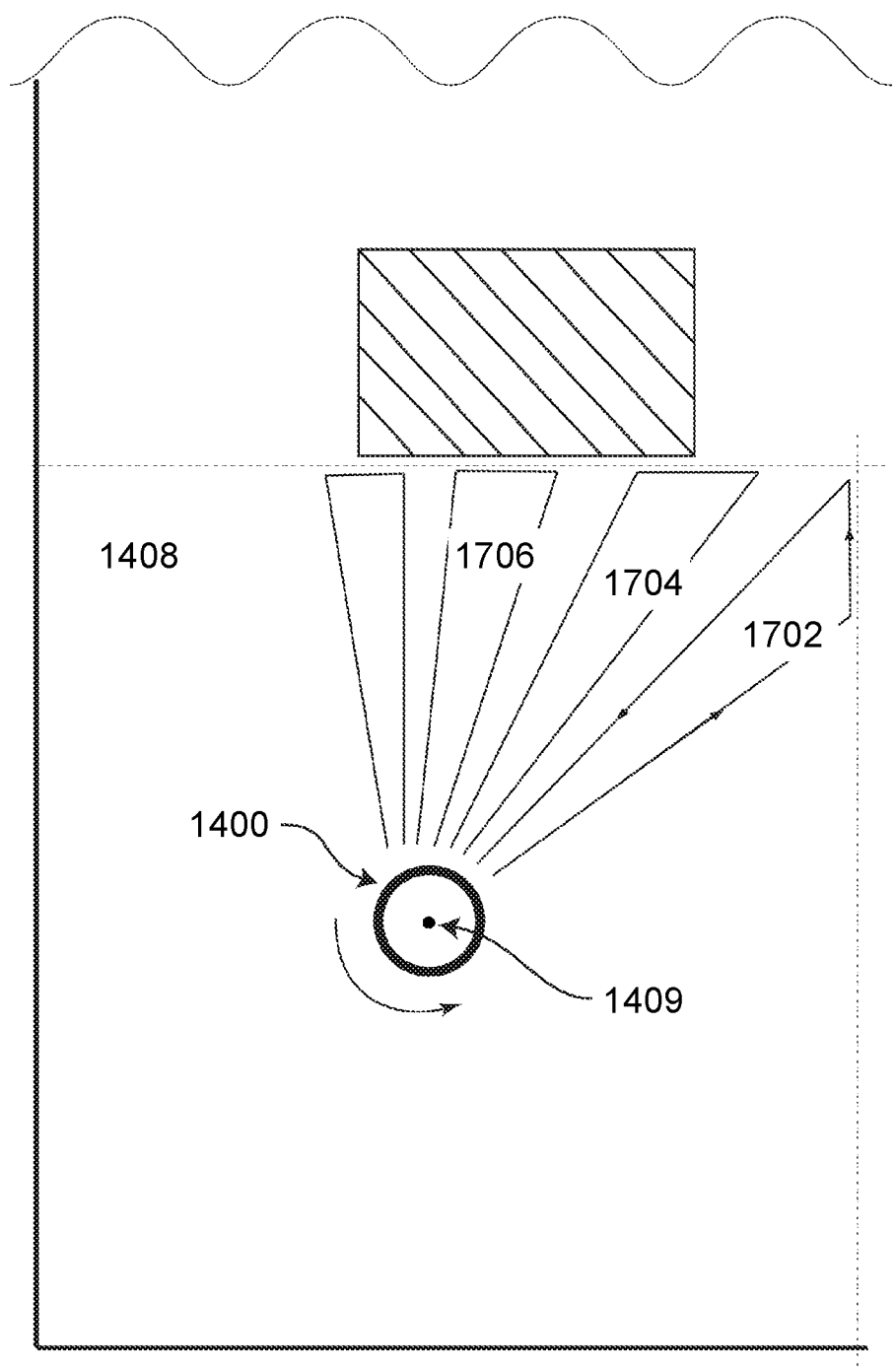
FIG. 17 illustrates an example of a triangle cleaning pattern, according to some embodiments.

FIGS. 16A and 16B illustrate an example of a triangle path mode development process. In FIG. 16A robotic device 1400 is positioned in the center 1409 of working zone 1408. For triangle path mode development, the processor generates a triangle given that the length of two sides of the triangle and the angle between the sides are at least known using $c^2 = a^2 + b^2 - 2ab \cos(C)$ and $$\frac{a}{\sin(A)} = \frac{b}{\sin(B)} = \frac{c}{\sin(C)},$$

which may be understood with reference to FIG. 16B. Using these relationships, the processor calculates unknown components of a triangle and builds a substantially collision-free triangulated path. Sensors of the autonomous robotic device measure the distance to the first obstacle in the direction that it is heading and uses this as first side 1410 of the triangle. The processor then uses a table, such as FIG. 32, to determine the approximate maximum number of degrees the robotic device can turn for the second side of the triangle based on the first measured distance while still covering all the area between the two sides with its brush. The table yields the approximate largest angle based on the first measured distance and the robotic device's brush size. As illustrated in FIG. 32, the turning angles given are based on a brush with a length of 9.5"-10.0". A desirable goal is to establish triangles that are as wide as possible without leaving any part of the interior of the triangle uncovered when the robot travels along the linear path with its brush. This approximates the largest possible triangle in which no area will be left uncovered by the robotic device's brush once the robotic device finishes its triangular path. The robotic device turns the number of degrees indicated by the table, then uses its distance measuring sensors to measure the distance from that point to the nearest obstacle (i.e., the wall 1412) to create second side 1411 of the triangle. Using these two sides and angle 1413 between them, the processor constructs the rest of the triangle and instructs the robot to execute the triangular path. Upon completing the triangular path, the robotic device is again positioned at the center point 1409 of the working zone 1408. From the center point 1409 of the working zone, the robotic device turns a preset number of degrees based on the brush size of the robotic device and the amount of overlap desired between paths, then begins measurement for its next triangular path 1414 using distance sensors. The processor of the robotic device repeats the process, as shown in FIG. 17, which is an illustrative representation of the triangle cleaning pattern. As shown in FIG. 17, the processor creates different adjacent triangles 1702, 1704, and 1706, etc. arrayed around the center point 1409 until the full 360 degrees of working zone 1408 is covered. As used herein throughout this application, substantially collision-free may refer to either collision free or mitigated collision (i.e., substantially collision-free).

Figure 18:
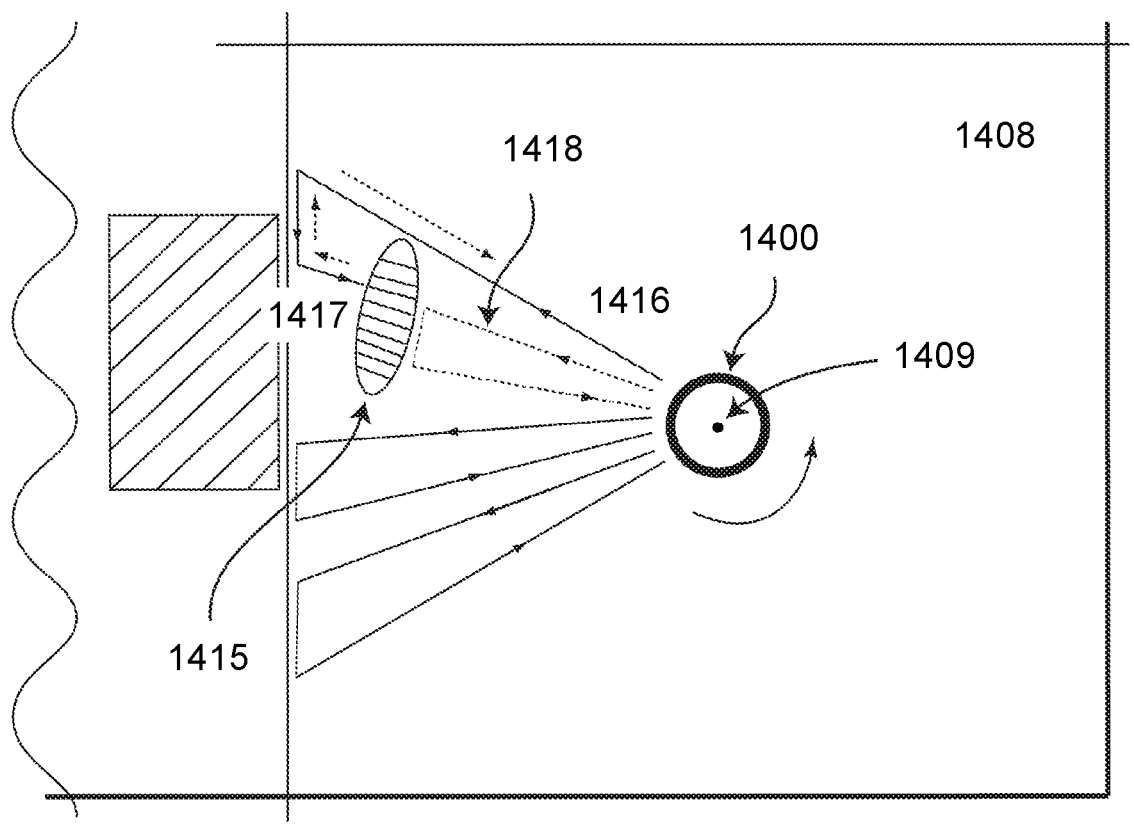
FIG. 18 illustrates an example of disruption and counter-action during a triangle path mode, according to some embodiments.

FIG. 18 is an illustrative representation of an example of potential disruption and counter-action during the operation of the triangle path mode. In particular, FIG. 18 illustrates a scenario in which the autonomous robotic device 1400 encounters obstacle 1415 that appeared (or was detected) within a workspace after robotic device 1400 probed and started its coverage of the triangular path beginning with side 1416. The position and time of the appearance of an obstacle can result in different conditions to which the processor of the robotic device adapts and reacts accordingly. In one scenario, the robotic device in this example already determined the path and is in the middle of the cleaning process. The robotic device cleaned side 1416 but in returning along path 1417, a newly appeared (or detected) obstacle 1415 blocked its path. In one embodiment, a timer is activated after an obstacle is encountered, and the processor of the robotic device will only react after the timer reaches 0. If the obstacle no longer obstructs the path after the timer reaches 0, the robotic device will continue along its prior cleaning path 1417. If the object continues to obstruct the path after the timer reaches 0, the processor counts this as an interruption during the current mode and employs its method for adapting or responding to an error. In another embodiment, the robotic device has no timer and the processor responds to the obstruction immediately. In both embodiments, if the obstacle remains, the processor of the robotic device adapts by retracing the path along side 1417, then side 1416 back to the center 1409 of the working zone. From the center point 1409 of the zone, the robotic device turns to the previously planned side 1417 of the triangle, the turning angle having been previously determined when establishing the original triangular path. The robotic device uses its distance measuring sensors to restart the path building process for a new triangle. The first side 1418 of the triangle covers the area of the previously planned path that is not obstructed by the obstacle 1415. As the robotic device adapts to the obstruction, the processor keeps a record of the mishap or error. If the number of errors reaches a predetermined threshold during the current cleaning mode, the next fallback method, daisy path mode, may be used in place of triangle path mode.

Figure 19A:
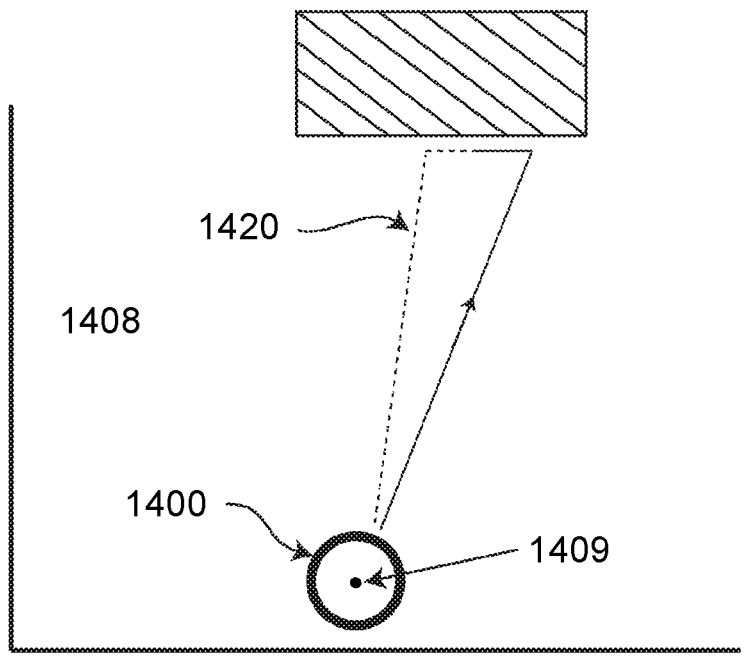
FIG. 19 illustrates an example of a disruption and counter-action during a triangle path mode, according to some embodiments.
Figure 19B:
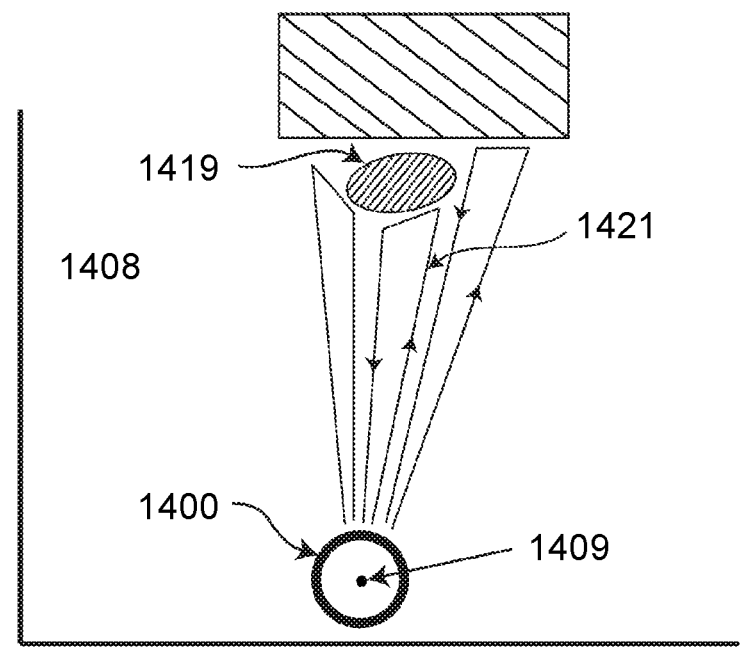

FIGS. 19A and 19B are illustrative representations of an example of a different disruption and another counter-action during triangle path mode. In particular, FIG. 19B shows the remedy if obstacle 1419 is encountered on the second leg of the triangle in triangle cleaning of working zone 1408. The robotic device 1400 returns directly from the location where the obstruction occurred to the center point 1409 of the working zone, resulting in a triangular path within the previously planned triangle 1420 shown in FIG. 19A. Once back at the center point, the robotic device continues triangle cleaning as normal, and measures for a new path 1421.

Figure 20A:
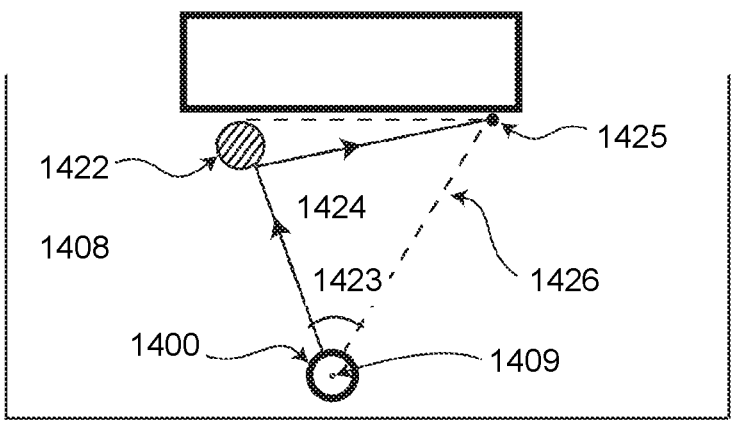
FIGS. 20A and 20B illustrate an example of a disruption and counter-action during a triangle path mode, according to some embodiments.
Figure 20B:
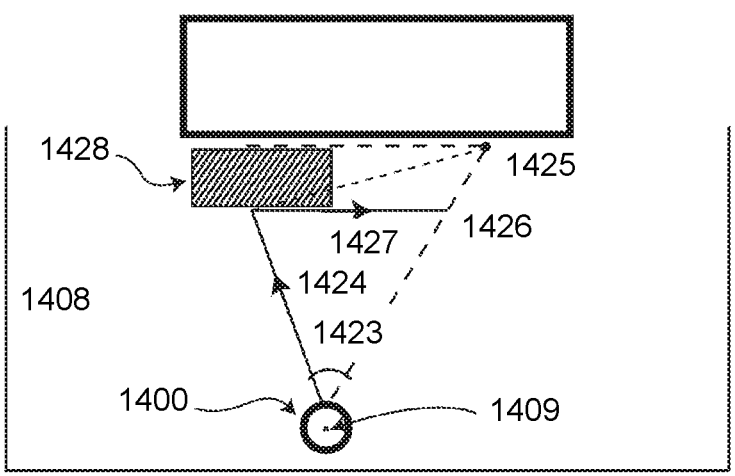
Figure 20C:
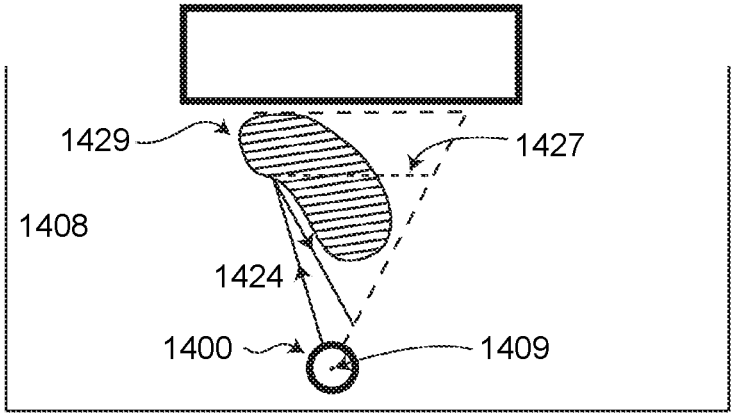

FIGS. 20A-20C are illustrative representations of an example of a third disruption and counter-action during triangle cleaning. As seen in FIG. 20A, during the execution process of working zone 1408, robotic device 1400 encounters obstacle 1422 while cleaning first side 1424 of a triangle. In response, robotic device 1400 will clean side 1424 up to blockage 1422 and then the processor recalculates the angle that the robot 1400 needs to turn from that point in order to reach the previously identified triangle corner 1425. The processor utilizes the new, shortened length of the first side 1424 of the triangle, the length of third side 1426, and the previously determined angle 1423 between them to calculate an adapted path. The robotic device then turns the calculated number of degrees and the distance ahead is measured with distance measuring sensors to verify whether the adapted path from its current position to triangle corner 1425 is free of obstacles. If the adapted path is unobstructed for at least the length of the adapted path, the robotic device will take this adapted path to complete a new triangle within the previously planned triangular path. If, as illustrated in FIG. 20B, the adapted path from the current position to the previously planned corner 1425 is obstructed by an obstacle 1428, the robotic device 1400 will turn a preset number of degrees toward the planned third triangle side 1426, then the processor formulates a new triangle using this new angle, the new shortened side 1424 of the triangle, and the original turning angle 1423 at the center point 1409. This will provide the robotic device with a new distance 1427 for the second side of the triangle. The distance ahead is measured to see whether or not the path is obstructed for the length of the second side. If the path is clear, the robotic device takes this path to complete a smaller triangle within the area of the original planned triangular path. If, as illustrated in FIG. 20C, an obstacle 1429 obstructs the formulated path 1427, the robotic device 1400 repeats the process of turning a preset number of degrees, calculating a new triangle, and measuring the distance ahead until either the largest clear triangular path is identified or the robotic device has met a predefined maximum number of attempts, at which point it will simply return to the center point along the original triangle side 1424 and restart the process of triangle cleaning from that point. As may be appreciated, the above adapted paths may proceed in any order without limitation.

In some embodiments and in general, methods disclosed herein may fall back to the other cleaning modes after encountering a certain number of errors during the robotic device's cleaning operation in triangle or daisy path modes. In an exemplary embodiment, the coverage methods are selected in the order of: triangle path mode, daisy path mode, then asterisk path mode; however other orders of modes may be utilized without limitation. If the autonomous robotic device reaches its threshold for errors within a predefined amount of time in the normal operation of the triangle path mode, it will activate the second mode, daisy path mode. Various path modes will be discussed in further detail below. Likewise, if a certain number of errors occur within a certain amount of time during daisy cleaning, the processor may initiate asterisk path mode, which is the more redundant of the three path modes provided. In an embodiment, after lapse of certain predetermined number or periods of interruption-free activity in a relatively more redundant cleaning mode, the robotic device may switch back to a relatively less redundant, e.g., its primary, cleaning mode, e.g., triangle cleaning.

Figure 21:
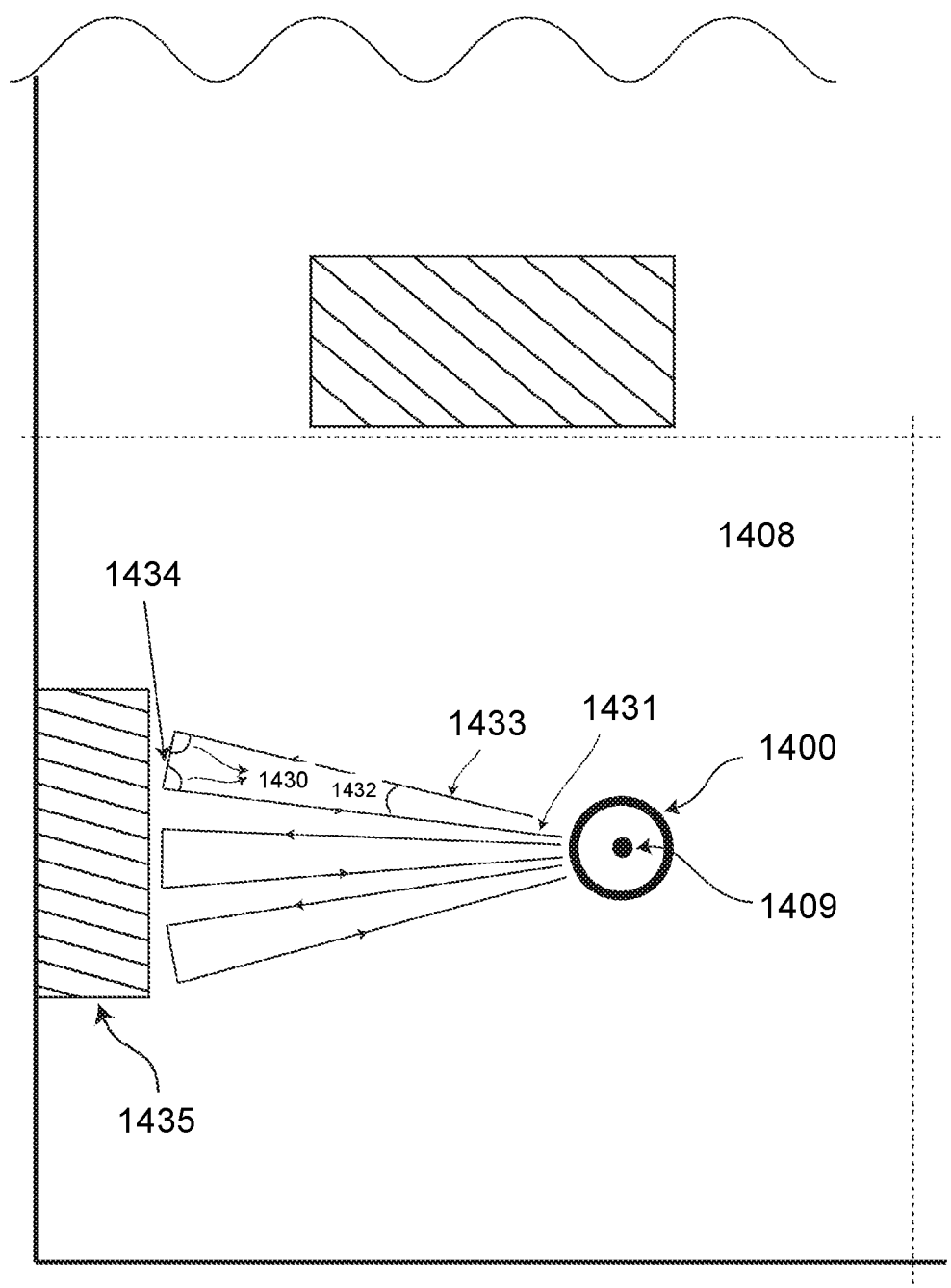
FIGS. 21A-21C illustrate an example of a daisy path mode development method, according to some embodiments.

FIG. 21 is an illustrative representation of a daisy path mode development process. If unforeseen obstacles in the work area interrupt triangle path mode frequently enough for the error threshold to be reached, the processor activates daisy path mode. Daisy path mode works similar to triangle path mode, but forms isosceles triangles around the center point of the working zone. Instead of basing the corners of the triangles on two obstacles at varied distances, the corners are fixed at a distance from the center point of the working zone based on the first obstacle that the distance sensors measure. The angle joining the two like sides of the triangle is a fixed size based on the brush size of the robotic device in order to ensure complete coverage of the area using formed adjacent triangles. In general, the larger the brush, the smaller the like angles may be. A robotic device with a very long brush should be able to cover the area with wider isosceles triangles than a robotic device with a very short brush. Thus, while the angles of the triangle are determined by the brush size, the method will work with any size brush. As illustrated, the size of the fixed angle 1432 dictates the size of the corresponding angles 1430. The robotic device 1400 uses distance measuring sensors to measure the distance 1433 to the first obstacle 1435 and the processor uses that length for the sides 1433 and 1431 of the triangular path. The remaining unknown side length 1434 is determined by the processor using the known figures and trigonometric relationships. Robotic device 1400 travels from the center point 1409 along the first side 1433 of the triangle to measured obstacle 1435, turns at calculated angle 1430, travels the calculated distance 1434, then turns at next calculated angle 1430, and returns along 1431 to the center point 1409 of the working zone. The method repeats the process to cover all 360 degrees around the center point.

Figure 22:
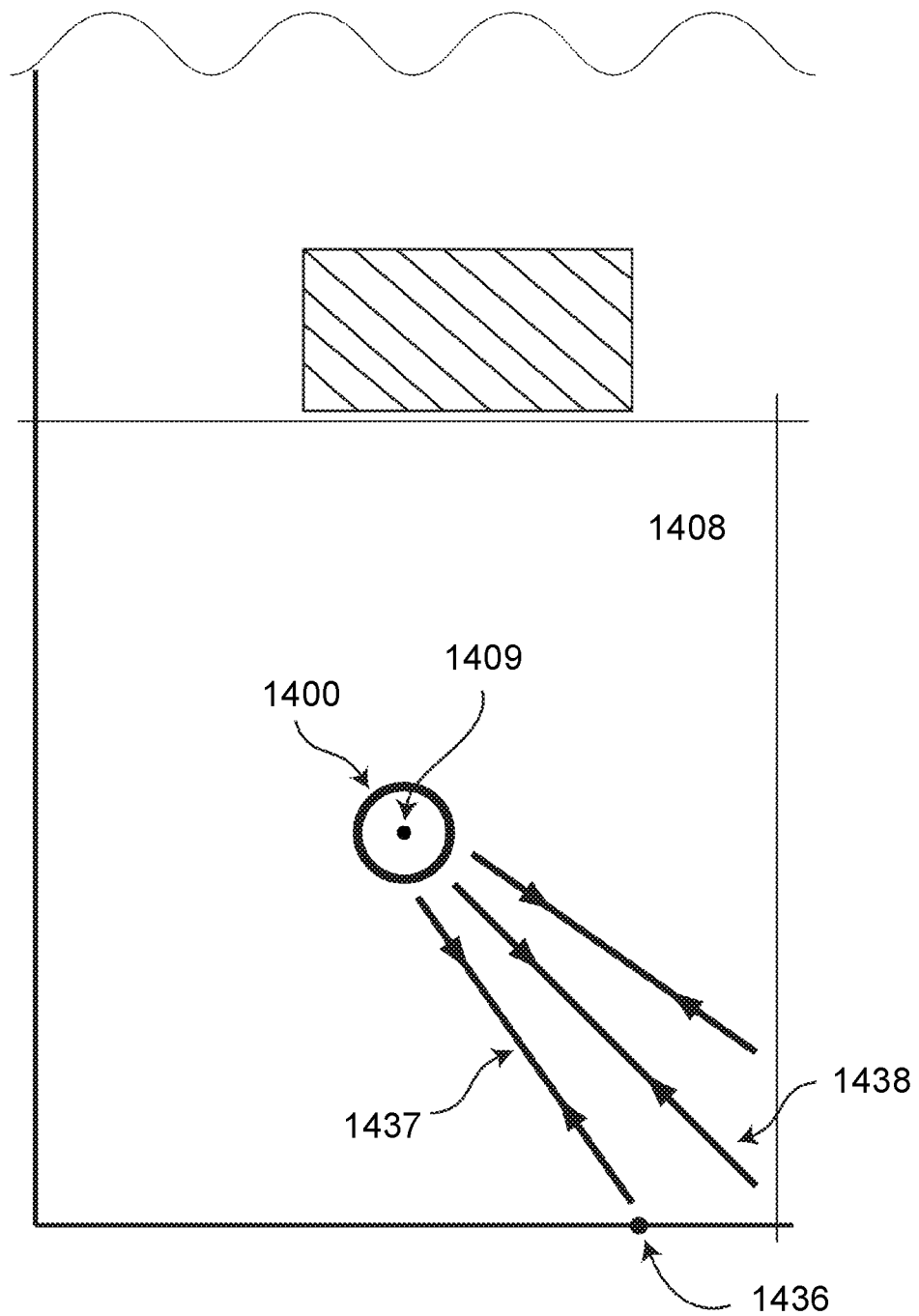
FIG. 22 illustrates an example of an asterisk cleaning path development method, according to some embodiments.

FIG. 22 is an illustrative representation of an asterisk path mode development process. In an embodiment, the asterisk path mode acts as a fallback for daisy path mode. In an embodiment, if, during daisy path mode, the robotic device reaches a minimum threshold of errors, the method will fall back to a simpler mode-asterisk path mode. In this mode, autonomous robotic device 1400 simply travels from the center point 1409 of the working zone to the nearest obstacle 1436 along line 1437, cleaning that path, and then returning to the center point of the working zone along the same line 1437. The length of each line may be variable and may be limited to the nearest obstacle or boundary. In one embodiment, a preset maximum could be defined that dictates a cap for distance regardless of how far the nearest obstacle is. The process of cleaning in asterisk path mode continues by the robotic device 1400 turning a pre-determined number of degrees based on the size of the brush with respect to adjacent line 1438, measuring the next distance, and repeating the same process for the entirety of working zone 1408. In one embodiment, if external environmental changes force or block the robotic device's path more than a certain number of times in this mode, methods may stop operation, reset all thresholds to zero, and adapt by beginning the cleaning patterns again starting with triangle path mode. In another embodiment, the robotic device continues using asterisk path mode until it has completed the current working zone regardless of how many interruptions it encounters. In one embodiment, the robotic device will attempt to complete cleaning in each working zone using its current method (falling back as necessary to the secondary or tertiary methods). Once it has completed cleaning in a working zone and moves to a new working zone, all of the error counters will be reset and the method of operation will begin again with the primary cleaning mode.

In another embodiment, if the robotic device is using any mode other than the primary mode (e.g., daisy path mode, etc.), the robotic device will return to the primary mode after completing a preset number of paths without interruption within the current working zone. The number of paths may be preset to any number during manufacture without limitation in embodiments. If the threshold for uninterrupted paths is not met, the robotic device will continue using the current cleaning method until it has completed cleaning in the working zone, after which point it begins cleaning the next working zone with the primary cleaning mode. In other embodiments, going back to the primary cleaning mode/pattern may be set to happen after a certain amount of time lapses without interruption or after the robotic device has traveled a certain amount of distance without interruption.

Figure 23:
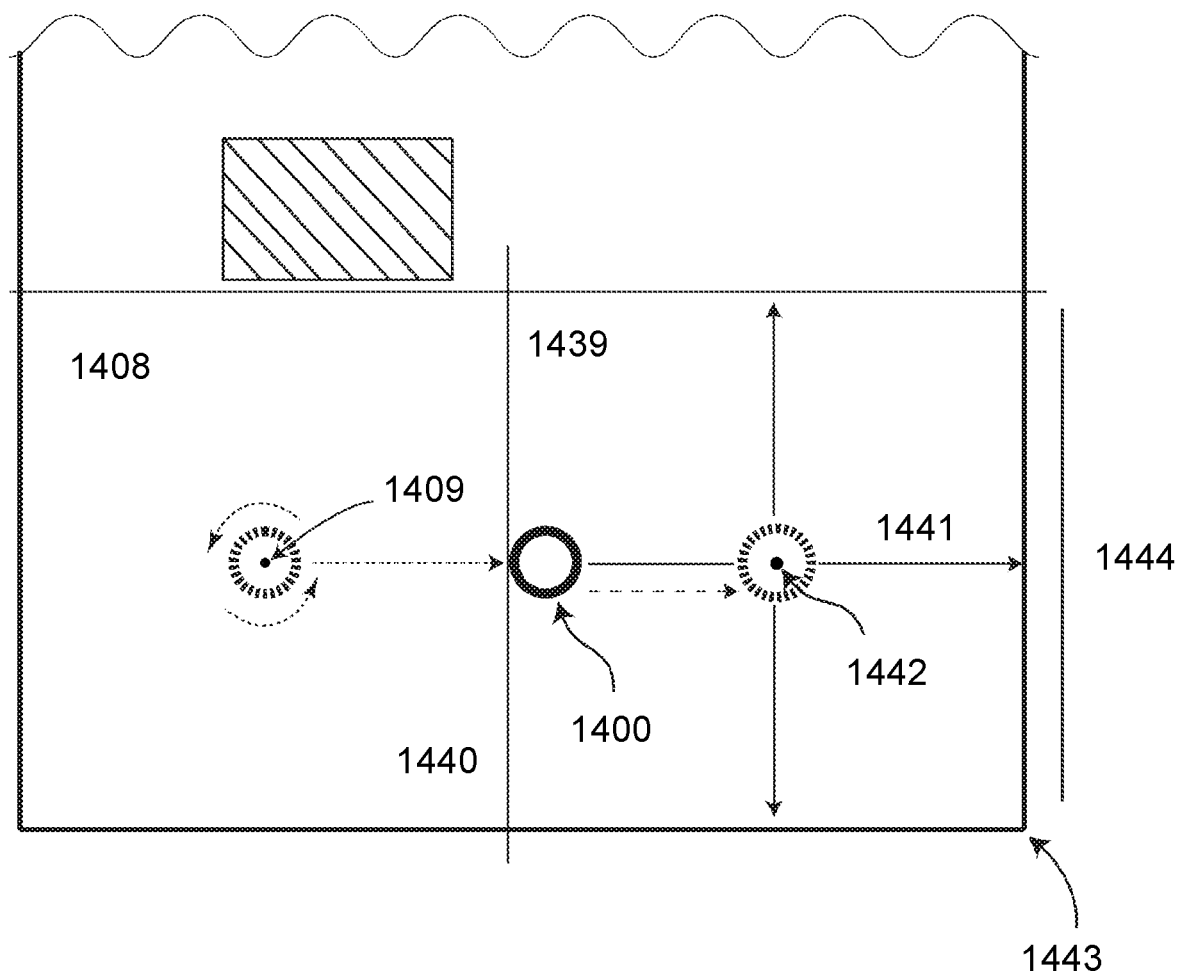
FIG. 23 illustrates establishment of new working zones, according to some embodiments.

FIG. 23 is an illustrative representation of the robotic device's movement between different working zones. In particular, FIG. 23 illustrates the steps of the procedure that autonomous robotic device 1400 takes in order to move from a completed, cleaned working zone 1408 to create new working zone 1439 to work in. As shown in FIG. 23, when robotic device 1400 completes working zone 1408, the robotic device returns to original center point 1409, then moves to the working zone 1408 border 1440, the x axis maximum. From there, the distance ahead (1441) is measured using distance measuring sensors in order to assess the clearance between the robotic device 1400 and the nearest obstacle ahead, in this case, the wall 1443. If the distance is greater than the maximum allowable distance discussed as disclosed above for FIG. 14, the robotic device will apply a virtual limit to the distance. Then the robotic device moves to the center point of newly created axis X 1442. From there, the processor of the robotic device continues creating a virtual working zone on axis Y 1444 as described before and positions itself in the center of the combined ranges. Thus, the processor creates new neighboring working zone 1439 next to last working zone 1408 to continue coverage operation. If the distance measuring sensor data indicate that there is less than a minimum amount of obstacle-free distance on the axis X to create a new working zone, then the processor begins the zone creation process from another unattended direction of the working zone 1408 (i.e.: Y, −Y, −X) until the distance measuring sensor data indicates that enough space is available in the chosen direction.

Figure 24:
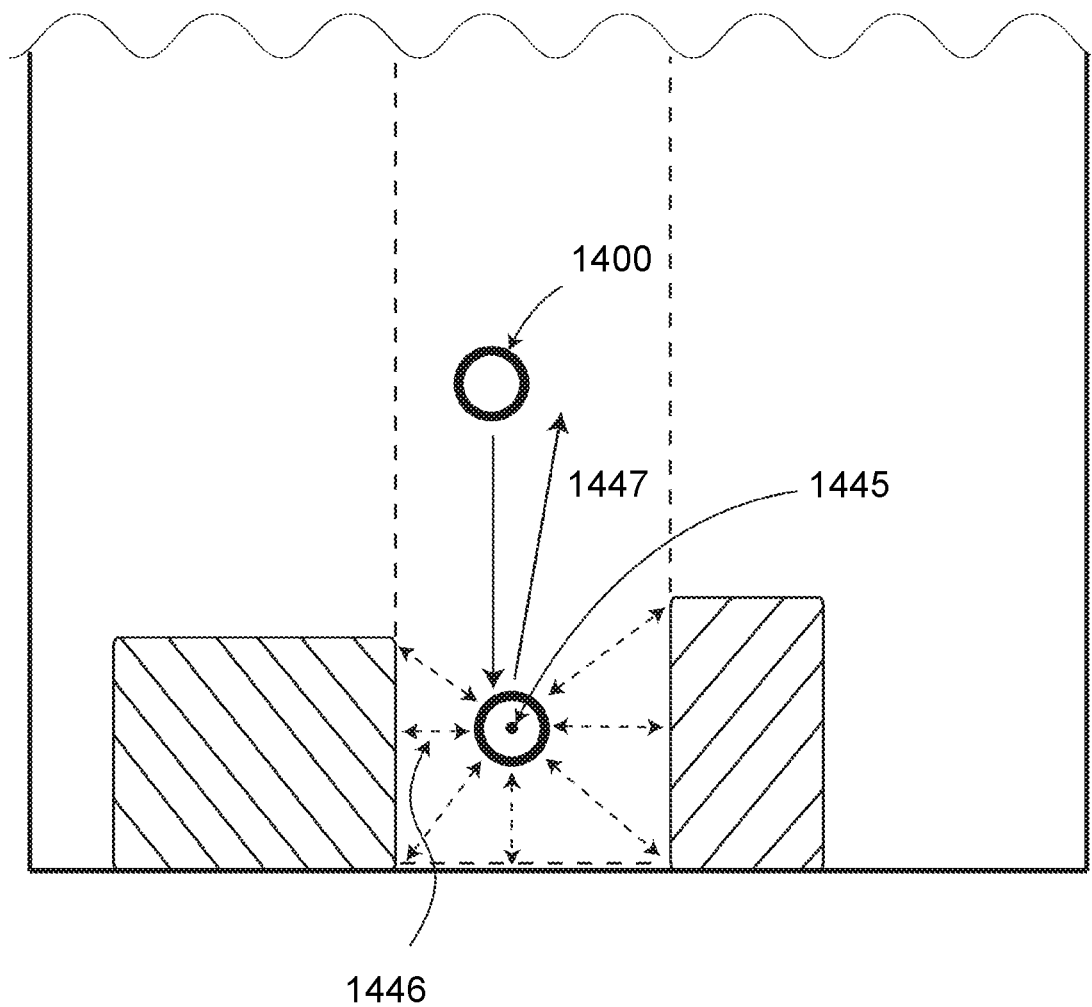
FIG. 24 is an illustrative representation of the closest obstacle path mode embodying features of the present invention.

FIG. 24 is an illustrative representation of a closest obstacle path (COP) operation method. COP is designed specifically to deal with confined spaces that may have numerous obstacles within them. Usually, when a cleaning robotic device using a random navigation system enters or is placed in a confined area, such as beneath a table or between two close objects, the device navigates its way out before completely cleaning the area. Typically, conventional devices have no method for ensuring that the smallest obstacle-free areas within the confined space are cleaned. Embodiments disclosed herein provide a way of identifying confined spaces before beginning work and activating a method to more effectively service such an identified area. As mentioned previously, after a working zone has been created, the robotic device rotated to complete a 360 degree turn around a center point of a working zone, measuring the robotic device's distance to obstacles at preset intervals using distance sensors. If at least a preset number of obstacles are closer to the robotic device than a predefined minimum distance and at least a preset number of degrees apart from each other relative to the center point, COP is activated. This method ensures or increases the probability that the confined area is completely serviced before the robotic device leaves the area. In FIG. 24, robotic device 1400 moves to position 1445, the center of a new working zone, which happens to be a confined area. The robotic device measures the distance ahead with its distance measuring sensors from the center point 1445 in 360 degrees. COP is activated upon finding a minimum number of radial paths shorter than the predefined requirement and spaced adequately apart. The processor then assigns cleaning priority to the measured radial paths in order from shortest radial path 1446 to longest. The robotic device cleans each path in the same manner as in asterisk cleaning: that is, the robotic device travels from the center point to the nearest obstacle, then returns along the same line to the center point. One difference between asterisk cleaning and COP is the order of the paths cleaned. The robotic device attends to all the paths in order from shortest to longest, driving out of the location by attending longest radial path 1447 last.

Figure 25:
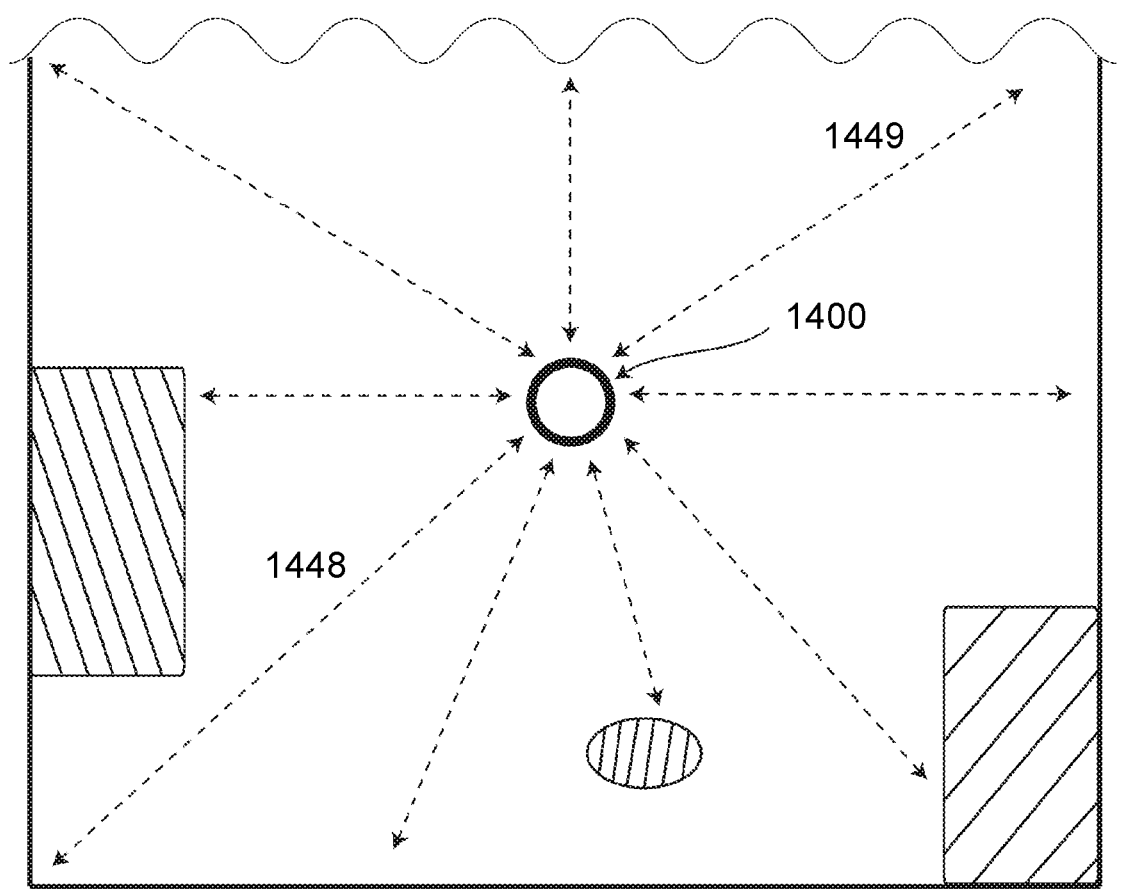
FIG. 25 illustrates an example of a farthest obstacle path mode, according to some embodiments.

FIG. 25 is an illustrative representation of the farthest obstacle path (FOP) operation method. In an embodiment, this is a manually selected mode. FOP attempts to clean the most amount of space in a limited amount of time, without prioritizing small confined areas. Percentage of area covered versus time, rather than thorough coverage, is the goal of this method. In an embodiment, in an FOP method, redundancy is 50 percent at all times, unlike random cleaning methods in which redundancy increases significantly over time. Because the robotic device travels along the same path from the center point of a working zone to an obstacle and back to the center point, and, since the robotic device's traveled paths are stored in its memory, the robotic device does not revisit paths it has already cleaned. FOP works similar to COP however the robotic device positions itself in a central point of the workspace and analyzes the surroundings, giving priority to measured radial paths in order from longest path to shortest path. As illustrated, robotic device 1400 cleans longest path 1448 first, returns to the center point, then cleans next longest path 1449, continuing this process until the entire 360 degree area is serviced. Movement may proceed clockwise or counter-clockwise without limitation.

Figure 26:
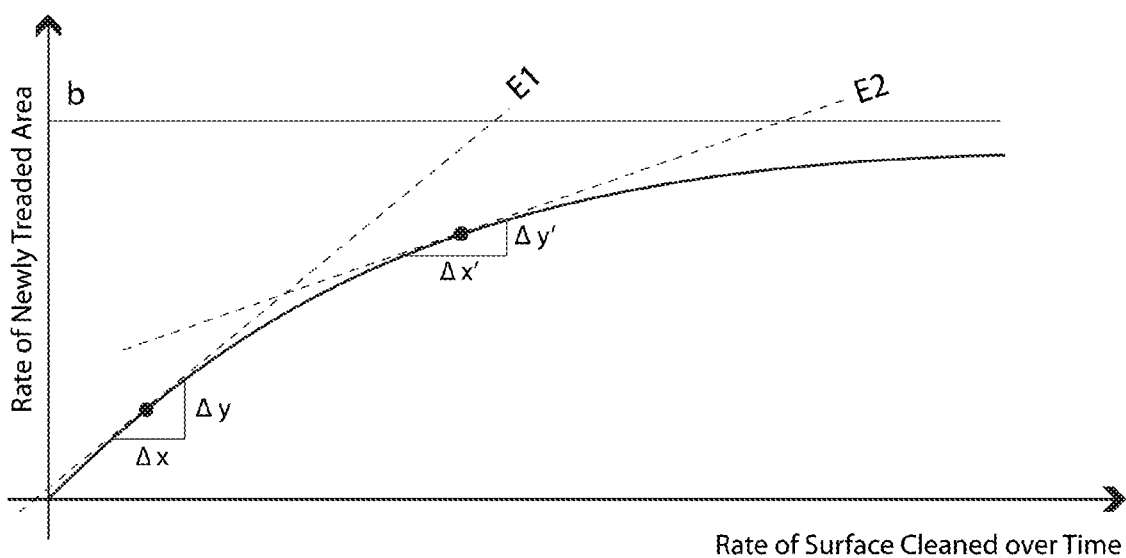
FIG. 26 illustrates an example of a graph of the efficiency of a random coverage method, according to some embodiments.

FIG. 26 is an illustrative representation of the efficiency of a random coverage method in an ideal workspace to illustrate and compare the efficiency of different cleaning methods versus time. In a random coverage method, Coverage (y-axis) vs. Time (x-axis), E (t), efficiency, soars at the start of the job, but as time increases, the rate of newly treaded area drops because the robotic device will visit already cleaned areas more often. Thus, efficiency drops drastically over time. As shown in the diagram, the working area will approach being completely cleaned only when time approaches infinity. Robotic devices that use this method would require infinite time to cover 100% of the reachable area of the workspace.

Figure 27:
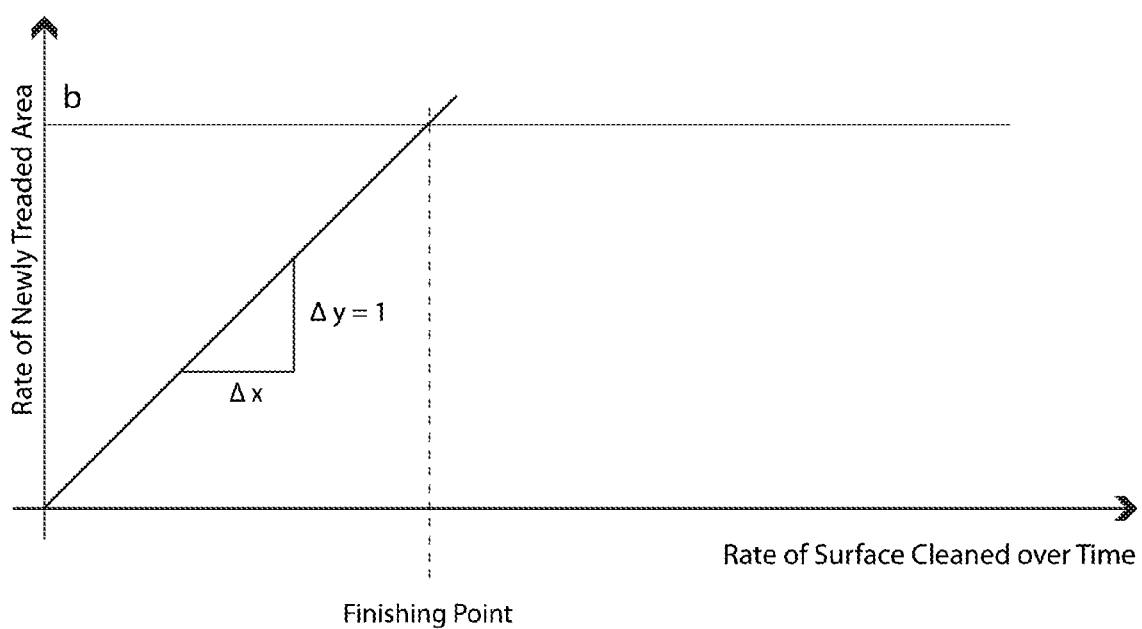
FIG. 27 illustrates an example of a graph of the coverage rate over time of a triangle cleaning pattern, according to some embodiments.

FIG. 27 is an illustrative representation of the coverage rate over time of the triangle cleaning pattern. In particular, FIG. 27 shows Coverage (y-axis) vs. Time (x-axis) of Triangle path mode in an ideal environment. In this method, from a purely mathematical perspective, the rate of newly treaded area is always equal to the coverage rate, so Coverage vs. Time is 1 at all times. The cleaning process of the robotic device has no redundancy since it only visits and cleans areas that it had not already cleaned. Using this cleaning algorithm, the job will be completed within a finite time.

Figure 28:
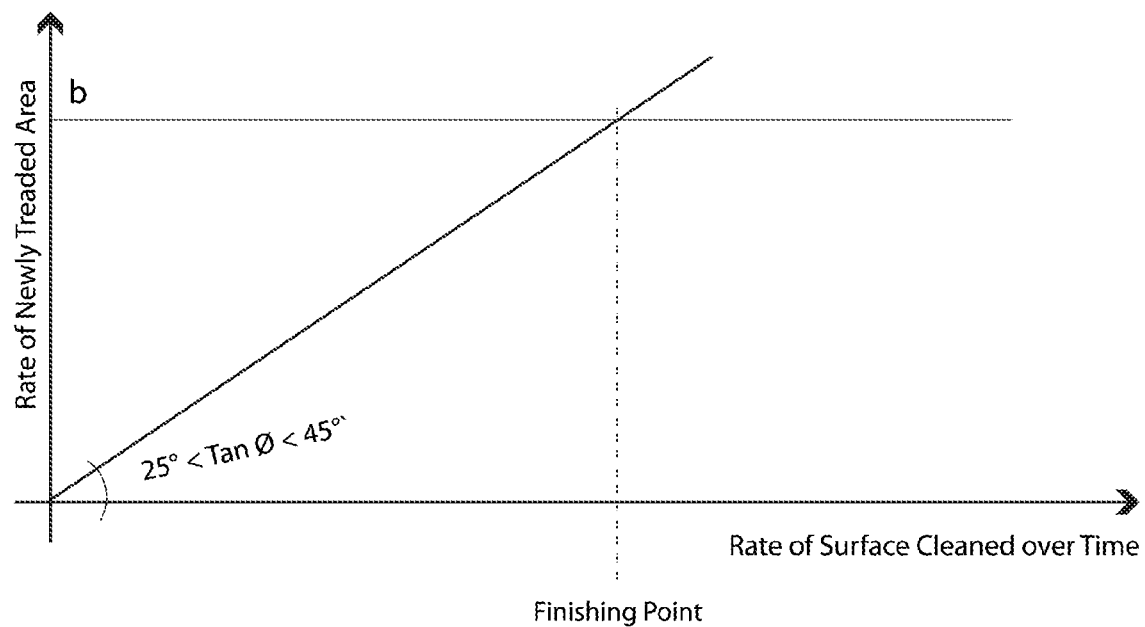
FIG. 28 illustrates an example of a graph of the coverage rate over time of a daisy path mode pattern, according to some embodiments.

FIG. 28 is an illustrative representation of a graph of the coverage rate over time of the daisy path mode pattern. In particular, FIG. 28 shows, and as represented by the equations $\tan 25° < E(t) < \tan 45°$ and $\frac{1}{2} < E(t) < 1$, Coverage (y-axis) vs. Time (x-axis) of daisy path mode. Under ideal circumstances, the coverage vs. time is a variable between $\frac{1}{2}$ and 1, where 1 is no redundancy. This method cleans and covers the whole area completely within a finite amount of time.

Figure 29:
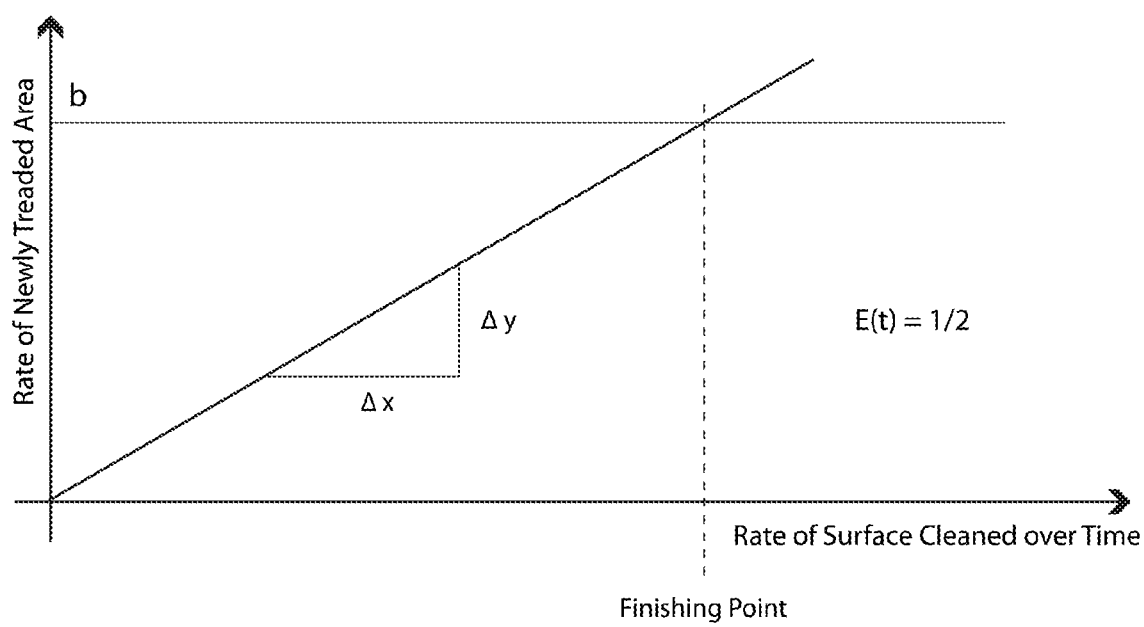
FIG. 29 illustrates an example of a graph of the coverage rate over time of an asterisk cleaning pattern, according to some embodiments.

FIG. 29 is an illustrative representation of a graph of the coverage rate over time of the asterisk cleaning pattern. In particular, FIG. 29 shows Coverage (y-axis) vs. Time (x-axis) of asterisk cleaning mode. This mode has a steady efficiency rate, $E(t)$, of $\frac{1}{2}$, in an ideal workspace and the robotic device attends all of the workspace within a finite time.

Figure 30:
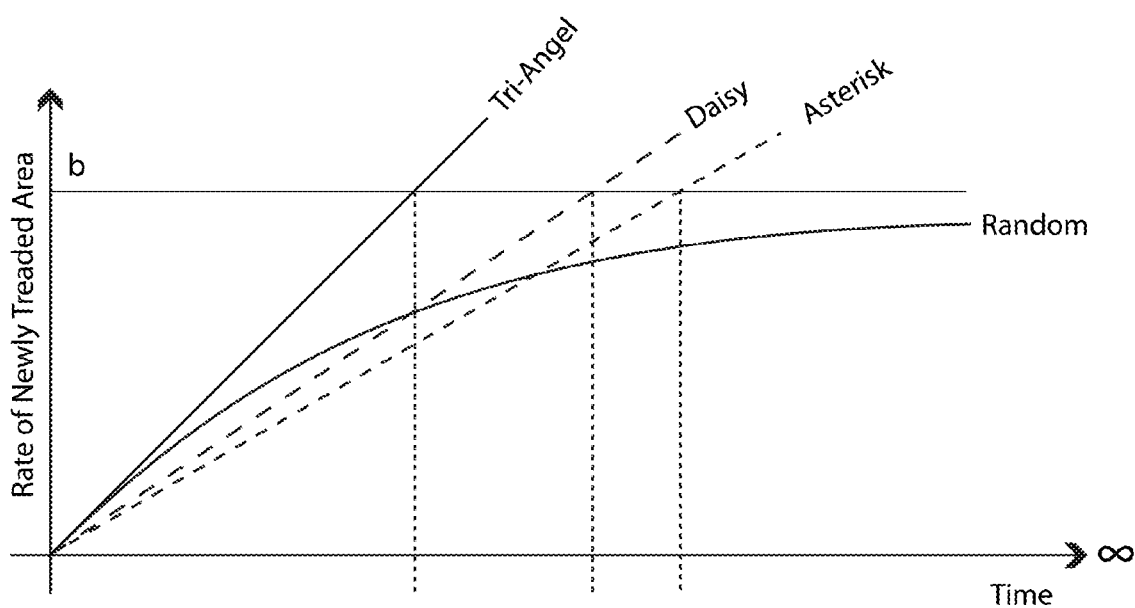
FIG. 30 illustrates an example of a graph comparing the coverage rate over time of a random pattern coverage method with coverage rates over time of different cleaning modes introduced and a random coverage method, according to some embodiments.

FIG. 30 is an illustrative representation of a graph comparing the coverage rate over time of the different cleaning modes described and a random coverage method. As illustrated, triangle path mode is the most efficient and random is the least efficient mode. As shown in the graph, the cleaning and coverage methods of embodiments disclosed herein, even using its last-resort cleaning method, have higher efficiency rates than random coverage methods conventionally utilized.

Figure 31:
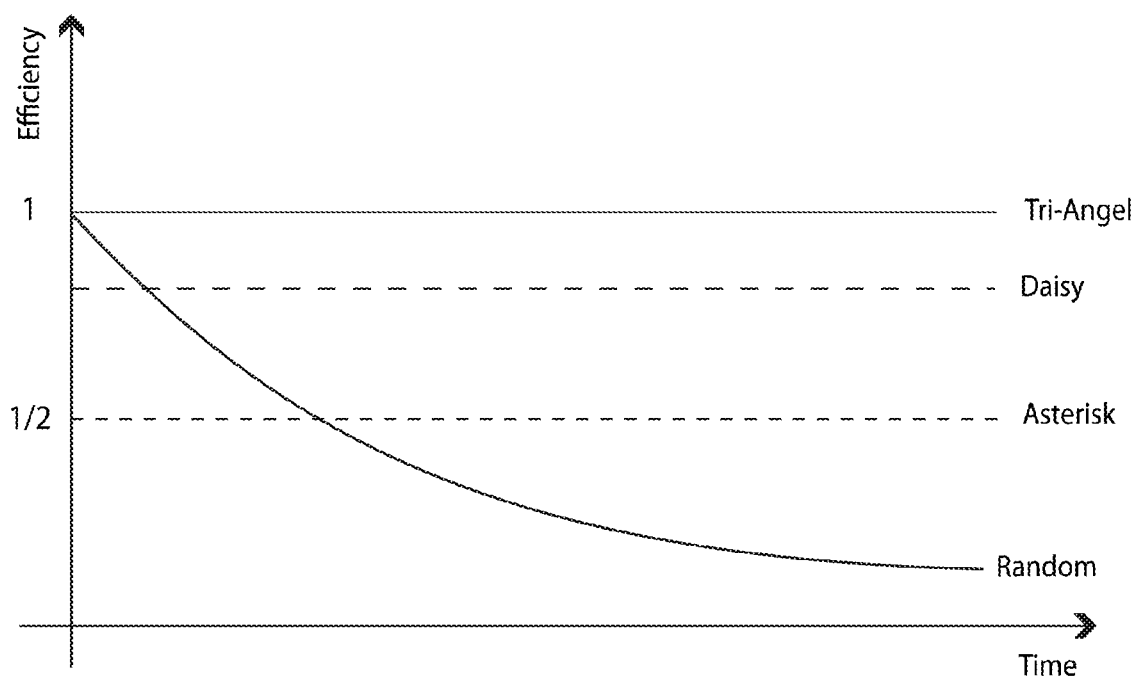
FIG. 31 illustrates an example of a graph comparing the efficiency over time of a random pattern coverage method with efficiency over time of the different cleaning modes introduced, according to some embodiments.

FIG. 31 is an illustrative representation of a graph comparing the efficiency over time of the different cleaning modes described and a random coverage method. In particular, FIG. 18 illustrates Efficiency (y-axis) vs. Time (x-axis) of the different cleaning algorithms. As illustrated, triangle, daisy and asterisk path modes have constant efficiency rates, while a random coverage algorithm's efficiency drops dramatically as time increases.

FIG. 32, as referenced earlier in connection with FIGS. 16A and 16B, is an illustrative representation of a table utilized to determine turning angles in the triangle cleaning pattern. Methods may utilize the table illustrated herein to determine a maximum number of degrees a robotic device with a brush length between 9.5 inches and 10 inches can turn for a second side of a triangle based on a first measured distance without leaving any area between the two sides uncovered by the brush.

Figure 33:
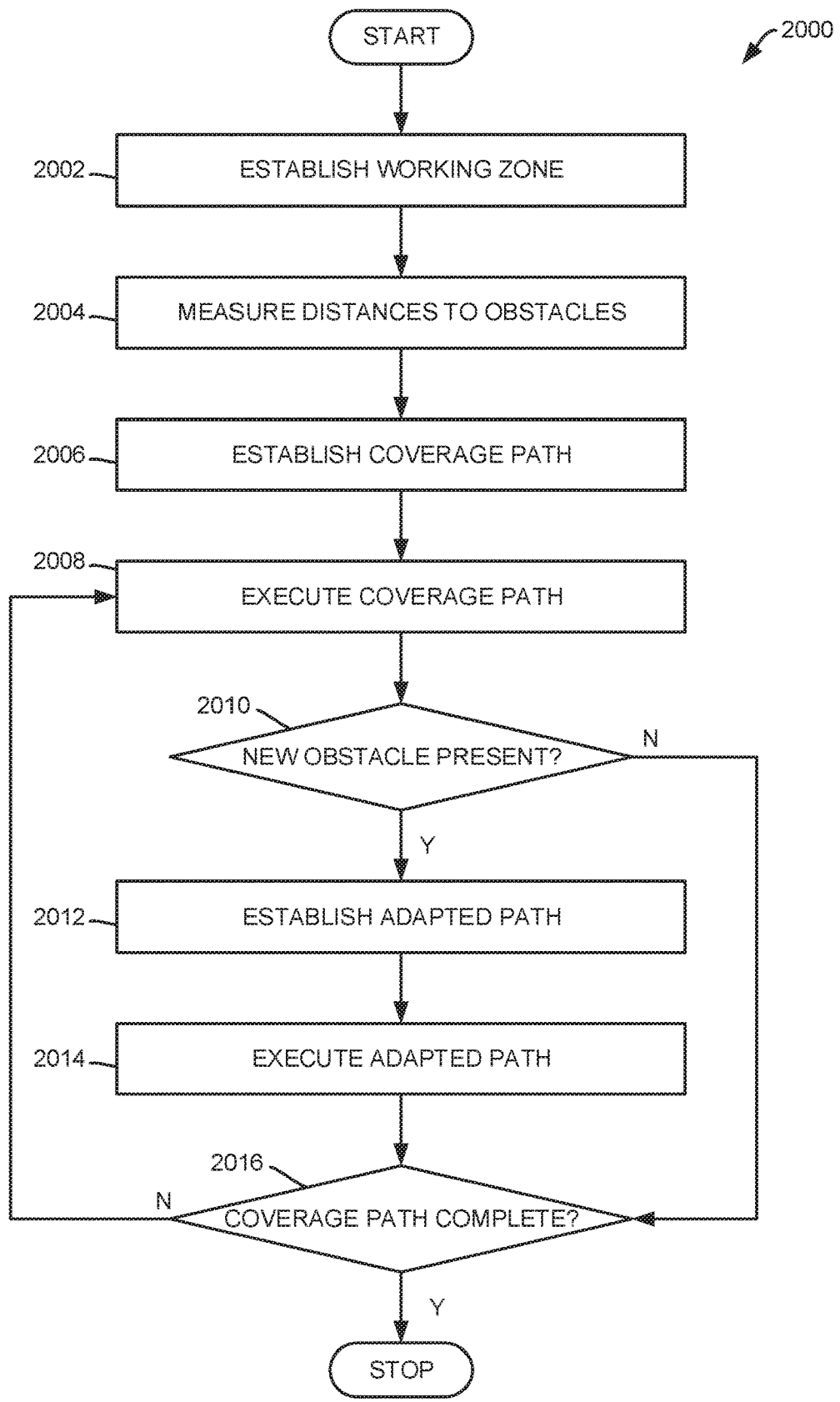
FIGS. 33-35 illustrate flowchart of movement path methods, according to some embodiments.

FIG. 33 is an illustrative flowchart 2000 of methods described herein. In particular, flowchart 2000 illustrates methods for automated robotic movement for a robotic device. At a first step 2002, the method establishes a working zone. As noted above, methods provided herein divide a workspace into smaller virtual sections, referred to as zones or working zones in order to achieve better coverage management and cleaning efficiency. Before starting work in a location, methods establish a working zone. In order to establish appropriately-sized working zones within any size workspace, a series of minimum or maximum accepted distances may be determined and used during the working zone creation process. Methods for establishing a working zone will be discussed in further detail below for FIG. 34. At a next step 2004, the method measures distances to obstacles in 360 degrees around the center point of the zone in order to select the appropriate cleaning movement pattern to service the area to account for all detected obstacles. At a next step 2006, the method establishes or selects a coverage path for the working zone based on measured distances to detected obstacles. Embodiments provided herein may utilize in any combination any of five center-return path movement patterns—namely a triangle path mode, a daisy path mode, an asterisk path mode, a closest obstacle path mode, and a farthest obstacle path mode—to form a comprehensive method for covering a workspace. In establishing a coverage path, methods may calculate any of a number of center-return paths. For example, methods may calculate a first center-return path, where the first center-return path is defined by a plurality of substantially collision-free triangulated paths, and wherein the first center-return path corresponds with a maximum turning angle, a triangle measured size with respect to the tool size of the robotic device and all distances to all detected obstacles. Further, methods may calculate a second center-return path, where the second center-return paths defined by a plurality of substantially collision-free isosceles triangulated paths, and wherein the second center-return path corresponds with a maximum turning angle, an isosceles triangle measured size with respect to the tool size of the robotic device and the distance to a first detected obstacle. Still further, methods may calculate a third center-return path, where the third center-return path is defined by a plurality of substantially collision-free point-to-point paths, and wherein the third center-return path corresponds with a maximum turning angle and a plurality of straight lines each having a measured size with respect to detected obstacles. In embodiments, when more than a predefined number of obstacles are detected within predefined minimum distance and which are a preset number of degrees apart from one another, methods may calculate a fourth center-return path, where the fourth center-return path is defined by any number of substantially collision-free point-to-point paths, and where the fourth center-return path corresponds with a plurality of straight lines each having a measured size with respect to the detected obstacles and the tool size of the robotic device, and where executing the coverage path proceeds from a shortest to a longest of the plurality of straight lines. Further, methods may calculate a fifth center-return path, where the fifth center-return path is defined by a plurality of substantially collision-free point-to-point paths, and where the fifth center-return path corresponds with a maximum turning angle and a plurality of straight lines each having a measured size with respect to the detected obstacles, and where executing the coverage path proceeds from a longest to a shortest of the plurality of straight lines.

At a next step 2008, the method executes the coverage path. It may occur that while the coverage path is being executed, a new obstacle may be presented. That is, some obstacle may appear in the coverage path while the robotic device is executing the coverage path. As such, at a step 2010, the method determines whether a new obstacle is present. If the method determines that a new obstacle is not present at a step 2010, the method continues to a step 2016.

If the method determines that a new obstacle is present at a step 2010, the method continues to a step 2012 to establish an adapted path to accommodate the new obstacle. In establishing an adapted path, methods may calculate any of a number of center-return paths for accommodating the new obstacle. For example, methods may calculate a first center-return path, where the first center-return path is defined by any number of substantially collision-free triangulated paths, and where the first center-return path corresponds with a maximum turning angle, a triangle measured size with respect to detected obstacles, and a tool size of the robotic device. Further, methods may calculate a second center-return path, where the second center-return path is defined by any number of substantially collision-free isosceles triangulated paths, and where the second center-return path corresponds with a maximum turning angle, an isosceles triangle measured size with respect to a first newly detected obstacle, and the tool size of the robotic device. Still further, methods may calculate a third center-return path, where the third center-return path is defined by any number of substantially collision-free point-to-point paths, and where the third center-return path corresponds with a maximum turning angle and a plurality of straight lines each having a measured size with respect to detected obstacles. In some embodiments, detecting a new obstacle causes an error to be logged, where when a first pre-determined number of errors are logged, switching from calculating the first center-return path to calculating the second center-return path, and where when a second pre-determined number of errors are logged, switching from calculating the second center-return path to calculating the third center-return path.

At a next step 2014, the method executes the adapted path. In executing the adapted path, the method may execute any of the following movements: moving the robotic device to the center of the working zone by retracing the coverage path before executing the adapted coverage path; moving the robotic device directly to the center of the working zone from the current location before executing the adapted coverage path; moving the robotic device directly to the third side of a triangular path from the current location before executing the adapted coverage path; and turning the robotic device a pre-set number of degrees, calculating a new triangular path until an unobstructed path is found, before executing the adapted coverage path. In this manner, a new obstacle may be bypassed whereupon the method returns to the coverage path. In some embodiments, a new obstacle must be bypassed within a specified time constraint. If, in that example, the new obstacle is not bypassed, the method may return to the coverage path or to a new workspace. The method continues to a step 2016 to determine whether a coverage path is complete. If the method determines at a step 2016 that the coverage path is not complete, the method continues to a step 2008 to execute the coverage path. If the method determines at a step 2016 that the coverage path is complete, the method ends.

Figure 34:
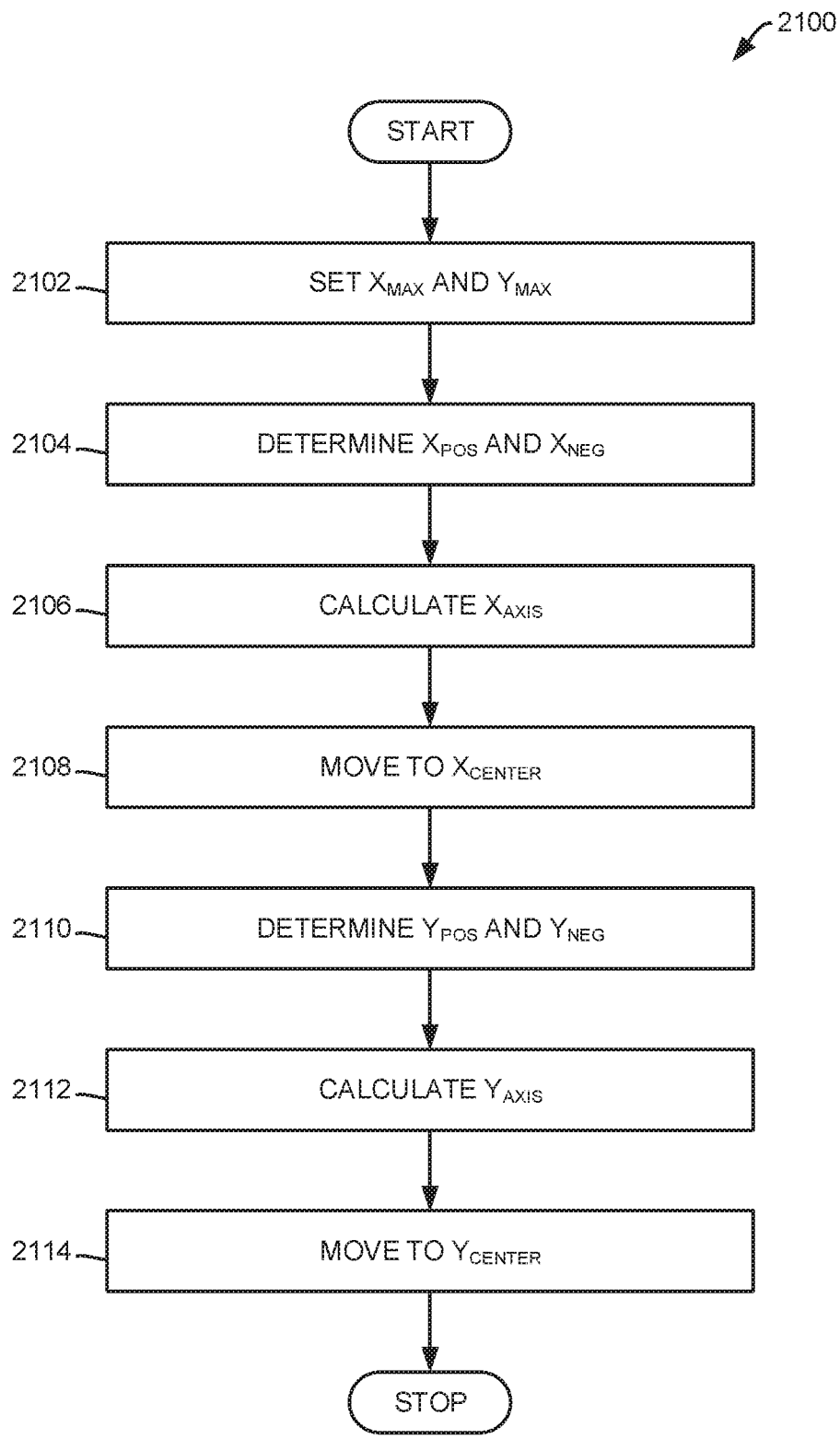

FIG. 34 is an illustrative flowchart 2100 of methods described herein. In particular, flowchart 2100 further illustrates a step 2002 of FIG. 33. At a first step 2102, the method establishes or sets Xmax and Ymax, where the Xmax corresponds with a maximum X distance in the X direction of the working zone and where the Ymax corresponds with a maximum Y distance in the Y direction of the working zone. At a next step 2104, the method determines an Xpos and an Xneg, where Xpos corresponds with a first distance to a first nearest object in a first X direction, and where Xneg corresponds with a second distance to a second nearest object in a second X direction. At a next step 2106, the method calculates an Xaxis, where Xaxis corresponds either with Xmax or with a distance defined by Xpos and Xneg, whereupon the method continues to a step 2108 to move the robotic device to Xcenter, where Xcenter corresponds with a midpoint of Xaxis. In this manner, an X boundary in an X direction of the working zone is established and the robotic device is moved to the center of the X boundary.

At a next step 2110, the method determines an Ypos and an Yneg, where Ypos corresponds with a first distance to a first nearest object in a first Y direction, and where Yneg corresponds with a second distance to a second nearest object in a second Y direction. The method continues to a step 2112 to calculate an Yaxis, where Yaxis corresponds either with Ymax or with a distance defined by Ypos and Yneg, whereupon the method continues to a step 2114 to move the robotic device to Ycenter, where Ycenter corresponds with a midpoint of Yaxis. In this manner, a Y boundary in a Y direction of the working zone is established and the robotic device is moved to the center of the Y boundary. The method then ends.

In some embodiments, it may be desirable to move the robotic device to a new area for any number of reasons. For example, when a potential axis for a working zone is detected to be less than a pre-determined minimum length, the robotic device may be moved to an axis on a different boundary of the last working zone from where zone creation can begin anew. This may be desirable because a working zone that is too small may indicate that too many obstacles are present to effectively cover an area or that obstacles in an area are too close together for the device to effectively service the area.

Figure 35:
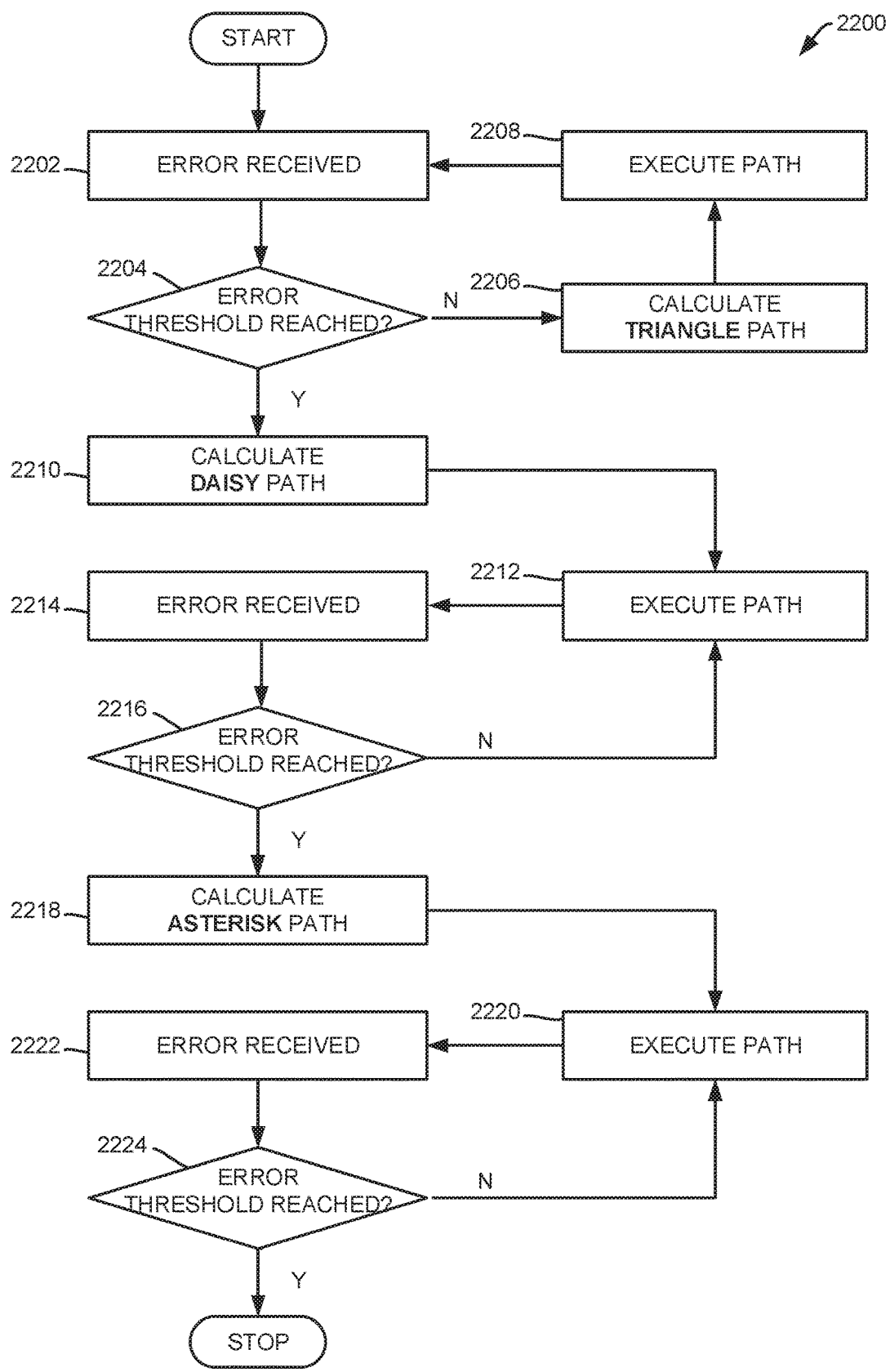

FIG. 35 is an illustrative flowchart 2200 of methods described herein. As noted above for FIG. 33, detecting a new obstacle may cause an error to be logged, where when a first pre-determined number of errors are logged, switching from calculating the first center-return path to calculating the second center-return path, and where when a second pre-determined number of errors are logged, switching from calculating the second center-return path to calculating the third center-return path. As such, at a first step 2202 an error may be received. Errors may be received for a variety of reasons such as, for example, detecting a new obstacle or detecting a threshold number of obstacles. The method continues to a step 2204 to determine whether an error threshold has been reached. If the method determines at a step 2204 that an error threshold has not been reached, the method continues to a step 2206 to calculate a triangle path, whereupon the method continues to a step 2208 to execute the path. If the method determines at a step 2204 that an error threshold has been reached, the method continues to a step 2210 to calculate a daisy path. At a next step 2212, the method executes the path. At a step 2214, the method receives an error. Errors may be received for a variety of reasons such as, for example, detecting a new obstacle or detecting a threshold number of obstacles. The method continues to a step 2216 to determine whether an error threshold has been reached. If the method determines at a step 2216 that an error threshold has not been reached, the method continues to a step 2212 to execute the path. If the method determines at a step 2216 that an error threshold has been reached, the method continues to a step 2218 to calculate an asterisk path. At a next step 2220, the method executes the path. At a step 2222, the method receives an error. Errors may be received for a variety of reasons such as, for example, detecting a new obstacle or detecting a threshold number of obstacles. The method continues to a step 2224 to determine whether an error threshold has been reached. If the method determines at a step 2224 that an error threshold has not been reached, the method continues to a step 2220 to execute the path. If the method determines at a step 2224 that an error threshold has been reached, the method ends.

In some embodiments, the processor of the robotic surface cleaning device may determine optimal (e.g., locally or globally) division and coverage of the environment by minimizing a cost function or by maximizing a reward function. In some embodiments, the overall cost function C of a zone or an environment may be calculated by the processor of the robotic surface cleaning device based on a travel and cleaning cost K and coverage L. In some embodiments, other factors may be inputs to the cost function. The processor attempts to minimize the travel and cleaning cost K and maximize coverage L. In some embodiments, the processor determines the travel and cleaning cost K by computing individual cost for each zone and adding the required driving cost between zones. The driving cost between zones may depend on where the robot ended coverage in one zone, and where it begins coverage in a following zone. The cleaning cost may be dependent on factors such as the movement path of the robotic surface cleaning device, coverage time, etc. In some embodiments, the processor determines the coverage based on the square meters of area covered (or otherwise area operated on) by the robotic surface cleaning device. In some embodiments, the processor of the robotic surface cleaning device minimizes the total cost function by modifying zones of the environment by, for example, removing, adding, shrinking, expanding, moving and switching the order of coverage of zones. For example, in some embodiments the processor may restrict zones to having rectangular shape, allow the robotic surface cleaning device to enter or leave a zone at any surface point and permit overlap between rectangular zones to determine optimal zones of an environment. In some embodiments, the processor includes or excludes additional conditions. In some embodiments, the cost accounts for additional features other than or in addition to travel and operating cost and coverage. Examples of features that may be inputs to the cost function may include, coverage, size, and area of the zone, zone overlap with perimeters (e.g., walls, buildings, or other areas the robot cannot travel), location of zones, overlap between zones, location of zones and shared boundaries between zones. In some embodiments, a hierarchy may be used by the processor to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid perimeters, tier three may be to avoid overlap with other zones and tier four may be to increase coverage.

In some embodiments, the processor may use various functions to further improve optimization of coverage of the environment. These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual operating cost below a certain threshold may be deleted, and a fast grow function wherein any space adjacent to a zone that is predominantly unclaimed by any other zone may be quickly incorporated into the zone.

In some embodiments, to optimize division of zones of an environment, the processor proceeds through the following iteration for each zone of a sequence of zones, beginning with the first zone: expansion of the zone if neighbor cells are empty, movement of the robotic surface cleaning device to a point in the zone closest to the current position of the robotic surface cleaning device, addition of a new zone coinciding with the travel path of the robotic surface cleaning device from its current position to a point in the zone closest to the robotic surface cleaning device if the length of travel from its current position is significant, execution of a coverage pattern (e.g. boustrophedon) within the zone, and removal of any uncovered cells from the zone.

In some embodiments, the processor determines optimal division of zones of an environment by modeling zones as emulsions of liquid, such as bubbles. In some embodiments, the processor creates zones of arbitrary shape but of similar size, avoids overlap of zones with static structures of the environment and minimizes surface area and travel distance between zones. In some embodiments, behaviors of emulsions of liquid, such as minimization of surface tension and surface area and expansion and contraction of the emulsion driven by an internal pressure are used in modeling the zones of the environment. To do so, in some embodiments, the environment is represented by a grid map and divided into zones by the processor. In some embodiments, the processor converts the grid map into a routing graph G consisting of nodes N connected by edges E. The processor represents a zone A using a set of nodes of the routing graph wherein $A \subset N$. The nodes are connected and represent an area on the grid map. In some embodiments, the processor assigns a zone A a set of perimeters edges E wherein a perimeters edge $e=(n_1, n_2)$ connects a node $n_1 \in A$ with a node $n_2 \notin A$. Thus, the set of perimeters edges clearly defines the set of perimeters nodes $\partial A$, and gives information about the nodes, which are just inside zone A as well as the nodes just outside zone A. Perimeters nodes in zone A may be denoted by $\partial A^{in}$ and perimeters nodes outside zone A by $\partial A^{out}$. The collection of $\partial A^{in}$ and $\partial A^{out}$ together are all the nodes in $\partial A$. In some embodiments, the processor expands a zone A in size by adding nodes from $\partial A^{out}$ to zone A and reduces the zone in size by removing nodes in $\partial A^{in}$ from zone A, allowing for fluid contraction and expansion. In some embodiments, the processor determines a numerical value to assign to each node in $\partial A$, wherein the value of each node indicates whether to add or remove the node from zone A.

In some embodiments, the processor determines the best division of an environment by minimizing a cost function defined as the difference between theoretical (e.g., modeled with uncertainty) area of the environment and the actual area covered. The theoretical area of the environment may be determined by the processor using a map of the environment. The actual area covered may be determined by the processor by recorded movement of the robotic surface cleaning device using, for example, an odometer or gyroscope. In some embodiments, the processor may determine the best division of the environment by minimizing a cost function dependent on a movement path taken by the robotic surface cleaning device comprising the movement paths taken within each zone and in between zones. The processor may restrict zones to being rectangular (or having some other defined number of vertices or sides) and may restrict the robotic surface cleaning device to entering a zone at a corner and to driving a serpentine routine (or other driving routine) in either x- or y-direction such that the trajectory ends at another corner of the zone. The cost associated with a particular division of an environment and order of zone coverage may be computed as the sum of the distances of the serpentine path travelled for coverage within each zone and the sum of the distances travelled in between zones (corner to corner). To minimize cost function and improve coverage efficiency zones may be further divided, merged, reordered for coverage and entry/exit points of zones may be adjusted. In some embodiments, the processor of the robotic surface cleaning device may initiate these actions at random or may target them. In some embodiments, wherein actions are initiated at random (e.g., based on a pseudorandom value) by the processor, the processor may choose a random action such as, dividing, merging or reordering zones, and perform the action. The processor may then optimize entry/exit points for the chosen zones and order of zones. A difference between the new cost and old cost may be computed as $\Delta$=new cost−old cost by the processor wherein an action resulting in a difference <0 is accepted while a difference >0 is accepted with probability $\exp(-\Delta/T)$ wherein T is a scaling constant. Since cost, in some embodiments, strongly depends on randomly determined actions the processor of the robotic surface cleaning device, embodiments may evolve 10 different instances and after a specified number of iterations may discard a percentage of the worst instances.

In some embodiments, the processor actuates the robotic surface cleaning device to execute the best or a number of the best instances and calculate actual cost. In embodiments, wherein actions are targeted, the processor may find the greatest cost contributor, such as the largest travel cost, and initiate a targeted action to reduce the greatest cost contributor. In embodiments, random and targeted action approaches to minimizing the cost function may be applied to workspaces comprising multiple rooms by the processor of the robotic surface cleaning device. In embodiments, the processor may directly actuate the robotic surface cleaning device to execute coverage for a specific division of the environment and order of zone coverage without first evaluating different possible divisions and orders of zone coverage by simulation. In embodiments, the processor may determine the best division of the environment by minimizing a cost function comprising some measure of the theoretical area of the environment, the actual area covered, and the path taken by the robotic surface cleaning device within each zone and in between zones.

In some embodiments, the processor determines a reward and assigns it to a policy based on performance of coverage of the environment by the robotic surface cleaning device. In some embodiments, the policy may include the zones created, the order in which they were covered, and the coverage path (i.e., it may include data describing these things). In some embodiments, the policy may include a collection of states and actions experienced by the robotic surface cleaning device during coverage of the environment as a result of the zones created, the order in which they were covered and coverage path. In some embodiments, the reward is based on actual coverage, repeat coverage, total coverage time, travel distance between zones, etc. In some embodiments, the process may be iteratively repeated to determine the policy that maximizes the reward. In some embodiments, the processor determines the policy that maximizes the reward using a MDP as described above. In some embodiments, a processor of a robotic surface cleaning device may evaluate different divisions of an environment while offline. Examples of methods for dividing an environment into zones for coverage are described in U.S. patent application Ser. Nos. 14/817,952, 15/619,449, 16/198,393, 14/673,633, and 15/676,888, the entire contents of which are hereby incorporated by reference.

In some embodiments, the processor of the robotic surface cleaning device uses a motion model to predict the position of the robotic surface cleaning device within the environment. In some embodiments, the processor determines parameters of the motion model of the robotic surface cleaning device that improve predictions of the motion model. A description of the motion model that may be used and the estimation of model parameters is provided in U.S. patent application Ser. Nos. 16/041,286 and 16/353,019, the entire contents of which are hereby incorporated by reference.

In some embodiments, the processor determines which cleaning tools to use based on characteristics of the environment using methods such as those described in U.S. Patent Application No. 62/735,137, Ser. Nos. 16/239,410 and 16/163,530, the entire contents of which are hereby incorporated by reference. For example, in some embodiments, the robotic surface cleaning device uses the processor and one or more environmental sensors (e.g., sensors that sense attributes or can observe or provide data from which inferences can be made about characteristics of an environment, such as those of a floor, a wall, or a surface of an obstacle). Examples of sensors include, but are not limited to, floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robotic surface cleaning device indicating the location of the robotic surface cleaning device at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred. In some embodiments, the processor activates or deactivates (or modulates intensity of) functions (e.g., vacuuming, mopping, UV, etc.) based on the environmental characteristics inferred. In other instances, the processor adjusts a cleaning path, operational schedule (e.g., time when various designated areas are worked upon, such as when cleaned), and the like based on sensory data. Examples of environmental characteristics include floor type, obstacle density, room type, level of debris accumulation, level of user activity, time of user activity, etc.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must).

The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A robotic surface cleaning device, comprising:
   a casing;
   a chassis;
   a set of wheels coupled to the chassis to drive the robotic surface cleaning device;
   a control system to instruct movement of the set of wheels;
   a battery to provide power to the robotic surface cleaning device;
   one or more sensors;
   a processor;
   a rotating assembly, comprising:
      a plate supported by a base of the casing;
      a rotating mechanism to rotate the plate, wherein the rotating mechanism is an electrical rotating mechanism comprising at least an electrical motor for directly or indirectly rotating the plate; and
      one or more cleaning apparatuses mounted to a first side of the plate.

2. The robotic surface cleaning device of claim 1, wherein the processor adjusts the rotational speed of the plate such that the one or more cleaning apparatuses pass over at least a portion of substantially the same area covered by the robotic surface cleaning device at least two times before the robotic surface cleaning device covers another area.

3. The robotic surface cleaning device of claim 1, wherein the one or more cleaning apparatuses comprise one or more of: a brush, a mop, a mopping pad, a dusting pad, and a polishing pad.

4. The robotic surface cleaning device of claim 1, wherein the plate rotates in a plane parallel to a working surface of the robotic surface cleaning device.

5. The robotic surface cleaning device of claim 1, wherein the processor rotates the plate in at least one direction.

6. The robotic surface cleaning device of claim 1, wherein the processor continuously alternates between rotating the plate in a first direction for a predetermined number of rotations and rotating the plate in a second direction for a predetermined number of rotations.

7. The robotic surface cleaning device of claim 1, wherein the processor rotates the plate for a predetermined amount of time.

8. The robotic surface cleaning device of claim 1, wherein the processor activates or deactivates the rotating assembly during operation of the robotic surface cleaning device.

9. The robotic surface cleaning device of claim 1, wherein the processor oscillates the plate back and forth by reversing the direction of rotation after rotating the plate a predetermined number of degrees in each direction.

10. The robotic surface cleaning device of claim 1, wherein the casing and the plate each comprise electrical contacts.

11. The robotic surface cleaning device of claim 10, wherein the electrical contacts of the casing contact the electrical contacts of the plate.

12. The robotic surface cleaning device of claim 1, wherein the processor adjusts the rotational speed of the plate based on a driving speed of the robotic surface cleaning device.

13. The robotic surface cleaning device of claim 1, further comprising a vacuum motor and a debris container mounted to a second side of the plate and at least one brush mounted to the first side of the plate.

14. The robotic surface cleaning device of claim 1, further comprising a liquid container mounted to a second side of the plate and a mopping pad mounted to the first side of the plate.

15. The robotic surface cleaning device of claim 1, further comprising a vacuum motor, a debris container, and a liquid container mounted to a second side of the plate and at least one brush or a mopping pad mounted to the first side of the plate.

16. A robotic surface cleaning device, comprising:
   a casing;
   a chassis;
   a set of wheels coupled to the chassis to drive the robotic surface cleaning device;
   a control system to instruct movement of the set of wheels;
   a battery to provide power to the robotic surface cleaning device;
   one or more sensors;
   a processor;
   a rotating assembly, comprising:
      a plate supported by a base of the casing;
      an axle coupled to the plate;
      an electrical motor coupled to the axle to rotate the plate; and
      one or more cleaning apparatuses mounted to a first side of the plate.

17. A robotic surface cleaning device, comprising:
   a casing;
   a chassis;
   a set of wheels coupled to the chassis to drive the robotic surface cleaning device;
   a control system to instruct movement of the set of wheels;
   a battery to provide power to the robotic surface cleaning device;
   one or more sensors;
   a processor;
   a rotating assembly, comprising:
      a plate supported by a base of the casing;
      a gear set coupled to the plate and the set of wheels; and
      one or more cleaning apparatuses mounted to a first side of the plate,
   wherein rotation of the set of wheels causes rotation of the plate.

* * * * *